United States Patent
Wang et al.

(10) Patent No.: US 10,194,303 B2
(45) Date of Patent: Jan. 29, 2019

(54) PACKET FILTER BASED ACCESS CONTROL

(71) Applicant: QUALCOMM Incorporated, San Diego, CA (US)

(72) Inventors: Jun Wang, Poway, CA (US); George Cherian, San Diego, CA (US); Masakazu Shirota, Yokohama (JP); Suli Zhao, San Diego, CA (US); Aleksandar Gogic, San Diego, CA (US); Giridhar Dhati Mandyam, San Diego, CA (US); Haris Zisimopoulos, London (GB); Roozbeh Atarius, San Diego, CA (US); Charles Nung Lo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 14/642,585

(22) Filed: Mar. 9, 2015

(65) Prior Publication Data

US 2015/0263957 A1 Sep. 17, 2015

Related U.S. Application Data

(60) Provisional application No. 62/024,437, filed on Jul. 14, 2014, provisional application No. 61/953,686, filed on Mar. 14, 2014.

(51) Int. Cl.
*H04W 4/90* (2018.01)
*H04W 4/14* (2009.01)
(Continued)

(52) U.S. Cl.
CPC .............. *H04W 4/90* (2018.02); *H04L 47/20* (2013.01); *H04W 4/14* (2013.01);
(Continued)

(58) Field of Classification Search
CPC .. H04W 28/0263; H04W 76/022; H04W 4/22
(Continued)

(56) References Cited

U.S. PATENT DOCUMENTS

| 7,543,052 B1 | 6/2009 | Cesa |
| 2004/0190522 A1 | 9/2004 | Aerrabotu et al. |

(Continued)

FOREIGN PATENT DOCUMENTS

WO 2010142332 A1 12/2010

OTHER PUBLICATIONS

International Search Report and Written Opinion—PCT/US2015/019737—ISA/EPO—dated Sep. 7, 2015.
(Continued)

*Primary Examiner* — Asad M Nawaz
*Assistant Examiner* — Saad A. Waqas
(74) *Attorney, Agent, or Firm* — Arent Fox LLP

(57) ABSTRACT

A method, an apparatus, and a computer program product are provided. The apparatus may be a UE configured to receive from a base station access parameters corresponding to respective types of access controls for different types of data services, receive a TFT established at a core network based on mapping a packet filter to access control information for each type of access control, receive a data packet from an application, match the data packet to the packet filter to determine access control information corresponding to the data packet, and establish communication for the data packet based on access parameters for the determined access control information. Alternatively, the apparatus may be policy server configured to receive a request for traffic control regarding data being communicated to an application server, determine a policy update for the application server based on the request, and transmit the policy update to a UE.

42 Claims, 33 Drawing Sheets

(51) Int. Cl.
  *H04W 76/12* (2018.01)
  *H04W 28/02* (2009.01)
  *H04W 48/16* (2009.01)
  *H04L 12/813* (2013.01)
  *H04L 12/803* (2013.01)

(52) U.S. Cl.
  CPC ....... *H04W 28/0263* (2013.01); *H04W 48/16* (2013.01); *H04W 76/12* (2018.02); *H04L 47/122* (2013.01)

(58) Field of Classification Search
  USPC .......................................................... 370/230
  See application file for complete search history.

(56) References Cited

U.S. PATENT DOCUMENTS

| | | | |
|---|---|---|---|
| 2007/0160015 A1 | 7/2007 | Andriantsiferana | |
| 2007/0243879 A1 | 10/2007 | Park et al. | |
| 2008/0092149 A1* | 4/2008 | Rowbotham | G06F 9/4443 719/321 |
| 2009/0067326 A1 | 3/2009 | Perrot et al. | |
| 2011/0092202 A1* | 4/2011 | Mattisson | H04L 41/12 455/425 |
| 2011/0189971 A1* | 8/2011 | Faccin | H04W 76/02 455/404.1 |
| 2011/0199942 A1* | 8/2011 | Zhao | H04M 3/5116 370/259 |
| 2012/0092992 A1* | 4/2012 | Pappas | H04L 47/2491 370/235 |
| 2012/0246325 A1* | 9/2012 | Pancorbo Marcos | H04L 63/102 709/227 |
| 2012/0275323 A1 | 11/2012 | Reznik et al. | |
| 2014/0098740 A1* | 4/2014 | Xing | H04W 4/001 370/328 |
| 2015/0141030 A1* | 5/2015 | Basu-Mallick | H04W 28/0289 455/452.1 |
| 2015/0156663 A1* | 6/2015 | Wang | H04L 45/302 370/235 |

OTHER PUBLICATIONS

Nokia: "SAE Bearer Operation", 3GPP Draft; R2-060833 Bearer Operation, 3rd Generationpartnership Project (3GPP), Mobile Competence Centre, 650, Route Des Lucioles; F-06021 Sophia-Antipolis Cedex; France, vol. RAN WG2, No. Athens, Greece; Mar. 23, 2006, Mar. 23, 2006 (Mar. 23, 2006), 7 Pages, XP050130779, [retrieved on Mar. 23, 2006] A paragraphs [03. 2], [3.2.1.2], [3.2.2], [0004].

QUALCOMM Incorporated: "CATS Conceptual Approaches", 3GPP Draft; S1-143159_FS_CATS_Conceptual Approaches, 3rd Generation Partnership Project (3GPP), Mobile Competence Centre; 659, Route Des Lucioles; F-96921 Sophia-Antipolis Cedex; France, vol. SA WG1, No. Sophia-Antipolis, France; Aug. 18, 2014-Aug. 22, 2014, Aug. 18, 2014 (Aug. 18, 2014), pp. 1-6, XP050803874, Retrieved from the Internet: URL:http://www.3gpp.org/DynaReport/TDocExMtg--S1-67--30783.htm.

* cited by examiner

PACKET FILTER BASED ACCESS CONTROL

CROSS-REFERENCE TO RELATED APPLICATION(S)

This application claims the benefit of U.S. Provisional Application Ser. No. 61/953,686, entitled "PACKET FILTER BASED ACCESS CONTROL" and filed on Mar. 14, 2014, and U.S. Provisional Application Ser. No. 62/024,437, entitled "WIRELESS DEVICE AND NETWORKED CENTERED SOLUTIONS FOR REDUCING IMPACT ON APPLICATION SERVERS ENCOUNTERING PROBLEMS" and filed on Jul. 14, 2014, which are expressly incorporated by reference herein in their entirety.

BACKGROUND

Field

The present disclosure relates generally to communication systems, and more particularly, to an access control.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment (UE). The apparatus receives from a base station multiple access parameters corresponding to respective types of access controls for different types of data services. The apparatus receives a TFT established at a core network based on mapping a packet filter to access control information for each of the respective types of access controls. The apparatus receives a data packet from an application. The apparatus matches the data packet to the packet filter of the TFT to determine access control information corresponding to the data packet. The apparatus establishes a wireless communication for the data packet based on access parameters for the determined type of access control.

In another aspect of the disclosure, a method, a computer program product, and an apparatus are provided. The apparatus may be a base station. The apparatus obtains access control information for each of a plurality of data services. The apparatus derives at least one access parameter for each type of access control based on the access control information obtained for a respective type of data services. The apparatus sends the at least one access parameter derived for each type of access control to a UE. The apparatus provides to the UE a traffic flow template (TFT) established at a core network based on the access control information.

In another aspect of the disclosure, a method, a computer program product, and an apparatus are provided. The apparatus may be a UE. The apparatus receives from a base station a plurality of access parameters corresponding to respective types of access controls for different types of data services. The apparatus passes a data service type of a data packet from an application layer to a data service layer. The apparatus determines a corresponding type of access control for the data service type based on an API. The apparatus establishes a wireless communication for the data packet based on access parameters for the determined type of access control.

In an aspect of the disclosure, a method, a computer program product, and an apparatus are provided. The apparatus may be a policy server. The apparatus receives a request for traffic control regarding data being communicated to an application server. The apparatus determines a policy update for the application server based on the received request for traffic control. The apparatus transmits the policy update to one or more user equipment.

In another aspect of the disclosure, the apparatus may be a user equipment. The apparatus receives a policy update for an application server. The apparatus determines whether to restrict data from being transmitted to one or more destination Internet protocol (IP) addresses associated with the application server or to one or more IP address/port number pairs associated with the application server based on the policy update.

In an aspect of the disclosure, the apparatus may be a policy server. The apparatus receives a request for traffic control regarding data being communicated to an application server. The apparatus determines a policy update for the application server based on the received request for traffic control. The apparatus transmits the determined policy update to a policy entity, wherein the policy update indicates an amount of data to restrict from transmission from a network gateway to one or more destination IP addresses associated with the application server or to one or more IP address/port number pairs associated with the application server.

In another aspect of the disclosure, the apparatus may be a network gateway. The apparatus receives a policy update for an application server. The apparatus receives data from a user equipment for transmission to the application server. The apparatus determines an amount of the received data to restrict from transmission to the application server based on the received policy update.

DETAILED DESCRIPTION

Figure 1:
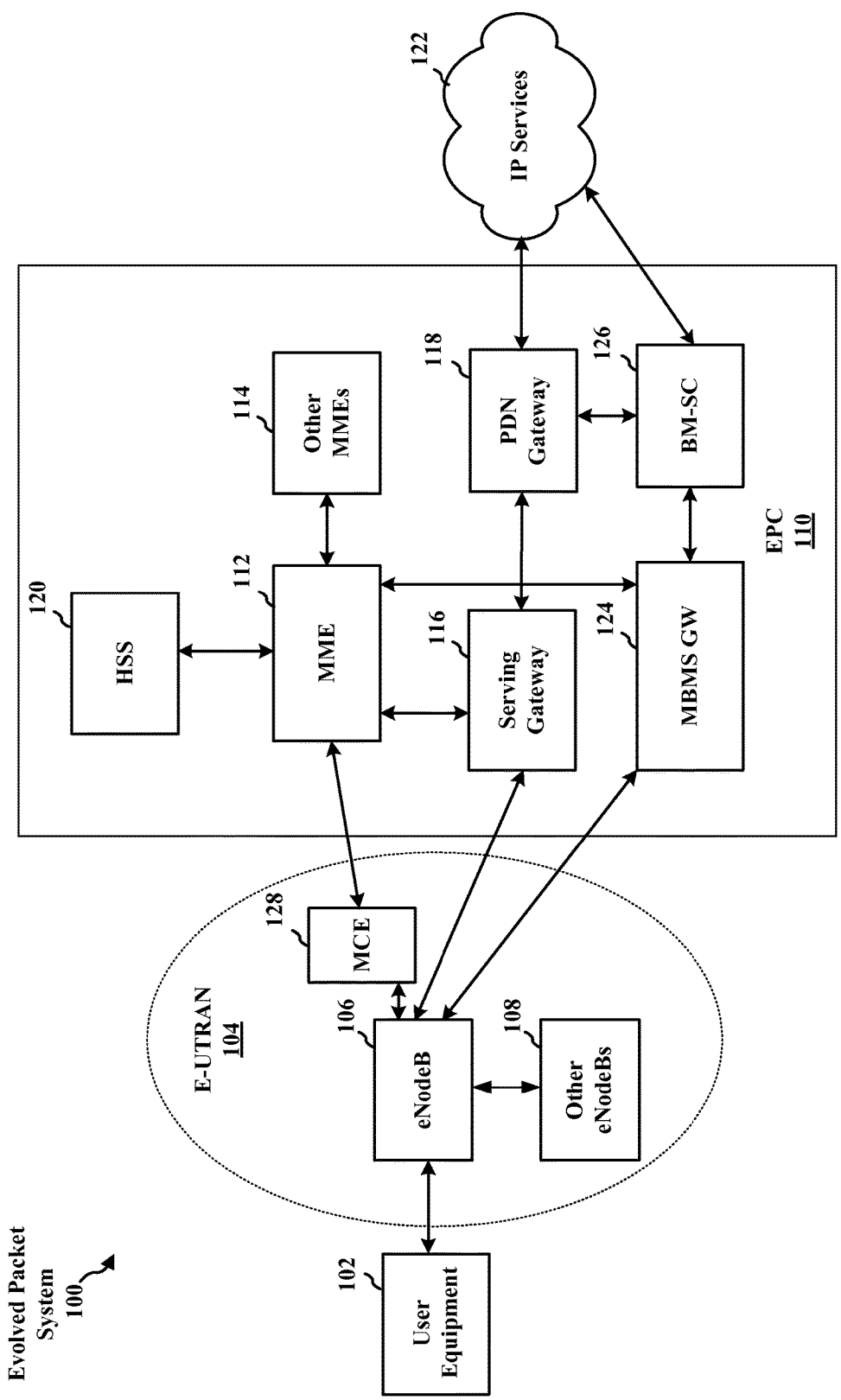
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
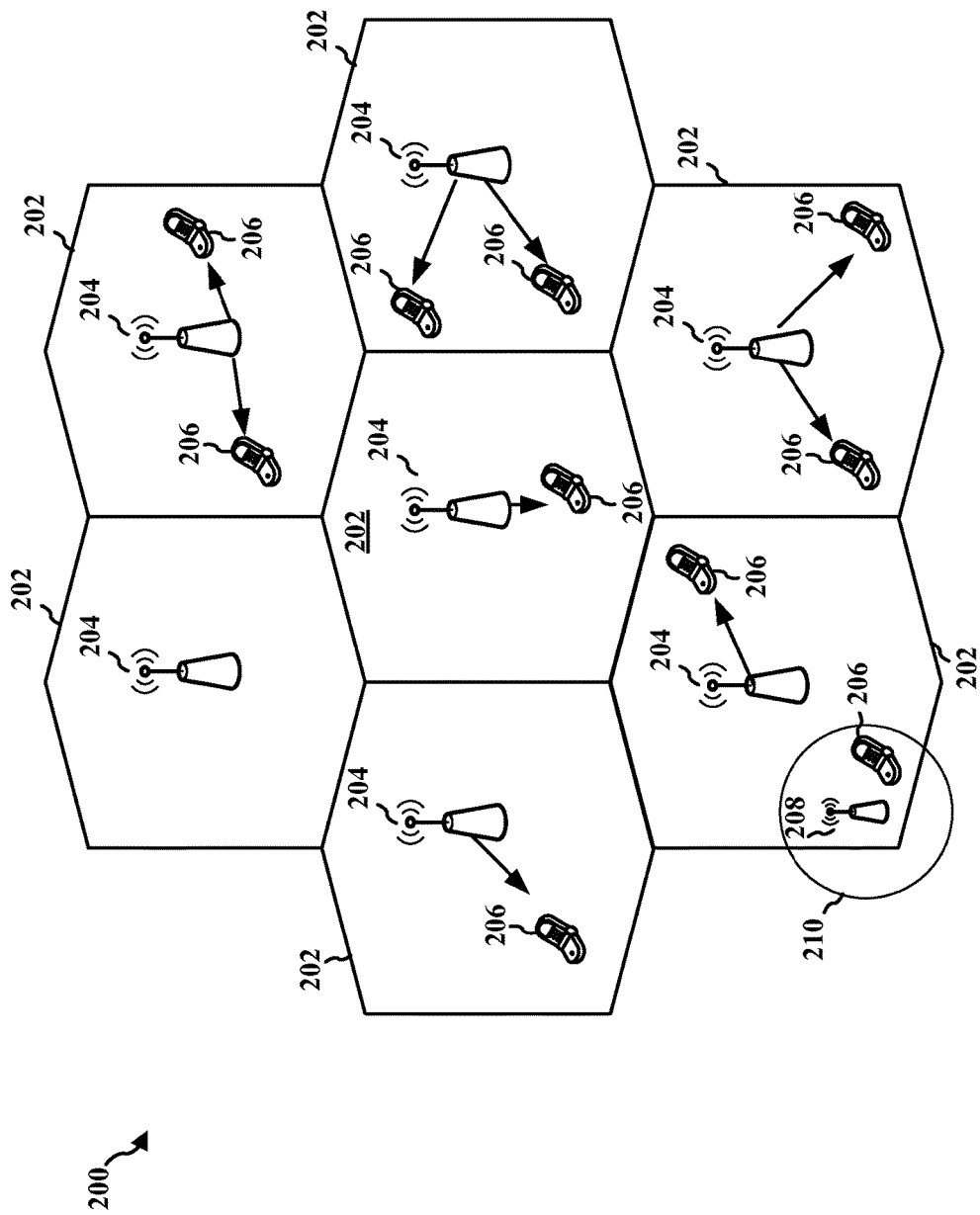
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
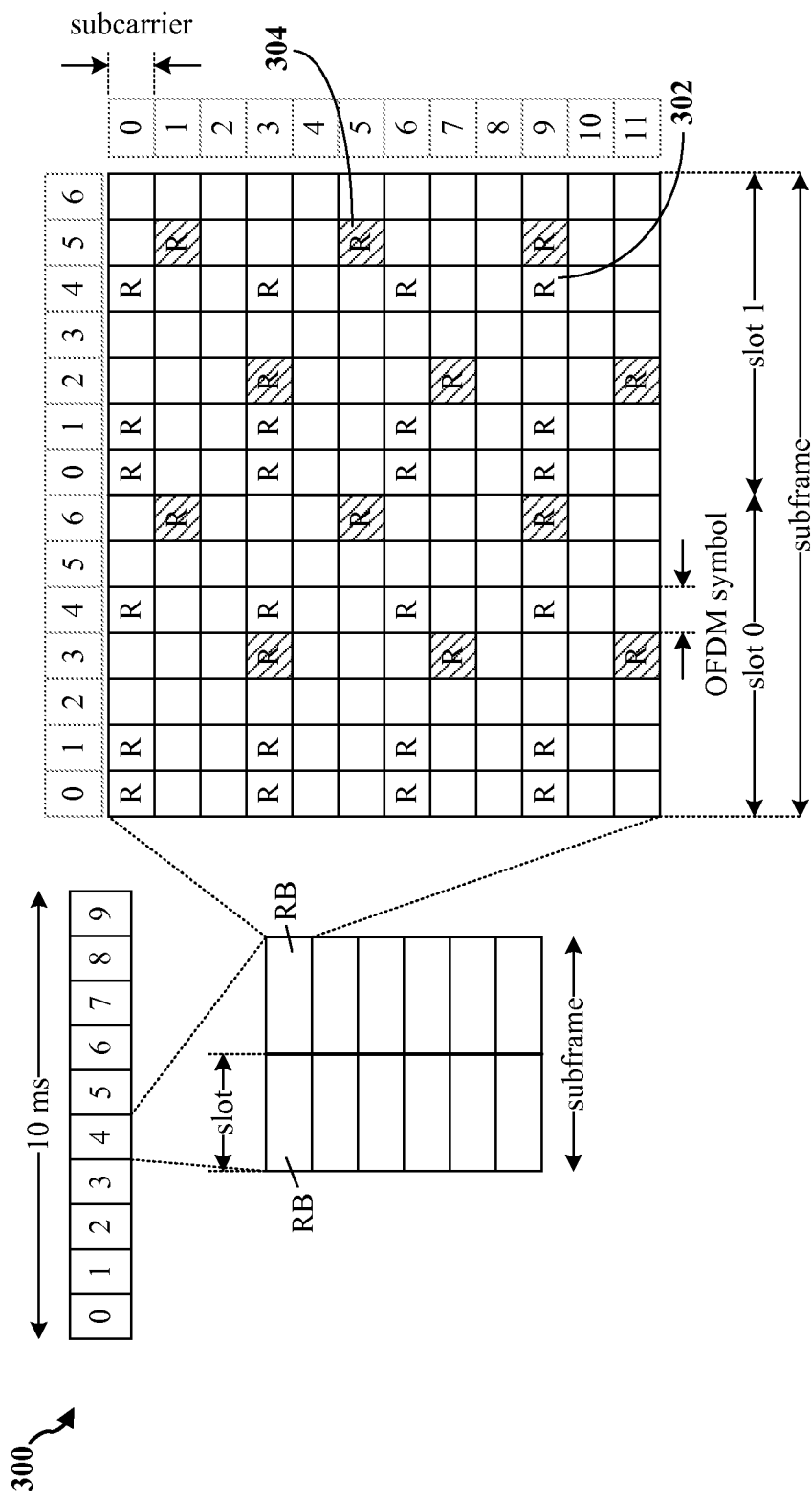
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
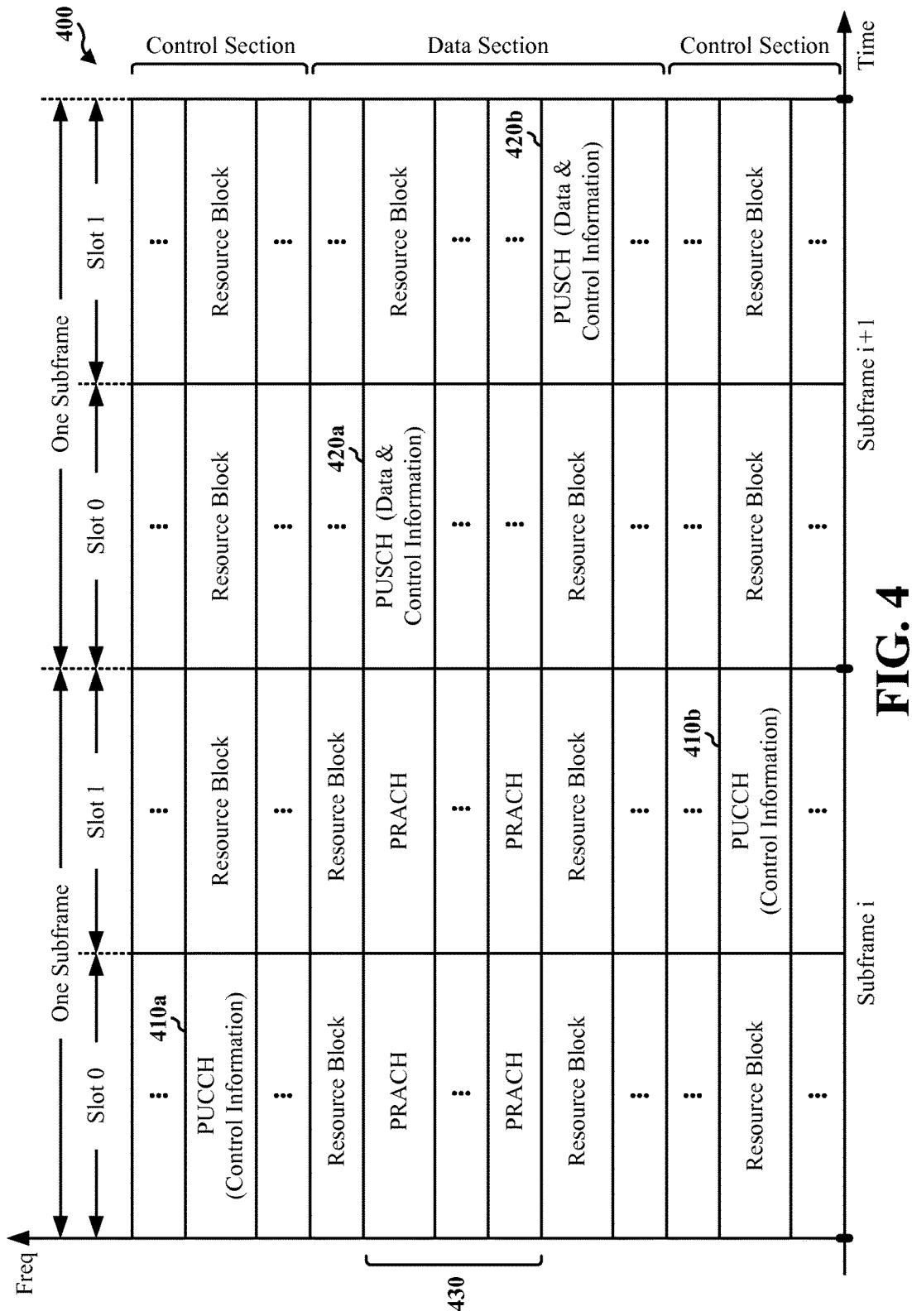
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
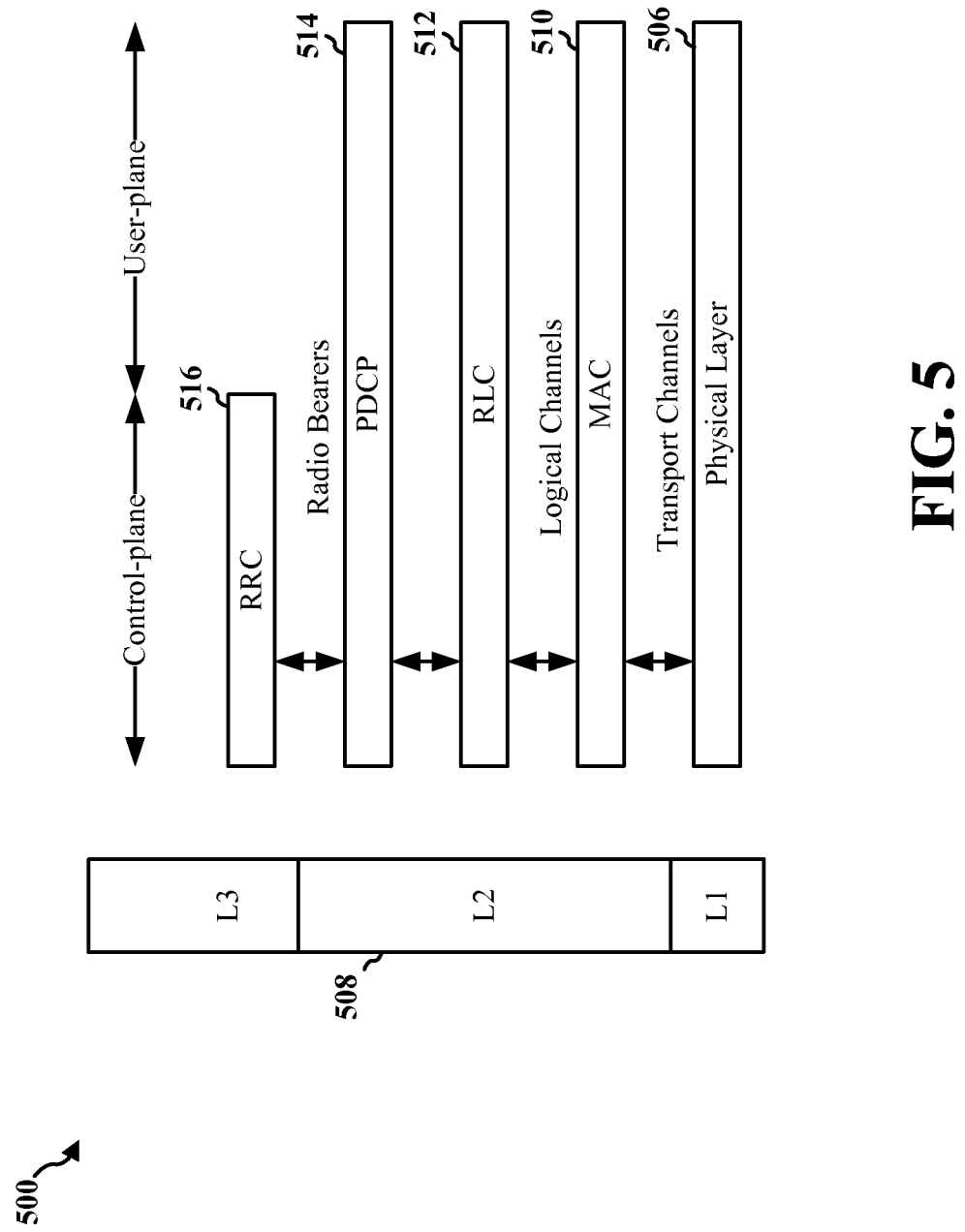
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
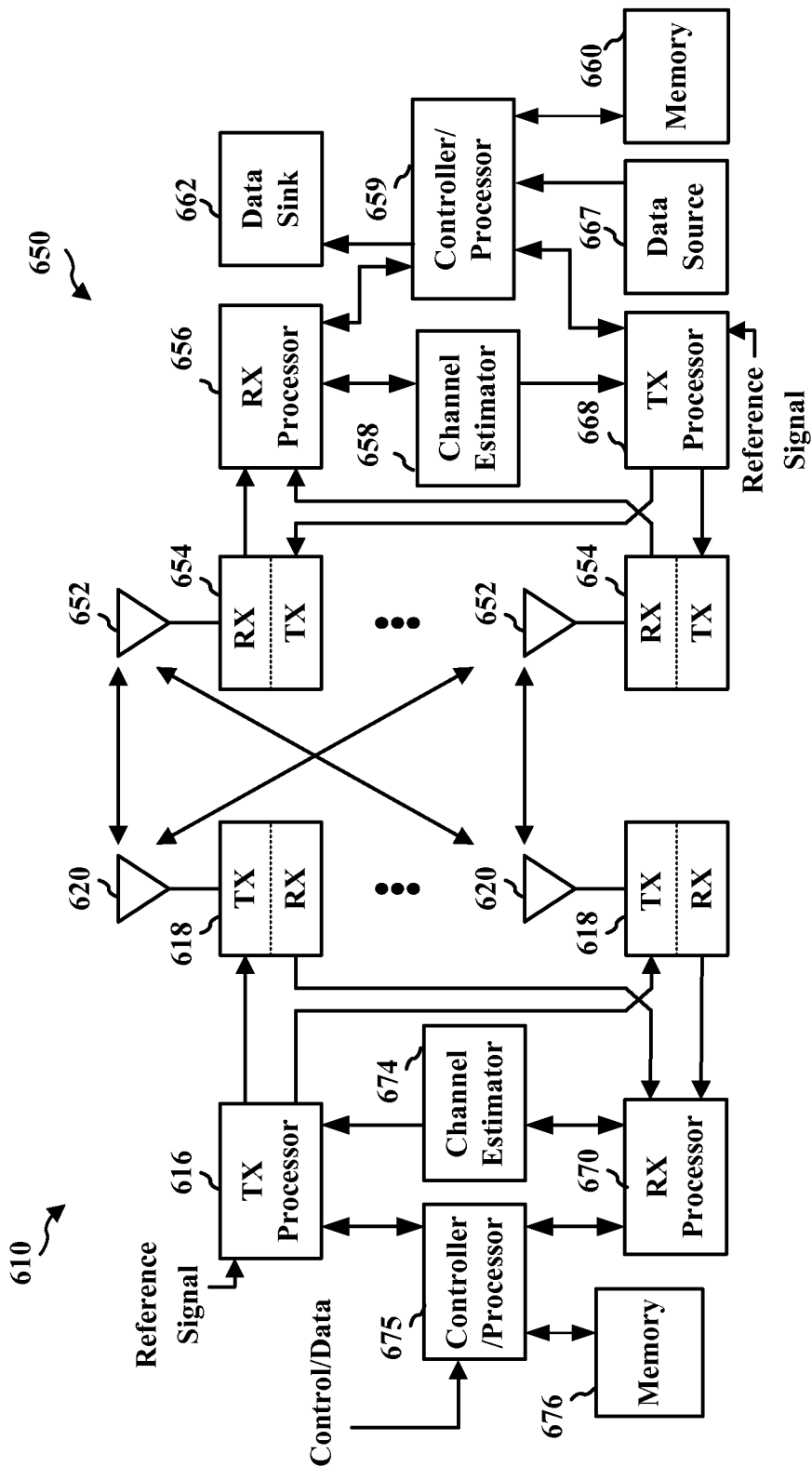
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Data services may include voice over IP (VoIP), a short message service (SMS), a chat service, and other data services. The data services may be performed via wireless communication. The data services may be categorized as emergency data services and non-emergency data services. Accordingly, a higher priority access control may be applied for an emergency data service while a lower priority access control may be applied for a non-emergency data service. In one example, an emergency SMS (e.g., an SMS reporting a natural disaster) may have a high priority access control and thus may be communicated before any other non-emergency data service. Therefore, it may be desirable to provide different access priorities for different types of data services.

A packet filter (PF) may be used to distinguish different quality of service (QoS). Generally, a traffic flow template (TFT) including a packet filter may be applied after a traffic channel is established. The packet filter of the TFT may then be used to distinguish different QoS. However, such approach does not provide an access control mechanism based on the packet filter.

In an aspect, the UE may utilize a packet filter to determine access control for a data service before the UE establishes a traffic channel. In particular, when a UE lower layer entity receives data to be transmitted (e.g., data packet of a data service from a UE-resident application), the UE may match the data to the packet filter and apply corresponding access control parameters for the service. One example of an access control parameter is a persistence value, where a different access control corresponds to a different persistence value. In one example, if the data is an emergency call, corresponding access control parameters may indicate that the UE be provided with more opportunities to obtain an access channel for the emergency call than for a non-emergency call. The UE may first obtain the access channel, so that the UE can initially request service. The network may then assign a traffic channel to the UE. In general, if the UE cannot obtain the access channel, the network cannot assign the traffic channel to the UE. By applying the packet filter to the data packet before transmission, the UE can distinguish a data service for the data packet and thus may apply corresponding access control parameters for access control when communicating the data service.

Figure 7:
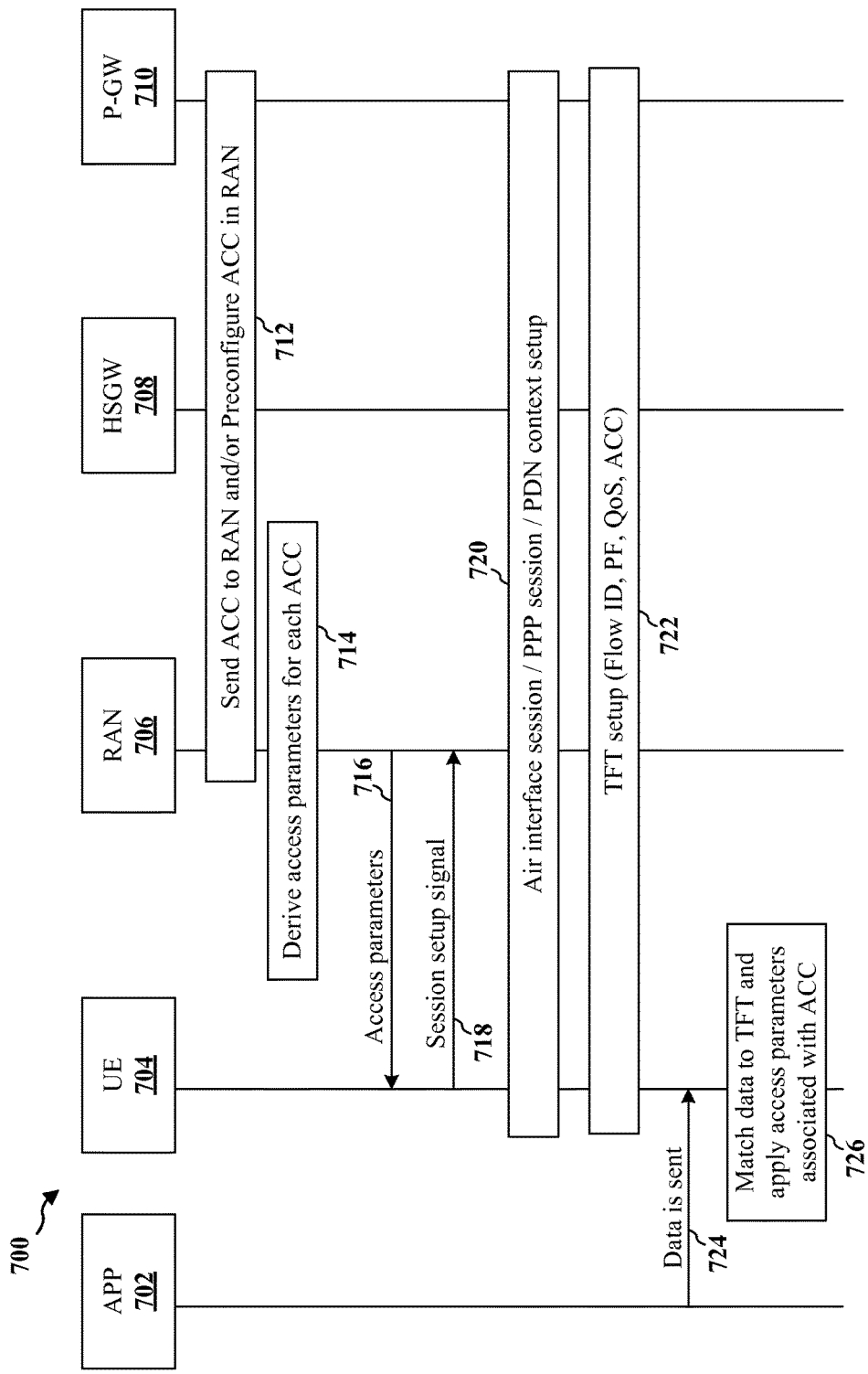
FIG. 7 is an example call flow according to an aspect of the disclosure.

FIG. 7 is an example call flow 700 according to an aspect of the disclosure. The call flow 700 includes an application 702, a UE 704, a radio access network (RAN) 706, a high rate packet data serving gateway (HSGW) 708, and a packet data network gateway (P-GW) 710. At 712, the RAN 706 determines access control classes (ACCs) for different access controls for different types of data services. In particular, at 712, the RAN 706 may receive ACCs from a core network including the HSGW 708 and/or the P-GW 710. At 712, the RAN 706 may also receive additional access control information along with the ACCs from the core network. The HSGW 708 and/or the P-GW 710 may receive the ACCs and the additional access control information from a policy and charging rules function (PCRF). Alternatively, the ACCs and/or the additional access control information may be preconfigured at the RAN 706. Each data service may be associated with a specific one and only one ACC. Conversely, an ACC may be associated with one or more specific data services. At 714, the RAN 706 derives access control parameters for each ACC. Thus, different access control parameters may be generated for different ACCs. The access control parameters may include persistence values. At 716, the RAN 706 sends the access control parameters to the UE 704. In one example, the RAN 706 may send the access control parameters through over-the-air (OTA) overhead messages (e.g., an Access Parameters message or a System Information Block).

At 718, the UE 704 sends a session setup signaling message to the RAN 706 to establish a session. The UE 704 and/or the RAN 706 may determine that the access control for the session setup signaling message is of a high priority. Thus, with the high priority for the access control, the access channel and the traffic channel may be established at the RAN 706. Upon receiving the session setup signaling message, at 720, the RAN 706 establishes a communication session with the UE 704, the HSGW 708, and the P-GW 710. For example, at 720, the RAN 706 may establish an air interface session (e.g., a high rate packet data (HRPD) session or an LTE radio session) with the UE 704 and may establish a network connection to the HSGW 708, a packet data serving node (PDSN), and the P-GW 710 (e.g., an A10 connection between the RAN 706 and the HSGW 708). Then, the UE 704 establishes at least one of a point-to-point (PPP) session or a PDN connection/context with the HSGW/PDSN/P-GW. At 722, the core network including the HSGW 708 and/or the P-GW 710 establishes a TFT with the UE 704, and provides the TFT to the UE via the RAN 706. The TFT may include a flow identifier, a packet filter, QoS, and the ACCs. The QoS may include QoS class identifiers or QoS profile identifiers. At 722, the core network (e.g., the HSGW 708, the P-GW 710, and/or the PDSN) also associates the ACCs with packet filters, respectively, and provides the TFT including the packet filters to the UE 704 via the RAN 706. In one example, the core network may provide the TFT to the UE 704 using RSVP signaling, Non Access Stratum (NAS) signaling, etc.

After establishing the data connection at 722, the UE 702 may enter an idle state and wait to receive data. The UE 702 may stay idle until the UE 702 receives the data. At 724, the application 702 sends a data packet (e.g., VoIP call data) to the UE 704. At 726, the UE 702 matches the data packet to the TFT, determines an ACC that corresponds with the data packet, and applies access procedures to set up a traffic channel for the data packet according to access parameters that correspond with the determined ACC. It is noted that the access parameters are received by the UE 704 at 716. In particular, when the UE matches the data packet to the TFT, the UE may use the packet filter included in the TFT to determine a type of ACC that corresponds with the data packet. For example, if the data packet is an emergency VoIP call data packet, the packet filter in the TFT may be used to determine that the ACC type of the data packet is an emergency VoIP call. In such an example, the UE 702 may communicate the data packet based on the access parameters that correspond with the emergency VoIP call.

Table 1 below contains an example of different types of ACCs. As shown in Table 1, each ACC type corresponds to a different value for a different access control purpose.

TABLE 1

Access control parameters for ACCs.

| ACC type | Value |
| --- | --- |
| Control Traffic | 000000 |
| Emergency VoIP | 000001 |
| Emergency SMS | 000010 |
| Emergency Data | 000011 |
| Non-Emergency VoIP | 000100 |
| Non-Emergency SMS | 000101 |
| Reserved | 000110-111101 |

TABLE 1-continued

Access control parameters for ACCs.

| ACC type | Value |
| --- | --- |
| Any other non-emergency services | 111110 |
| Not used | 111111 |

Figure 8:
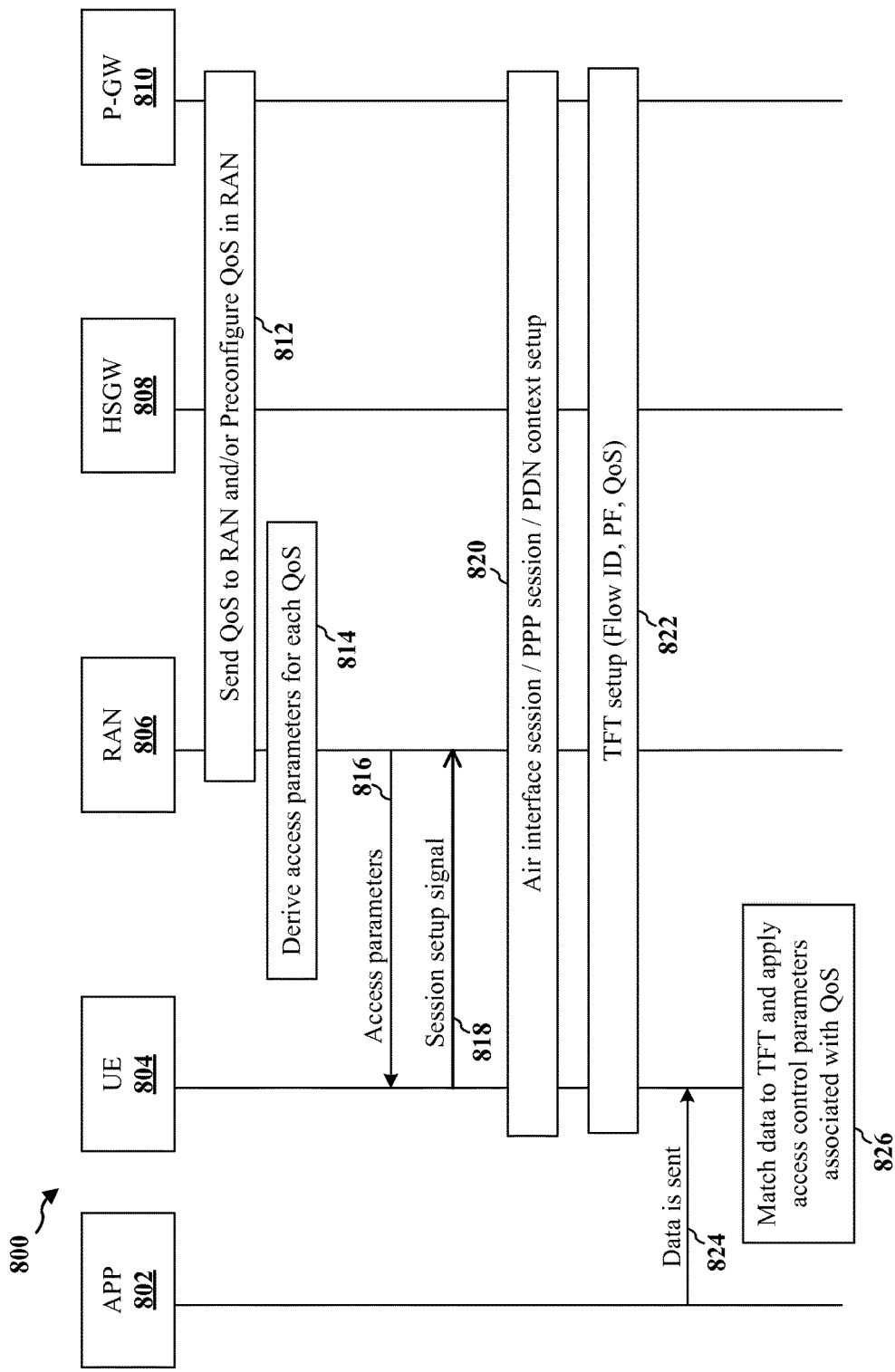
FIG. 8 is an example call flow according to another aspect of the disclosure.

FIG. 8 is an example call flow 800 according to another aspect of the disclosure. The call flow 800 includes an application 802, a UE 804, a RAN 806, an HSGW 808, and a P-GW 810. At 812, the RAN 806 determines different QoS of different ACCs for different types of data services. In particular, at 812, the RAN 806 may receive QoS from a core network including the HSGW 808 and/or the P-GW 810. Alternatively, the QoS may be preconfigured at the RAN 806. In an aspect, the QoS may include access control information (e.g., a new profile identifier value or a new QoS class of identifier (QCI) value) associated with each access control. At 814, the RAN 806 derives access control parameters for each QoS. Thus, different access control parameters may be generated for each QoS separately. In an aspect, the access control parameters for each QoS may be derived from the access control information included in a corresponding QoS. Access control information of each QoS may be associated with one or more specific data services. At 816, the RAN 806 sends the access control parameters to the UE 804. In one example, the RAN 806 may send the access control parameters through OTA overhead messages (e.g., an Access Parameters massage or a System Information Block).

At 818, the UE 804 sends a session setup signaling message to the RAN 806. The UE 804 and/or the RAN 806 may determine that the access control for the session setup signaling message may indicate a high priority. Thus, with the high priority indicated for the access, the access channel and the traffic channel may be established at the RAN 806. At 820, the RAN 806 establishes the session with the UE 804, the HSGW 808, and the P-GW 810. For example, at 820, the RAN 806 may establish an air interface session (e.g., an HRPD session or an LTE radio session) with the UE 804 and establish a network connection to the HSGW/PDSN/P-GW (e.g., an A10 connection between the RAN 806 and the HSGW 808). Then, the UE 804 establishes at least one of a PPP session or a PDN context with the HSGW/P-GW. At 822, a core network including the HSGW 808 and/or the P-GW 810 establishes a TFT with the UE 804, and provides the TFT to the UE 804 via the RAN 806. The TFT may include a flow identifier, a packet filter, and QoS, and may not include additional new parameters for access control. In particular, at 822, the core network (e.g., the HSGW 808, the P-GW 810, or a PDSN) may associate the access control information included in the QoS with packet filters, respectively, and provide the TFT including the packet filters to the UE 804 via the RAN 806.

After establishing the data connection at 822, the UE 802 may enter an idle state and wait to receive data. The UE 802 may stay idle until the UE 802 receives the data. At 824, the application 802 sends a data packet (e.g., VoIP call data) to the UE 804. At 826, the UE matches the data packet to the TFT, determines QoS that corresponds with the data packet, and applies access procedures to set up a traffic channel for the data packet according to access parameters that correspond with the determined QoS. It is noted that the access parameters are received by the UE 804 at 816. In particular, when the UE matches the data packet to the TFT, the UE may use the packet filter included in the TFT to determine a type of data. For example, if the data packet is an emergency VoIP call data packet, the packet filter in the TFT may be used to determine that the data packet is an emergency VoIP call. In such an example, the UE 802 may communicate the data packet based on the access parameters that correspond with the emergency VoIP call.

Table 2 below contains example access control information included in QoS for each data flow. As shown in Table 2, each data flow corresponds to a different value.

TABLE 2

Access control information in QoS for data flow.

| Flow Description | Access Control Information (e.g., New ProfileID value or New QCI value) |
| --- | --- |
| Control Traffic | X1 |
| Emergency VoIP | X2 |
| Emergency SMS | X3 |
| Emergency Data | X4 |
| Non-Emergency VoIP | X5 |
| Non-Emergency SMS | X7 |
| Any other non emergency services | X8 |

In another aspect, an access control may be applied on a per-PDN basis. In particular, each PDN-identifier may identify a PDN connection for a specific data service, and the RAN may derive access control parameters from each PDN-identifier. Thus, a PDN identifier may be used to define an access control for a data service. For example, one PDN-identifier may be associated with an emergency SMS service, and another PDN-identifier may be associated with a non-emergency VoIP service. In such an example, when the UE receives data, the UE may determine a PDN-identifier for a data service corresponding to the received data, and apply corresponding access control parameters to initiate communication of the data. In one example, a portion of the bitmap for ACC identifiers described with respect to FIG. 7 may be reserved for a PDN-identifier. In another example, a portion of the bitmap for QoS profile identifiers described in association with FIG. 8 may be reserved for a PDN-identifier. In another example, a new PDN identifier may be defined to be included in the TFT. Further, in another aspect, the RAN may derive access control parameters from access point names (APNs). Thus, an APN may be used to define an access control for a data service. For example, one APN may be used for emergency services, and another APN may be used for non-emergency services.

Figure 9:
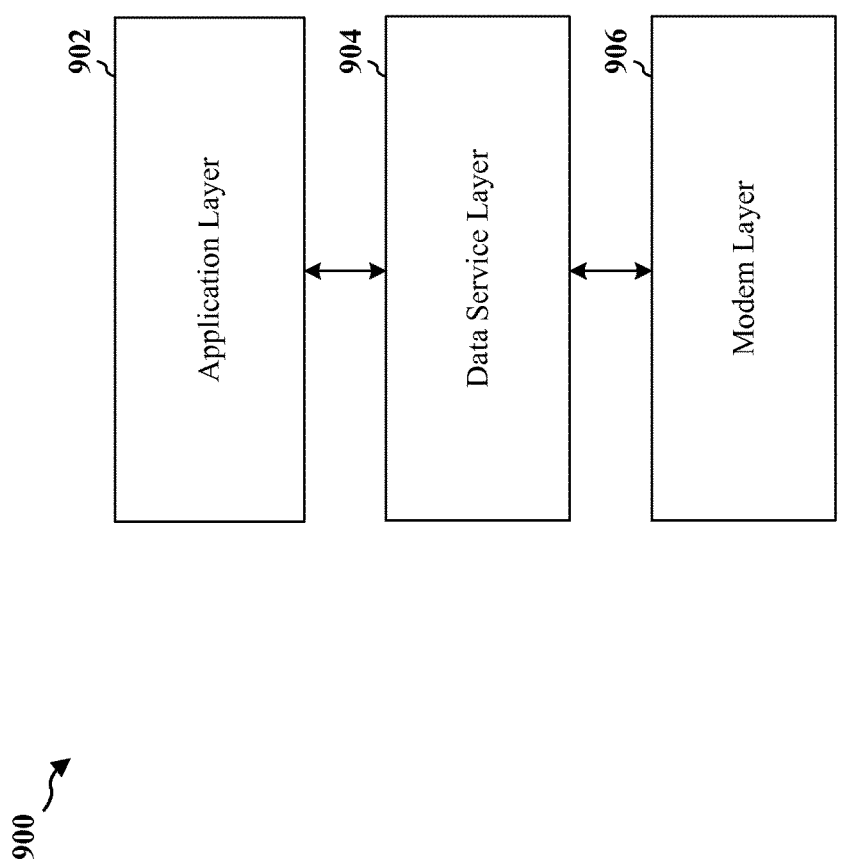
FIG. 9 is an example diagram of a protocol stack of a UE.

In an aspect, an application programming interface (API) may be utilized for indicating the data service type so that different access controls can be applied. FIG. 9 is an example diagram 900 of a protocol stack of a UE. An application layer 902 may be configured to communicate with a data service layer 904, and the data service layer 904 may be configured to communicate with a modem layer 906. In one aspect, when an application in the application layer 902 passes a data packet and/or a data service type of the data packet to the data service layer 904, the data service layer 904 may identify the ACC or QoS based on a match between the data packet and a packet filter included in a TFT. In one aspect, an API may be defined between the application layer 902 and the data service layer 904 to indicate a QoS or ACC of the data packet. In another aspect, an API may be defined between the data service layer 904 and the modem layer 906 to indicate a type of data service and/or access control for which the traffic channel is requested. The modem layer 906 may be associated with HRPD, Extended Range HRPD (xHRPD), LTE, UMTS, etc. As discussed supra, the UE may receive access control parameters derived from ACCs or access control information included in QoS for different types of data service. Thus, the UE may apply access procedures to request for traffic channel setup for the data packet based on access parameters for the indicated type of access control.

Figure 10:
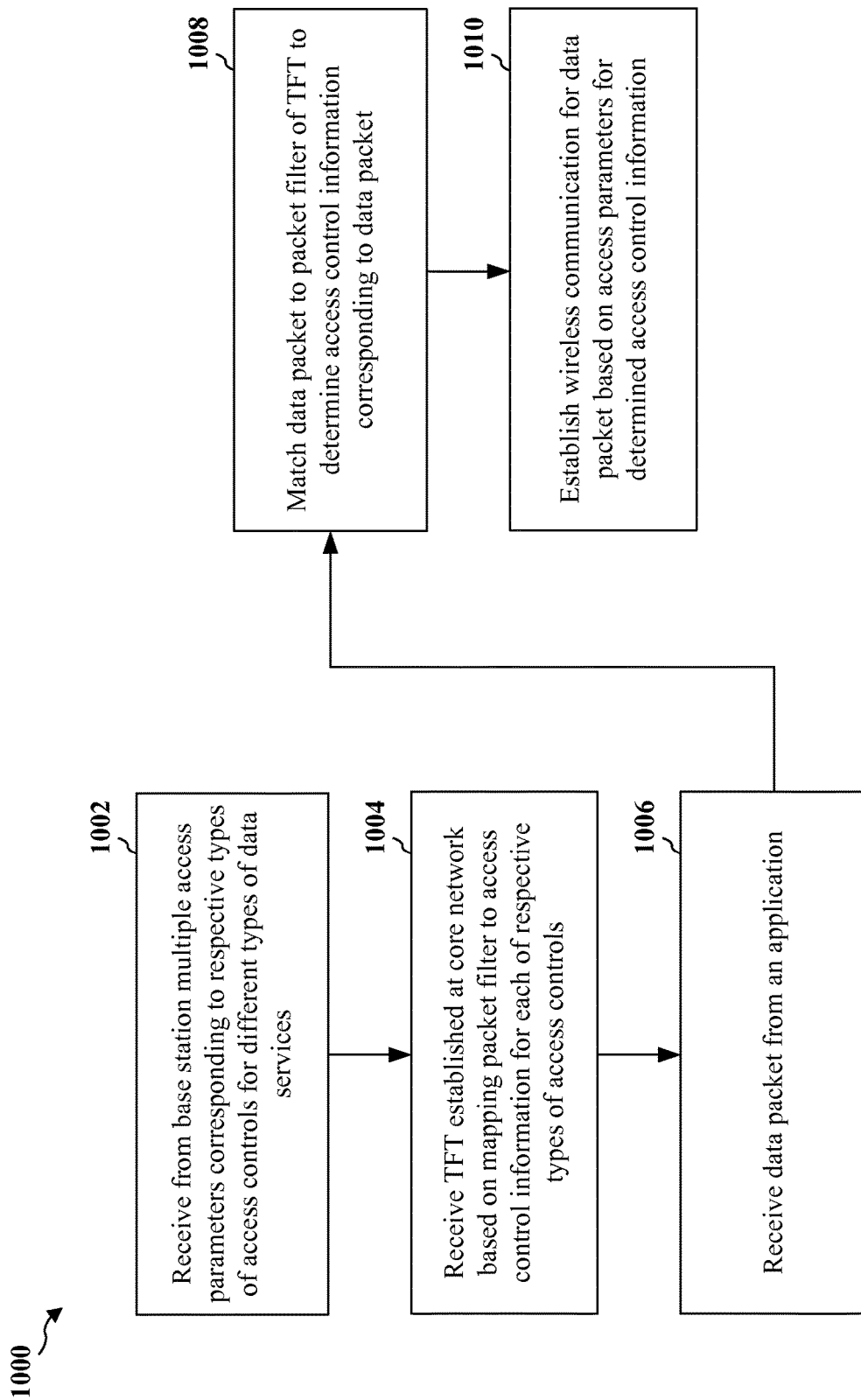
FIG. 10 is a flow chart of a method of wireless communication.

FIG. 10 is a flow chart 1000 of a method of wireless communication according to an aspect of the disclosure. The method may be performed by a UE. At 1002, the UE receives from a base station multiple access parameters corresponding to respective types of access controls for different types of data services. For example, referring back to FIG. 7, the RAN 706 derives access control parameters for each ACC (at 714) and sends the access control parameters to the UE 704 (at 716). In another example, referring back to FIG. 8, at 814, the RAN 806 derives access control parameters for each QoS (at 814) and sends the access control parameters to the UE 804 (at 816). In an aspect, the access control parameters for each QoS may be derived from the access control information included in a corresponding QoS.

At 1004, the UE receives a TFT established at a core network based on mapping a packet filter to access control information for each of the respective types of access controls. For example, referring back to FIG. 7, at 722, the core network (e.g., the HSGW 708, the P-GW 710, or the PDSN) associates the ACCs with packet filters, respectively, and provides the TFT including the packet filters to the UE 704 via the RAN 706. In another example, referring back to FIG. 8, at 822, the core network including the HSGW 808 and/or the P-GW 810 establishes a TFT with the UE 804, and provides the TFT to the UE 804 via the RAN 806.

At 1006, the UE receives a data packet from an application. For example, referring back to FIG. 7, the application 702 sends a data packet (e.g., VoIP call data) to the UE 704 (at 724). In another example, referring back to FIG. 8, the application 802 sends a data packet (e.g., VoIP call data) to the UE 804 (at 824).

At 1008, the UE matches the data packet to the packet filter of the TFT to determine access control information corresponding to the data packet. At 1010, the UE establishes a wireless communication for the data packet based on access parameters for the determined type of access control. For example, referring back to FIG. 7, at 726, the UE 704 matches the data packet to the TFT, determines an ACC that corresponds with the data packet, and applies access procedures to set up a traffic channel for the data packet according to access parameters that correspond with the determined ACC. In another example, referring back to FIG. 8, at 826, the UE 804 matches the data packet to the TFT, determines QoS that corresponds to the data packet, and applies access procedures to set up a traffic channel for the data packet according to access parameters that correspond with the determined QoS.

In an aspect, the UE receives the data packet after establishing a session and establishing the TFT based on the access control information. In such an aspect, the establishing the session includes at least one of establishing an air interface session, establishing a PPP session, or establishing a PDN context. In such an aspect, the TFT includes a flow identifier, the packet filter, QoS information, and/or the access control information.

In an aspect, the packet filter is associated with at least one of an emergency data service or a non-emergency data service. In an aspect, the data services include a VoIP service, a SMS over IP, and/or a chat service over IP.

In an aspect, the access control information includes multiple access control classes respectively corresponding to the multiple types of access controls. In an aspect, the access control information is included in QoS information. In such an aspect, the QoS information includes multiple QoS class identifiers or multiple QoS profile identifiers.

In an aspect, the access control information is based on at least one PDN identifier. In an aspect, the access control information is based on at least one APN. For example, as discussed supra, the RAN may derive access control parameters from each PDN-identifier, and thus a PDN identifier may be used to define an access control for a data service. For example, as discussed supra, the RAN may derive access control parameters from APNs, and thus an APN may be used to define an access control for a data service.

Figure 11:
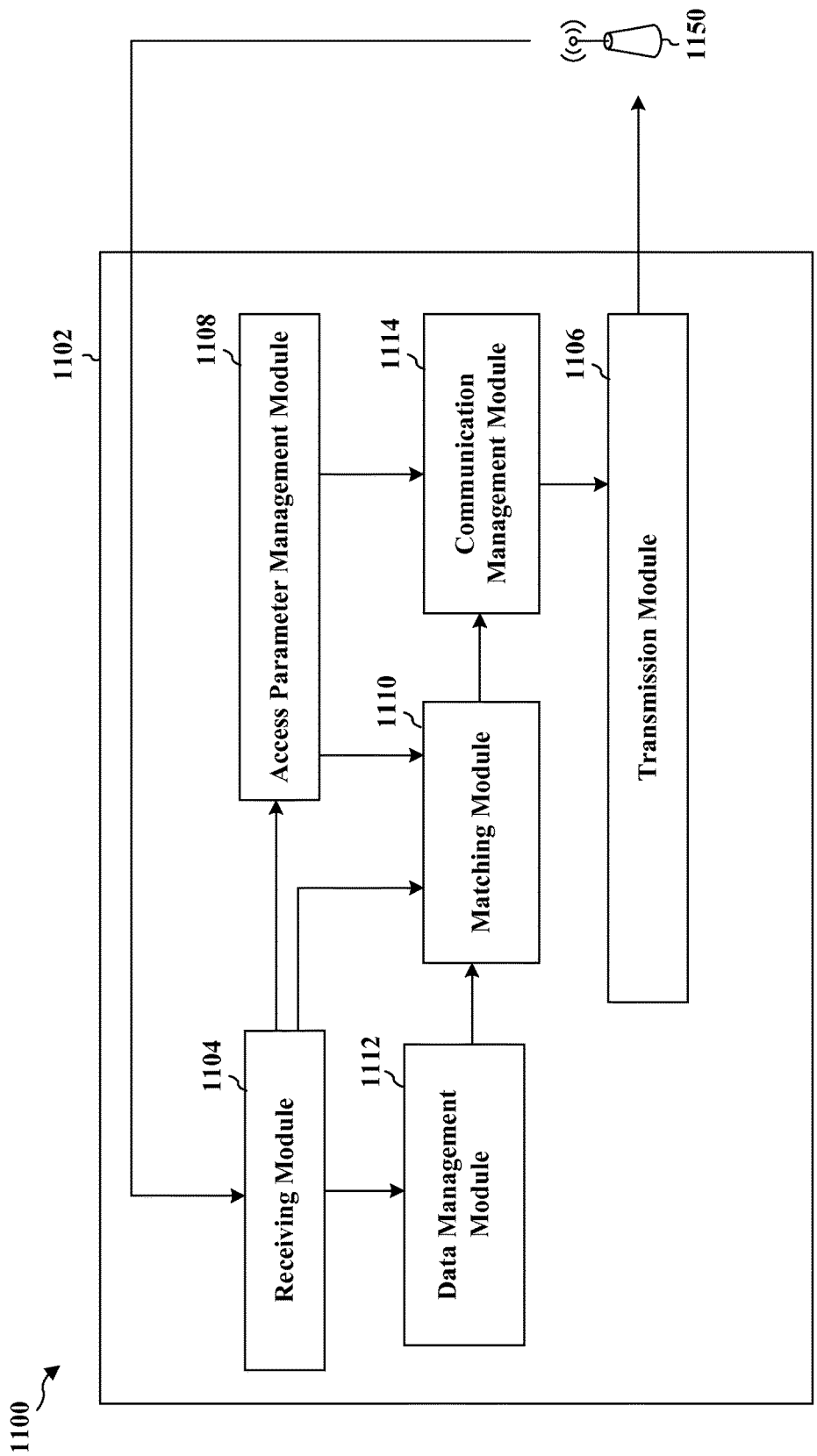
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus includes a receiving module 1104, a transmission module 1106, an access parameter management module 1108, a matching module 1110, a data management module 1112, and a communication management module 1114.

The access parameter management module 1108 receives from an eNB 1150 via the receiving module 1104 multiple access parameters corresponding to respective types of access controls for different types of data services. The matching module 1110 receives via the receiving module 1104 a TFT established at a core network based on mapping a packet filter to access control information for each of the respective types of access controls. The data packet management module 1112 receives via the receiving module 1104 a data packet from an application, and forwards the data packet to the matching module 1110. The matching module 1110 matches the data packet to the packet filter of the TFT to determine access control information corresponding to the data packet. The communication management module 1114 establishes via the transmission module 1106 a wireless communication for the data packet based on access parameters for the determined type of access control.

In an aspect, the data management module 1112 of the UE receives the data packet after establishing a session and establishing the TFT based on the access control information. In such an aspect, the establishing the session includes at least one of establishing an air interface session, establishing a PPP session, or establishing a PDN context. In such an aspect, the TFT includes a flow identifier, the packet filter, QoS information, and/or the access control information.

In an aspect, the packet filter is associated with at least one of an emergency data service or a non-emergency data service. In an aspect, the data services include a VoIP service, a SMS over IP, and/or a chat service over IP.

In an aspect, the access control information includes multiple access control classes respectively corresponding to the multiple types of access controls. In an aspect, the access control information is included in QoS information. In such an aspect, the QoS information includes multiple QoS class identifiers or multiple QoS profile identifiers.

In an aspect, the access control information is based on at least one PDN identifier. In an aspect, the access control information is based on at least one APN.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
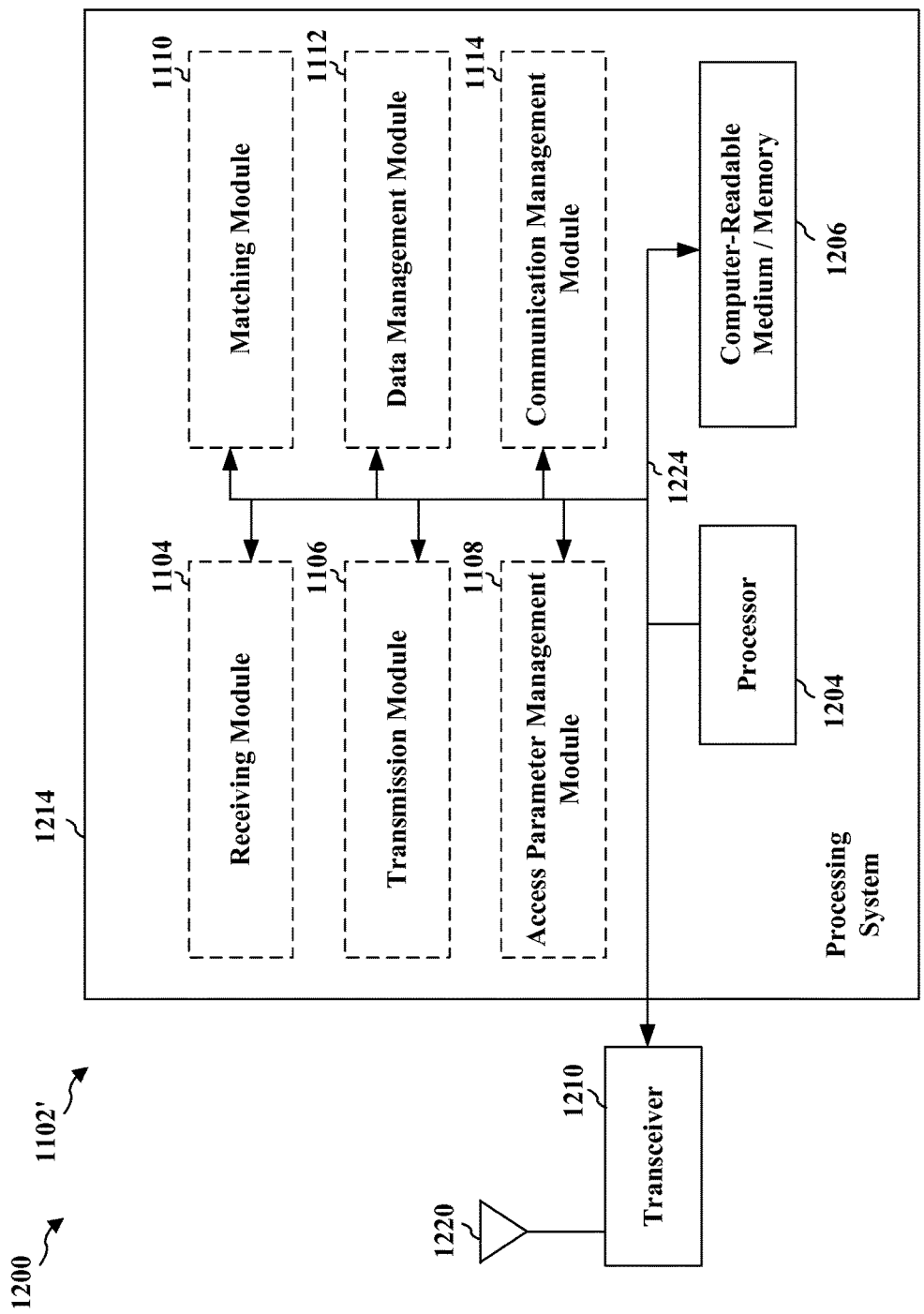
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, 1112, and 1114. The modules may be software modules running in the processor 1204, resident/stored in the computer readable medium/memory 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for receiving from a base station a plurality of access parameters corresponding to respective types of access controls for different types of data services, means for receiving a TFT established at a core network based on mapping a packet filter to access control information for each of the respective types of access controls, means for receiving a data packet from an application, means for matching the data packet to the packet filter of the TFT to determine access control information corresponding to the data packet, and means for establishing a wireless communication for the data packet based on access parameters for the determined type of access control. The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 13:
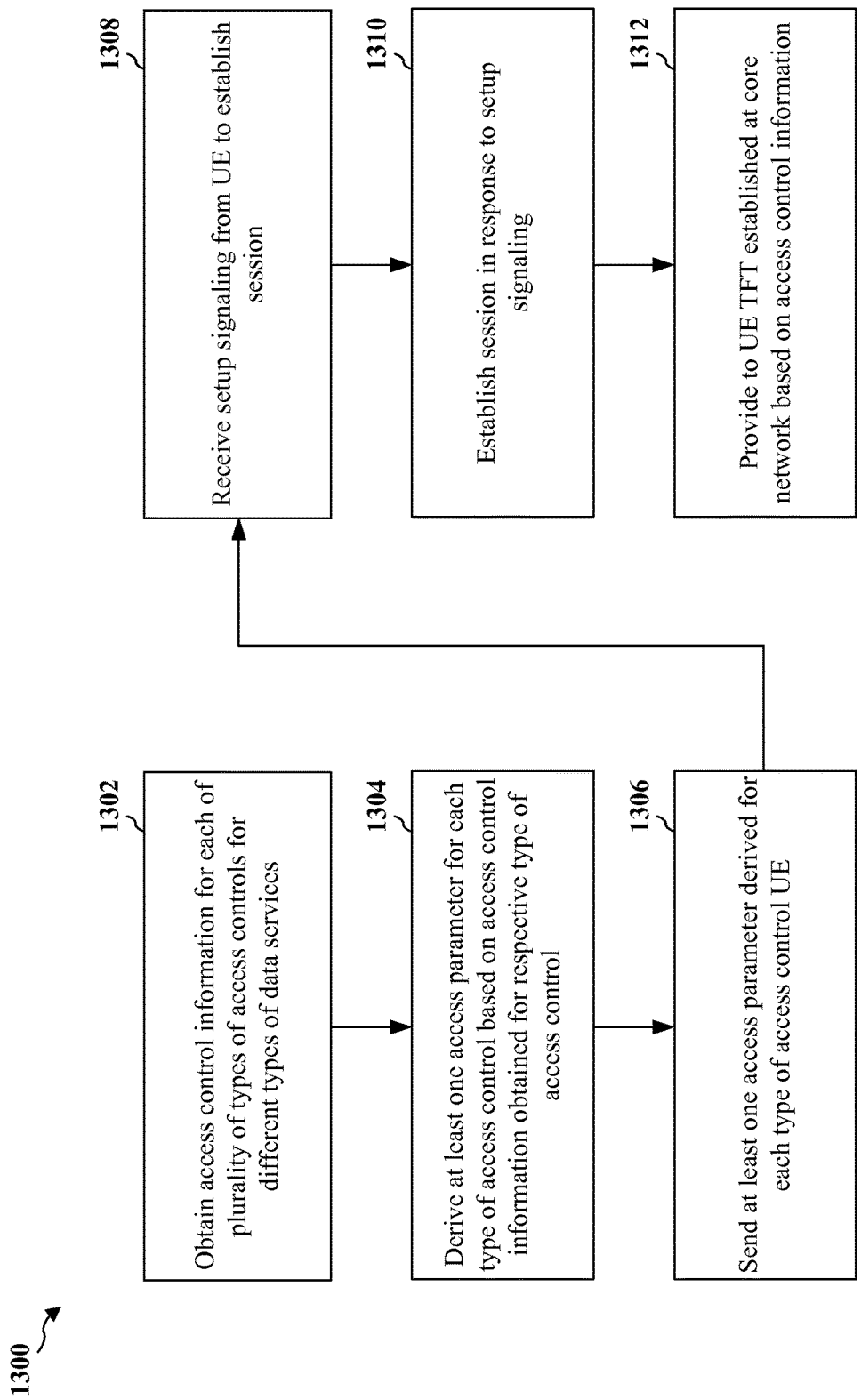
FIG. 13 is a flow chart of a method of wireless communication.

FIG. 13 is a flow chart 1300 of a method of wireless communication. The method may be performed by an eNB. At 1302, the eNB obtains access control information for each of multiple types of access controls for different types of data services. In an aspect, the access control information is obtained from the core network or the access control information is preconfigured at the eNB. For example, referring back to FIG. 7, the RAN 706 determines ACCs for different access controls for different types of data services (at 712). Each ACC may be associated with one or more data services. The RAN 706 may receive the ACCs from the core network or may be preconfigured at the RAN 706. In another example, referring back to FIG. 8, the RAN 806 determines different QoS for different access controls (at 812). The RAN 806 may receive QoS from the core network including the HSGW 808 and/or P-GW 810, or the QoS may be preconfigured at the RAN 806. In an aspect, QoS may include access control information (e.g., a new profile identifier value or a new QCI value) associated with each access control.

At 1304, the eNB derives at least one access parameter for each type of access control class based on the respective access control information obtained. For example, referring back to FIG. 7, the RAN 706 derives access control parameters for each ACC (at 714). In another example, referring back to FIG. 8, the RAN 806 derives access control parameters for each QoS (at 814). The access control parameters for each QoS may be derived from the access control information included in a corresponding QoS.

At 1306, the eNB sends the at least one access parameter derived for each access control class to a UE. For example, referring back to FIG. 7, the RAN 706 sends the access control parameters to the UE 704 (at 716). In another example, referring back to FIG. 8, the RAN 806 sends the access control parameters to the UE 804 (at 816).

At 1308, the eNB receives a setup signaling message from the UE to establish a session. For example, referring back to FIG. 7, the UE 704 sends a session setup signaling to the RAN 706 to establish a session (at 718). The UE 704 and/or the RAN 706 may determine that the access control for the session setup signal is of a high priority. In another example, referring back to FIG. 8, the UE 804 sends a session setup signal to the RAN 806 (at 818). The UE 804 and/or the RAN 806 may determine that the access control for the session setup signal has a high priority.

At 1310, the eNB establishes the session in response to the setup signaling. For example, referring back to FIG. 7, upon receiving the session setup signal (at 720), the RAN 706 establishes a communication session with the UE 704, the HSGW 708, and the P-GW 710. In another example, referring back to FIG. 8, the RAN 806 establishes the session with the UE 804, the HSGW 808, and the P-GW 810 (at 820).

At 1312, the eNB provides to the UE a TFT established at the core network based on the access control information.

For example, referring back to FIG. 7, at 722, the core network including the HSGW 708 and/or the P-GW 710 establishes a TFT with the UE 704, and provides the TFT to the UE 704 via the RAN 706. In another example, referring back to FIG. 8, at 822, the core network including the HSGW 808 and/or the P-GW 810 establishes the TFT with the UE 804, and provides the TFT to the UE 804 via the RAN 806. In an aspect, the data services include a VoIP service, a SMS over IP, and/or a chat service over IP.

In an aspect, the setup signaling is associated with a session establishment including access control with high priority. In an aspect, the establishing the session includes at least one of establishing an air interface session, establishing a PPP session, or establishing a PDN context.

In an aspect, the TFT includes a flow identifier, a packet filter, QoS information, and the access control information. In such an aspect, the QoS information includes multiple QoS class identifiers or multiple QoS profile identifiers.

In an aspect, the establishment of the TFT includes associating the access control information with a packet filter and providing the packet filter to the UE via the TFT. In such an aspect, the packet filter is associated with at least one of an emergency data service or non-emergency data service.

In an aspect, the access control information includes multiple ACCs respectively corresponding to the multiple types of access controls. In an aspect, the eNB obtains QoS information to obtain the access control information that is included in the QoS information, and derives at least one access parameter for each type of access control class based on the respective access control information obtained. Different access control parameters may be generated for each QoS separately. Access control information of each QoS may be associated with one or more specific data services.

In an aspect, the access control information is based on at least one PDN identifier. In an aspect, the access control information is based on at least one APN. For example, as discussed supra, the RAN may derive access control parameters from each PDN-identifier, and thus a PDN identifier may be used to define an access control for a data service. For example, as discussed supra, the RAN may derive access control parameters from APNs, and thus an APN may be used to define an access control for a data service.

Figure 14:
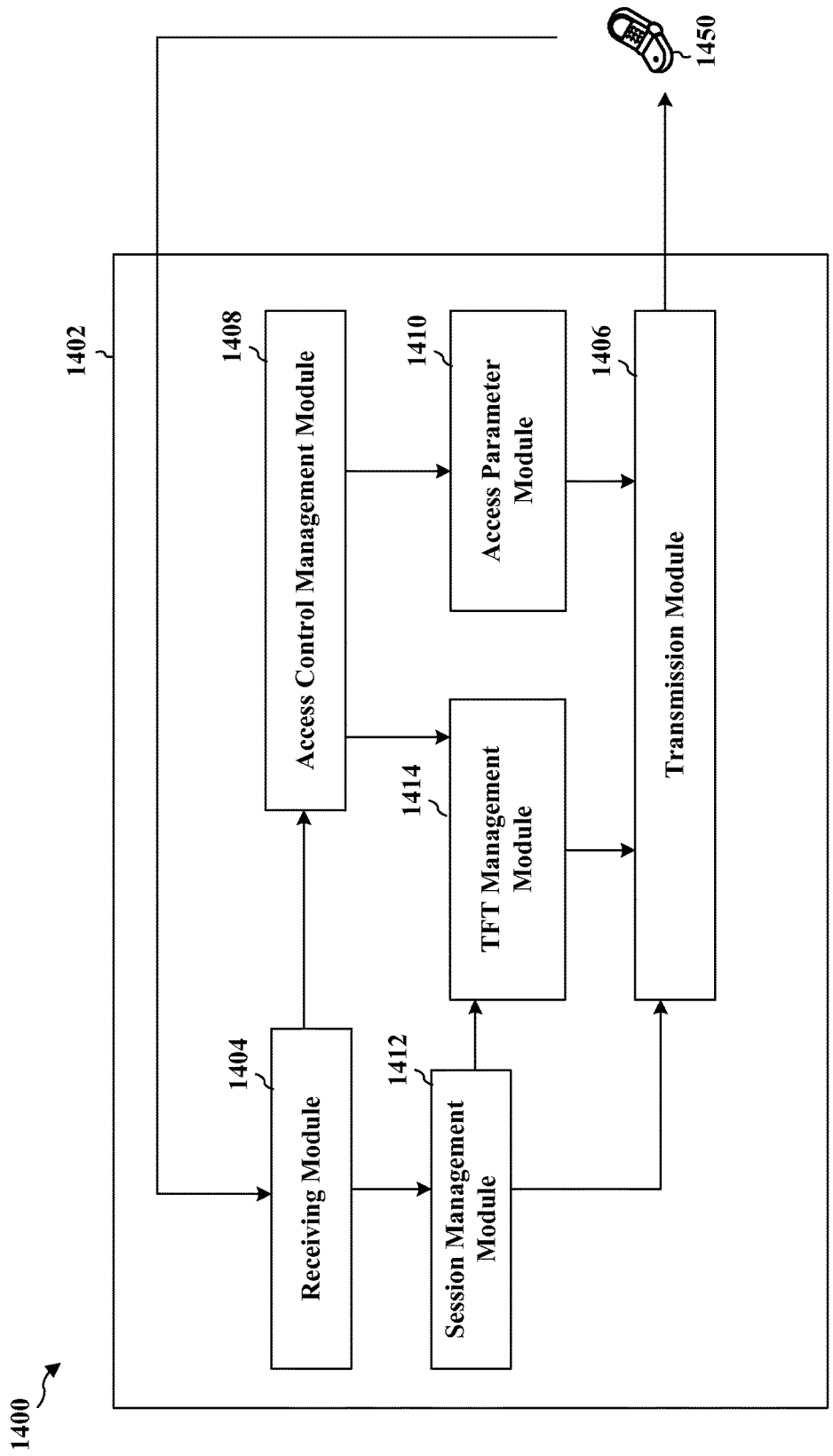
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be an eNB. The apparatus includes a receiving module 1404, a transmission module 1406, an access control management module 1408, an access parameter module 1410, a session management module 1412, and a TFT management module 1414.

The access control management module 1408 obtains access control information for each of multiple types of access controls for different types of data services. The access parameter module 1410 derives at least one access parameter for each type of access control class based on the respective access control information obtained. The transmission module 1406 sends the at least one access parameter derived for each type of access control to a UE 1450. In an aspect, the access control information may be obtained from a core network or the access control information may be preconfigured at the eNB.

The receiving module 1404 receives a setup signaling message from the UE 1450 to establish a session. The session management module 1412 establishes the session in response to the setup signaling message. The TFT management module 1414 provides to the UE 1450 a TFT established at a core network based on the access control information.

The apparatus may include additional modules that perform each of the steps of the algorithm in the aforementioned flow charts of FIG. 13. As such, each step in the aforementioned flow charts of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
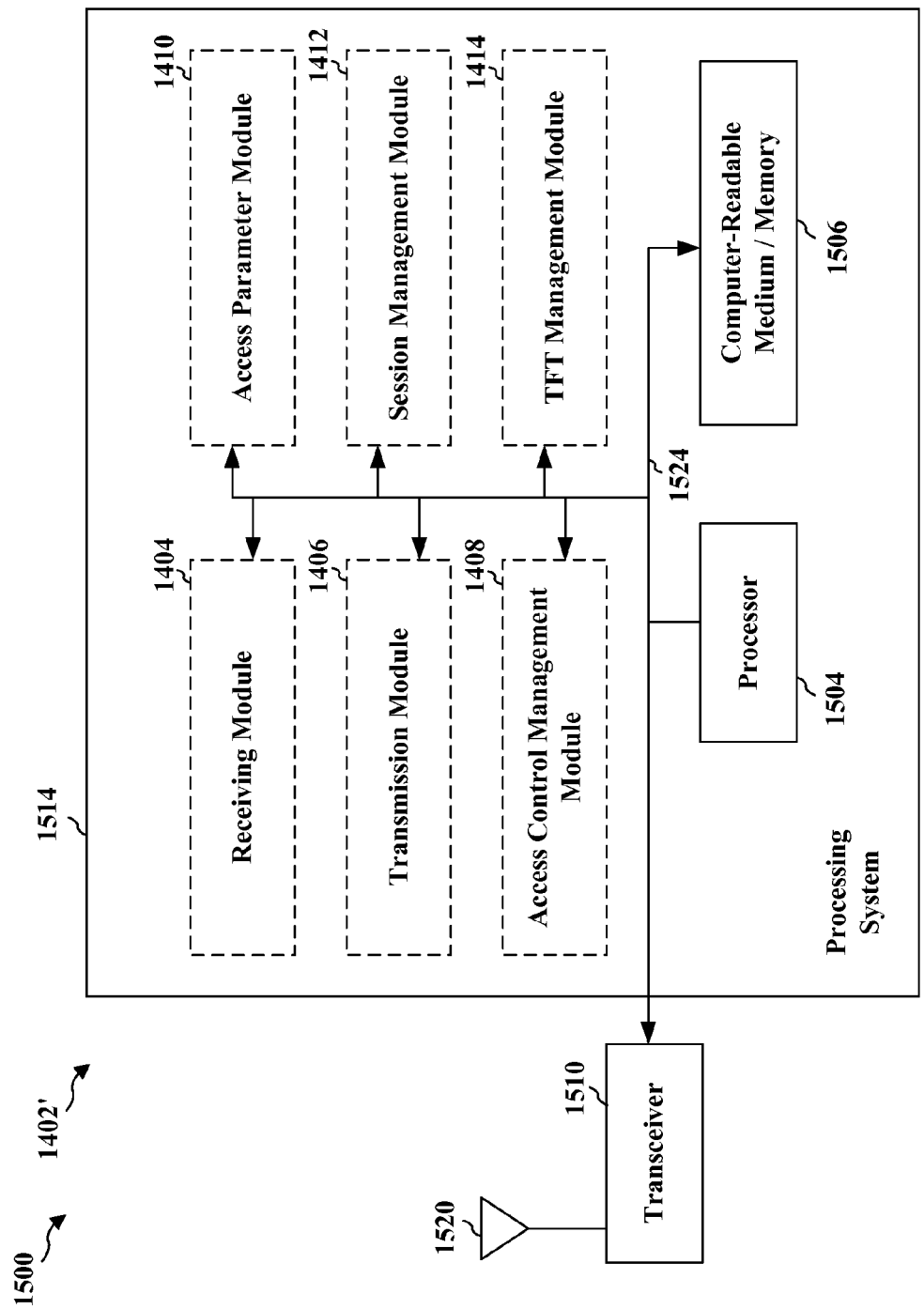
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, 1414, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the receiving module 1404. In addition, the transceiver 1510 receives information from the processing system 1514, specifically the transmission module 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, 1410, 1412, and 1414. The modules may be software modules running in the processor 1504, resident/stored in the computer readable medium/memory 1506, one or more hardware modules coupled to the processor 1504, or some combination thereof. The processing system 1514 may be a component of the eNB 610 and may include the memory 676 and/or at least one of the TX processor 616, the RX processor 670, and the controller/processor 675.

In one configuration, the apparatus 1402/1402' for wireless communication includes means for obtaining access control information for each of a plurality of types of access controls for different types of data services, means for deriving at least one access parameter for each type of access control based on the access control information obtained for a respective type of access control, means for sending the at least one access parameter derived for each type of access control to a UE, and means for providing to the UE a TFT established at a core network based on the access control information. The apparatus 1402/1402' may further include means for receiving a setup signaling from the UE to establish a session, and means for establishing the session in response to the setup signaling. The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 16:
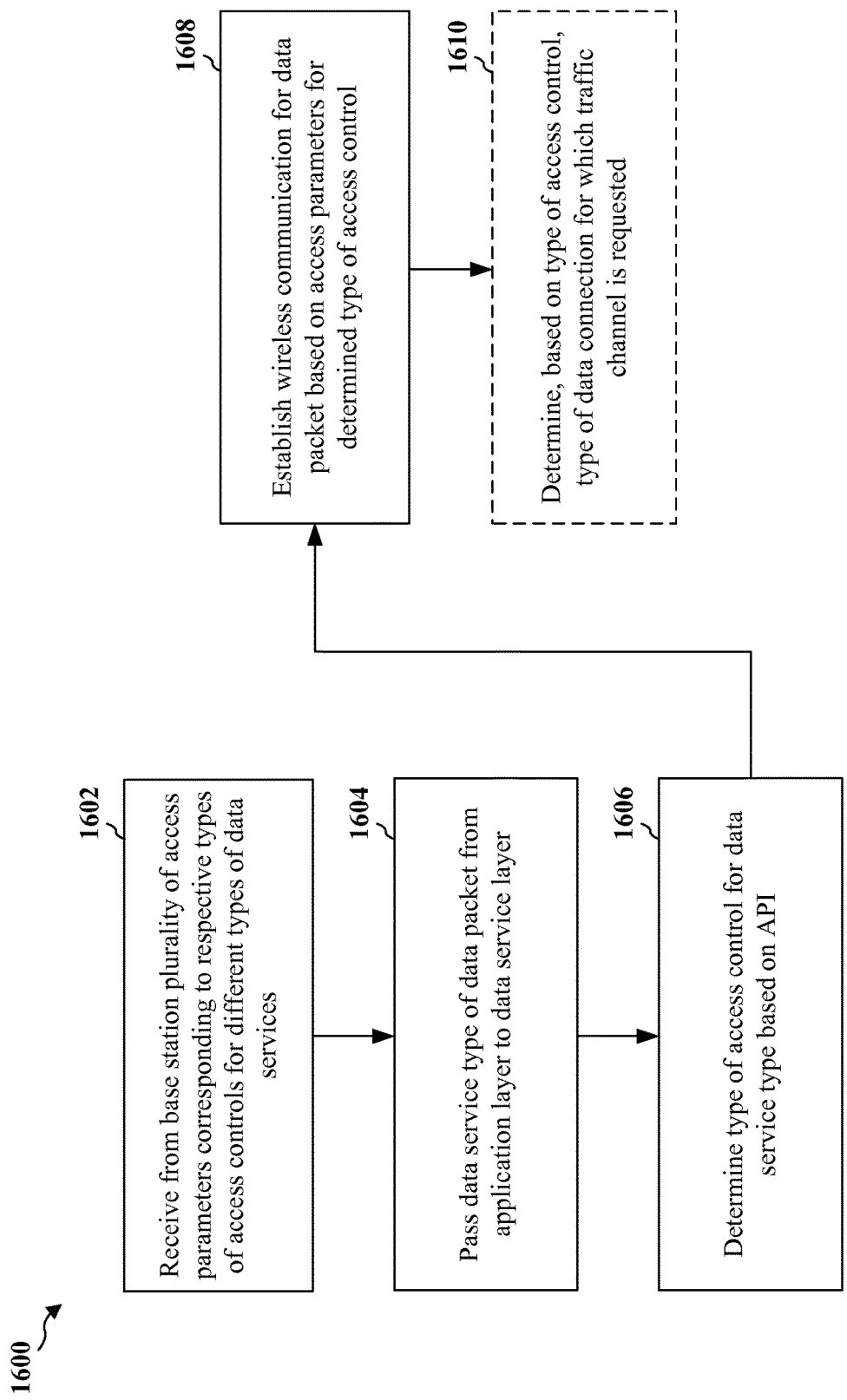
FIG. 16 is a flow chart of a method of wireless communication.

FIG. 16 is a flow chart 1600 of a method of wireless communication. The method may be performed by a UE. At 1602, the UE receives from a base station multiple access parameters corresponding to respective types of access controls for different types of data services. At 1604, the UE passes a data service type of a data packet from an application layer to a data service layer. At 1606, the UE determines a type of access control for the data service type based on an API. For example, as discussed supra with respect to FIG. 9, when an application in the application layer 902 passes a data packet and/or a data service type of the data packet to the data service layer 904, the data service layer 904 may identify the ACC or QoS based on a match between the data packet and a packet filter included in a TFT.

At 1608, the UE establishes a wireless communication for the data packet based on access parameters for the determined type of access control. In an aspect, the API is defined between the data service layer and a modem layer of the UE. In such an aspect, at 1610, the UE determines, based on the type of access control, a type of data connection for which a traffic channel is requested. In another aspect, the API is defined between the application layer and the data service layer to indicate a QoS or ACC of the data packet.

In an aspect, the UE may receive access control parameters derived from ACCs or access control information included in QoS for different types of data service. The UE may apply access procedures to request for traffic channel setup for the data packet based on access parameters for the indicated type of access control.

In an aspect, the data connection is associated with at least one of an emergency data service and a non-emergency data service. In such an aspect, the data services may include a VoIP service, an SMS over IP, and/or a chat service over IP.

Figure 17:
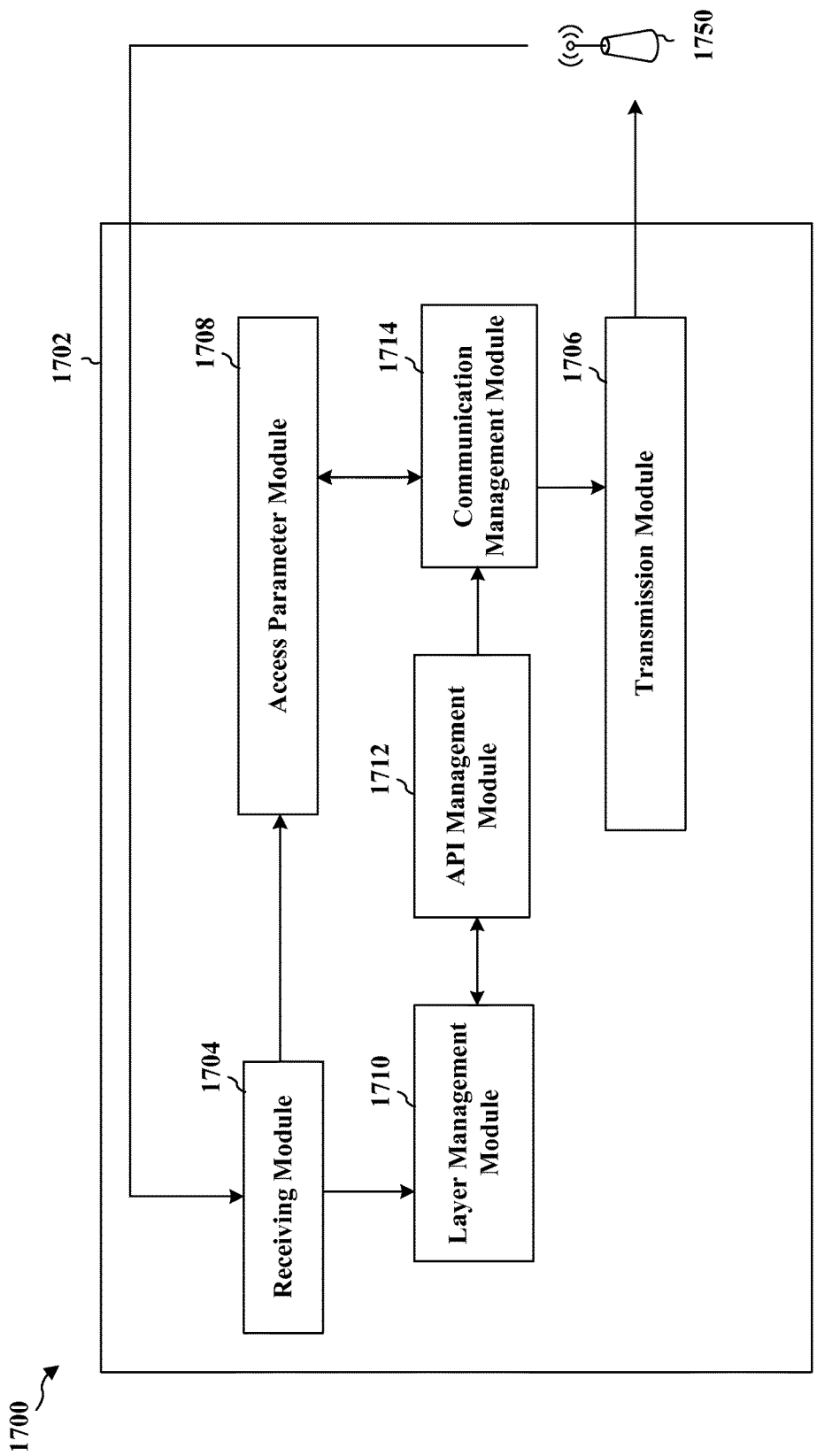
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a UE. The apparatus includes a receiving module 1704, a transmission module 1706, an access parameter module 1708, a layer management module 1710, an API management module 1712, and a communication management module 1714.

The access parameter module 1708 receives via the receiving module 1704 from an eNB 1750 multiple access parameters corresponding to respective types of access controls for different types of data services. The layer management module 1710 passes a data service type from an application layer to a data service layer. The API management module 1712 determines a type of access control for the data service type based on an API. The communication management module 1714 establishes a wireless communication for the data packet based on access parameters for the determined type of access control. In an aspect, the API is defined, via the layer management module 1710 and the API management module 1712, between the data service and a modem layer of the UE. In such an aspect, at 1610, the communication module 1714 determines, based on the type of access control, a type of data connection for which a traffic channel is requested. In another aspect, the API is defined, via the layer management module 1710 and the API management module 1712, between the application layer and the data service layer.

In an aspect, the data connection is associated with at least one of an emergency data service and a non-emergency data service. In such an aspect, the data services include a VoIP service, an SMS over IP, and a chat service over IP.

The apparatus may include additional modules that perform each of the steps of the algorithm in the aforementioned flow charts of FIG. 16. As such, each step in the aforementioned flow charts of FIG. 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
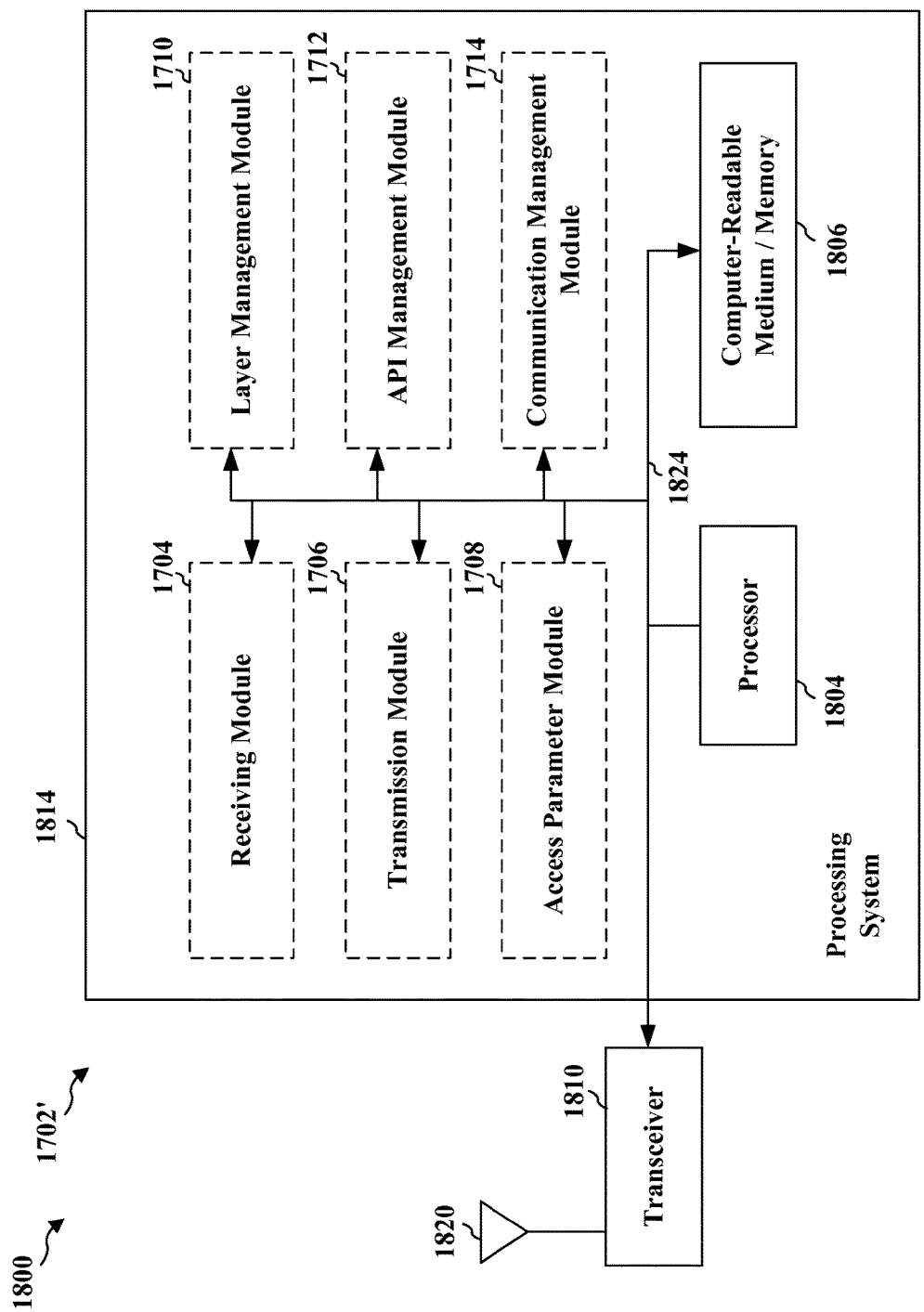
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, 1712, 1714, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the receiving module 1704. In addition, the transceiver 1810 receives information from the processing system 1814, specifically the transmission module 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system further includes at least one of the modules 1704, 1706, 1708, 1710, 1712, and 1714. The modules may be software modules running in the processor 1804, resident/stored in the computer readable medium/memory 1806, one or more hardware modules coupled to the processor 1804, or some combination thereof. The processing system 1814 may be a component of the UE 650 and may include the memory 660 and/or at least one of the TX processor 668, the RX processor 656, and the controller/processor 659.

In one configuration, the apparatus 1702/1702' for wireless communication includes means for receiving from a base station a plurality of access parameters corresponding to respective types of access controls for different types of data services, means for passing a data service type of a data packet from an application layer to a data service layer, means for determining a type of access control for the data service type based on an API, and means for establishing a wireless communication for the data packet based on access parameters for the determined type of access control. The apparatus 1702/1702' may further include means for determining, based on the type of access control, a type of data connection for which a traffic channel is requested. The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figures 19A, 19B:
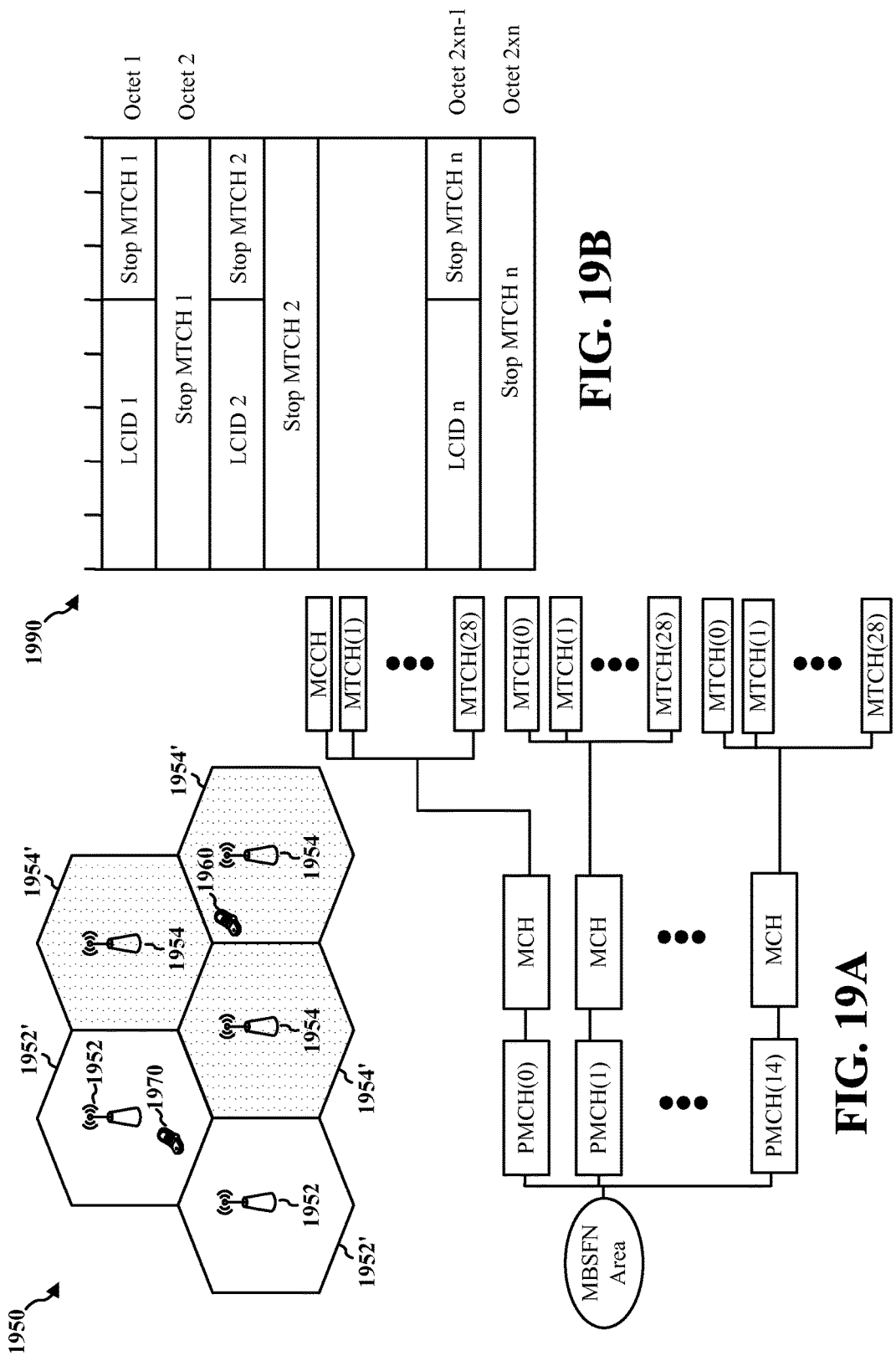
FIG. 19A is a diagram illustrating an example of an evolved Multimedia Broadcast Multicast Service channel configuration in a Multicast Broadcast Single Frequency Network.
FIG. 19B is a diagram illustrating a format of a Multicast Channel Scheduling Information Media Access Control control element.

FIG. 19A is a diagram 1950 illustrating an example of an evolved MBMS (eMBMS) channel configuration in an MBSFN. The eNBs 1952 in cells 1952' may form a first MBSFN area and the eNBs 1954 in cells 1954' may form a second MBSFN area. The eNBs 1952, 1954 may each be associated with other MBSFN areas, for example, up to a total of eight MBSFN areas. A cell within an MBSFN area may be designated a reserved cell. Reserved cells do not provide multicast/broadcast content, but are time-synchronized to the cells 1952', 1954' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 19A, the first MBSFN area may support a first eMBMS broadcast service, such as by providing a particular news broadcast to UE 1970. The second MBSFN area may support a second eMBMS broadcast service, such as by providing a different news broadcast to UE 1960. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 may indicate (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 19B is a diagram 1990 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Many wireless applications operating on UEs function in a client-server model. That is, a wireless application often acts like a client communicating with an Internet-resident application server that provides the service associated with the application to the UE. For example, a user launches a navigation application on the UE, and the navigation application initiates a communication with the navigation application server. The UE informs the application server of the UE's initial position and intended destination. The navigation application server then computes the optimum route between the initial position and the intended destination. The navigation application server downloads a map to the UE along with the computed route. As the UE progresses along the route towards the destination, the navigation application server may display points of interest and update traffic information along the route as well as any route updates in case the UE has taken a turn away from the initially computed route.

In the above example, the navigation application may require many client-server interactions in the course of fulfilling the service. Considering that popular applications may be used in many UEs, application servers implementing these popular applications can often be heavily loaded. When an application server is excessively loaded, the application server may indicate to the client attempting to reach the application server that the application server is busy. Client-server protocols used for communicating server status contain error codes that the application server may use to indicate that the application server is currently too busy. The application server may ask the client to back off or slow down the client requests for service. In some situations, however, the existing client-server protocols and error codes may not be sufficient. For example, the application server may be down or completely disconnected from the Internet. Alternatively, the application server may be too overloaded to respond to new client requests. As a result, there may be many failed attempts by multiple clients to reach the application server before the clients become aware of the application server's status. This could cause severe and unnecessary network traffic. As such, a need exists to reduce the impact on application servers when application servers encounter problems.

Figure 20:
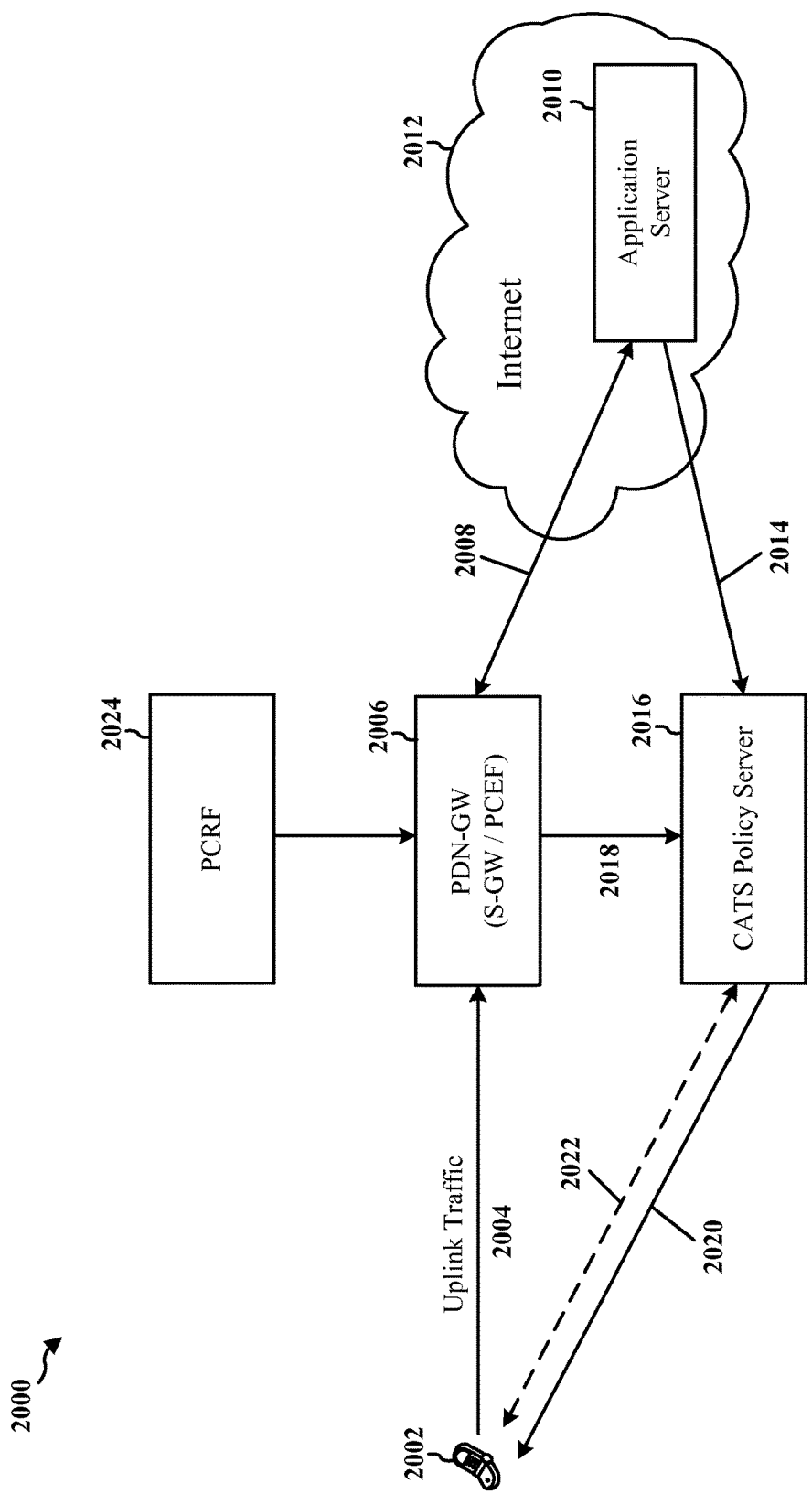
FIG. 20 is a diagram of a wireless device centered solution for reducing the impact on application servers encountering problems.

FIG. 20 is a diagram 2000 of a wireless device centered solution for reducing the impact on application servers encountering problems. As shown in FIG. 20, a UE 2002 may be running an application (e.g., a navigational application). The application may be required to initiate communication with an application server 2010 through the Internet 2012. For example, the navigational application may submit a route request to the application server 2010. To communicate with the application server 2010, the application may instruct the UE 2002 to transmit data 2004 to the application server 2010 through a network entity such as a PDN Gateway 2006 (e.g., the PDN Gateway 118). In some instances, the PDN Gateway 2006 may also include a Serving Gateway (e.g., the Serving Gateway 116) and/or a policy and charging enforcement function (PCEF). The PCEF is a network/functional entity that performs policy enforcement along with charging functionalities. The PCEF controls traffic handling and quality of service (QoS) at a gateway (e.g., PDN Gateway 2006) over the user plane. An integral role of the PCEF is to perform service data flow detection. The PCEF may select an appropriate policy and charging control (PCC) rule used for evaluating received data against the service data flow filters of the PCC rule. As such, the PCEF may filter data by not transmitting the data to a destination (e.g., the application server 2010).

Continuing with the above example, when the data 2004 transmitted by the UE 2002 arrives at the PDN Gateway 2006, the PDN Gateway 2006 may forward the data 2008 to the application server 2010. However, if many UEs are transmitting to the application server 2010 at the same time, the application server 2010 may become overwhelmed. For example, if many users attempt to access the navigational application, the navigational application server may become overwhelmed and unable to respond to all the routing requests.

In one configuration, the application server 2010 may request assistance in managing the traffic flow from UEs. The application server 2010 may transmit a request for traffic control 2014 to a control of application third-party server (CATS) policy server (PS) (CATS PS) 2016. The request for traffic control 2014 may include the identity of the application server 2010, status information related to the application server 2010, one or more destination IP addresses associated with the application server 2010, and/or one or more IP address/port number pairs associated with the application server 2010. The identity of the application server 2010 may include information such as the application name, the application category, and/or the geographic location of the application server 2010. The status of the application server 2010 may include information related to the ability of the application server 2010 to respond to current and/or additional UE traffic. The one or more destination IP addresses associated with the application server 2010 may include any IP addresses related to the application server 2010 (e.g., an IP address for a physical server on which the application server 2010 is located). The one or more IP address/port number pairs may include an IP address associated with the application server 2010 and a port number associated with the overloaded application and the application server 2010. For example, if the navigational application server becomes overwhelmed, the navigational application server may transmit a request for traffic control to the CATS PS 2016. The request for traffic control may include information indicating the name of the navigational application, information indicating that the navigational application server needs assistance handling application data traffic, and information indicating the IP addresses of the application server encountering problems. In another example, if an application server hosts multiple applications and only the hosted navigational application is overwhelmed (e.g., exceeded traffic quota), the request for traffic control may include information indicating the name of the navigational application, information indicating that the application server needs assistance handling the navigational application data traffic, and information indicating the IP address of the application server and the port number(s) associated with the navigational application.

In another configuration, instead of the application server 2010 transmitting the request for traffic control 2014, the PDN Gateway 2006 may transmit a request for traffic control 2018 to the CATS PS 2016 upon determining a status of the application server 2010. In one aspect, the PDN Gateway may determine the status of the application server 2010 by monitoring transmission control protocol (TCP) traffic from the application server 2010, monitoring a round-trip delay time from the application server 2010, monitoring a type of error/status code received from the application server 2010 (e.g., limited capacity, over capacity, scheduled to be offline, etc.), and/or monitoring a volume of error/status codes received from the application server 2010. Based on such monitoring, the PDN Gateway 2006 may determine that the application server 2010 is offline and/or needs assistance to handle the traffic. The PDN Gateway 2006 may transmit the request for traffic control 2018 to the CATS PS 2016 on behalf of the application server 2010 based on the determined status of the application server 2010. The request for traffic control 2018 may include the identity of the application server 2010, status information related to the application server 2010, one or more destination IP addresses associated with the application server 2010, and/or one or more IP address/port number pairs associated with the application server 2010. The identity of the application server 2010 may include information such as the application name, the application category, and/or the geographic location of the application server 2010. The status of the application server 2010 may include information related to the ability of the application server 2010 to respond to current and/or additional UE traffic. The one or more destination IP addresses associated with the application server 2010 may include any IP addresses related to the application server 2010 (e.g., an IP address for a physical server on which the application server 2010 is located). The one or more IP address/port number pairs may include an IP address associated with the application server 2010 and a port number associated with the overloaded application and the application server 2010. For example, the PDN Gateway 2006 may determine that a navigational application server has received a large amount of TCP traffic and that the round trip delay time has increased beyond a threshold (e.g., 5 seconds). Based on the determined status of the navigational application server, the PDN Gateway 2006 transmits a request for traffic control to the CATS PS 2016. The request for traffic control may include the name of the navigational application, the amount of TCP traffic received and the average round trip delay time, and the destination IP addresses of the application server encountering problems along with one or more port numbers associated with the navigational application and the application server. Although the aforementioned configuration has been discussed with respect to a PDN Gateway, a Serving Gateway and PCEF entity may also be used.

Once the CATS PS 2016 receives at least one of the requests for traffic control 2014, 2018 from either the application server 2010 or the PDN Gateway 2006 (or both), the CATS PS 2016 may determine a policy update for the application server 2010 based on the received request for traffic control 2014, 2018. In one aspect, based on the request for traffic control 2014, if the CATS PS 2016 determines that the application server 2010 can handle all the UE traffic, the CATS PS 2016 may determine that no restriction or suppression of data 2008 is required for the application server 2010. In another aspect, based on the request for traffic control 2014, if the CATS PS 2016 determines that the application server 2010 is offline or can no longer respond to requests from any UE (e.g., the UE 2002), the CATS PS 2016 may determine to update the policy for the application server 2010 such that all data to be transmitted from the UE 2002 to the application server 2010 is to be restricted. In another aspect, based on the request for traffic control 2014, if the CATS PS 2016 determines that the application server 2010 is still online but can only handle a limited amount of UE traffic, the CATS PS 2016 may determine that a fraction of UEs may be permitted to transmit to the application server 2010. Having determined whether to restrict data transmission to the application server 2010, the CATS PS 2016 may enact a policy update to restrict/throttle the data 2004 to be transmitted to the application server 2010. In one configuration, the CATS PS 2016 may cache the destination IP addresses of application servers frequently known to encounter problems.

In another configuration, the functionality of the CATS PS 2016 may be performed by a policy and charging rules function entity (PCRF) 2024, and therefore, only the PCRF 2024 is present. The PCRF 2024 is a policy functional entity that aggregates information inside a network and makes policy decisions for each subscriber. The PCRF 2024 is the entity that applies PCC rules to the PCEF using a gateway interface between the PCEF (which may be within the PDN Gateway 2006) and the PCRF 2024.

Having determined a policy update, the CATS PS 2016 (or the PCRF 2024, if the CATS PS 2016 has been subsumed into the PCRF 2024) may transmit a policy update 2020 to the UE 2002 (and other UEs).

The policy update 2020 may be transmitted in a number of ways. In one configuration, the policy update 2020 may be transmitted in a SIB. In another configuration, the policy update 2020 may be transmitted in an MBMS transmission. In another configuration, the policy update 2020 may transmitted in a hypertext transfer protocol (HTTP) connection or via Server-Sent Events (SSE). For example, an HTTP client in the UE 2002 may set up a long-lived TCP connection with the CATS PS 2016. The CATS PS 2016 may use the HTTP/TCP connection to push asynchronous notifications (e.g., the policy update 2020) to the UE 2002.

In yet another configuration, the UE 2002 may periodically poll 2022 the CATS PS 2016 for the policy update 2020, and when the policy update 2020 is available, the CATS PS 2016 may transmit the policy update 2020 to the UE 2002.

In yet another configuration, the CATS PS 2016 may cause a paging signal 2022 to be sent to the UE 2002 to trigger a request for the policy update 2020 from the UE 2002. Upon receiving the paging signal 2022, the UE 2002 may request the policy update 2020 from the CATS PS 2016. Upon receiving the request from the UE 2002, the CATS PS 2016 may transmit the policy update 2020 to the UE 2002.

The aforementioned methods for transmitting the policy update 2020 to the UE 2002 are not exclusive. One or more of the aforementioned methods may be used. Among the methods, however, the broadcast methods (i.e., transmitting the policy update 2020 in a SIB or an MBMS transmission) may be preferable because broadcasting does not require extensive client-server interactions as a result of a policy update, which could tax the radio interface and drain battery power in the UE 2002. Further, by virtue of forward error correction encoded content, MBMS procedures can be effective and efficient in conveying the policy update 2020 to the UE 2002. One disadvantage with broadcast methods, such as MBMS transmission, however, is that not all UEs may be compatible with MBMS and not all UEs may be engaged with the troubled application server 2010 during the affected time.

The policy update 2020 may indicate to the UE 2002 whether to restrict data 2004 from being transmitted from the UE 2002 (and other UEs) to one or more destination IP addresses associated with the application server 2010 or to one or more IP address/port number pairs associated with the application server 2010. In one configuration, when the application server 2010 hosts only one application, the policy update 2020 may indicate whether to restrict data 2004 from being transmitted from the UE 2002 to one or more destination IP addresses associated with the application server. In another configuration, when the application server 2010 hosts multiple applications, and only a subset of which may be overloaded, the policy update 2020 may indicate whether to restrict data 2004 from being transmitted to one or more IP address/port number pairs associated with the application server 2010. In this configuration, each port number in the IP address/port number pair is associated with an overloaded application. In this configuration, rather than restricting all data from being transmitted to the application server 2010, only data related to the overloaded application will be restricted and data unrelated to the application may still be sent to the application server 2010. The policy update 2020 may include a probability value related to a probability of restricting data from being transmitted from the UE 2002 to one or more destination IP addresses associated with the application server 2010 or to one or more IP address/port number pairs associated with the application server 2010. The policy update 2020 may include a validity period in which, upon expiration of the validity period, the policy update 2020 is no longer effective. For example, if the policy update 2020 indicates that all data 2004 from the UE 2002 is to be suppressed, once the validity period of the policy update 2020 expires, the UE 2002 returns to the previous (e.g., unrestricted) regime of operation.

Upon receiving the policy update 2020, the UE 2002 may update the policy for the application corresponding to the application server 2010. If the UE 2002 launches the application, the UE 2002 may produce a packet of data 2004 to be communicated to the application server 2010. Before any transmission takes place, however, the UE 2002 may determine the current policies in effect for the application. Based on the information in the received policy update 2020, the UE 2002 may determine whether to restrict data from being transmitted to one or more destination IP addresses associated with the application server 2010 or to one or more IP address/port number pairs associated with the application server 2010. As previously stated, the policy update 2020 may indicate whether to restrict data from being transmitted to one or more IP addresses associated with the application server 2010 or to one or more IP address/port number pairs associated with the application server 2010. In one configuration, the policy update 2020 may indicate that the UE 2002 is to restrict all data 2004 to be transmitted to the IP address associated with the application server 2010. For example, if the application server 2010 is offline, the policy update 2020 may indicate to the UE 2002 to suppress all information intended for the application server 2010. In another configuration, the policy update 2020 may indicate that the UE 2002 need not restrict the transmission of data 2004 to the application server 2010.

In another configuration, the determination of whether to restrict data 2004 from being transmitted to the application server 2010 may be stochastic. In this configuration, the policy update 2020 may include a probability value related to a probability of restricting data from being transmitted from the UE 2002 to one or more destination IP addresses associated with the application server 2010 or to one or more IP address/port number pairs associated with the application server 2010. The probability value may range from 0 (suppress all transmissions) to 1 (allow all transmissions without impediment). The UE 2002 may generate a random number between 0 and 1 and compare the generated random number to the probabilistic value provided to the UE 2002 in the policy update 2020. In one aspect, if the generated random number is greater than the probabilistic value, the UE 2002 restricts the data 2004 from being transmitted and may not proceed with the application launch. Alternatively, when the generated random number is less than the probabilistic value, the UE 2002 may proceed with the application launch and transmit the data 2004 related to the application. An alternative scheme may also be used in which the UE 2002 restricts data 2004 from being transmitted to the application server 2010 when the generated random number is less than the probabilistic value.

In yet another configuration, the policy update 2020 may indicate to the UE 2002 whether to restrict data 2004 from being transmitted based on a validity period associated with the policy update 2020. For example, if the policy update 2020 indicates that all data 2004 from the UE 2002 is to be suppressed and the validity period for the policy update 2020 is 2 hours, the UE 2002 may restrict data 2004 from being transmitted to the application server 2010 for 2 hours. Once the validity period of the policy update 2020 expires, the UE 2002 returns to the previous (e.g., unrestricted) regime of operation.

By restricting/throttling some or all of the data at the UE 2002 (and other UEs), unproductive user plane traffic in wireless networks may be reduced, which may aid in tempering the effects of congestion, when downed or underperforming application server incidents occur during heavy traffic load.

Figure 21:
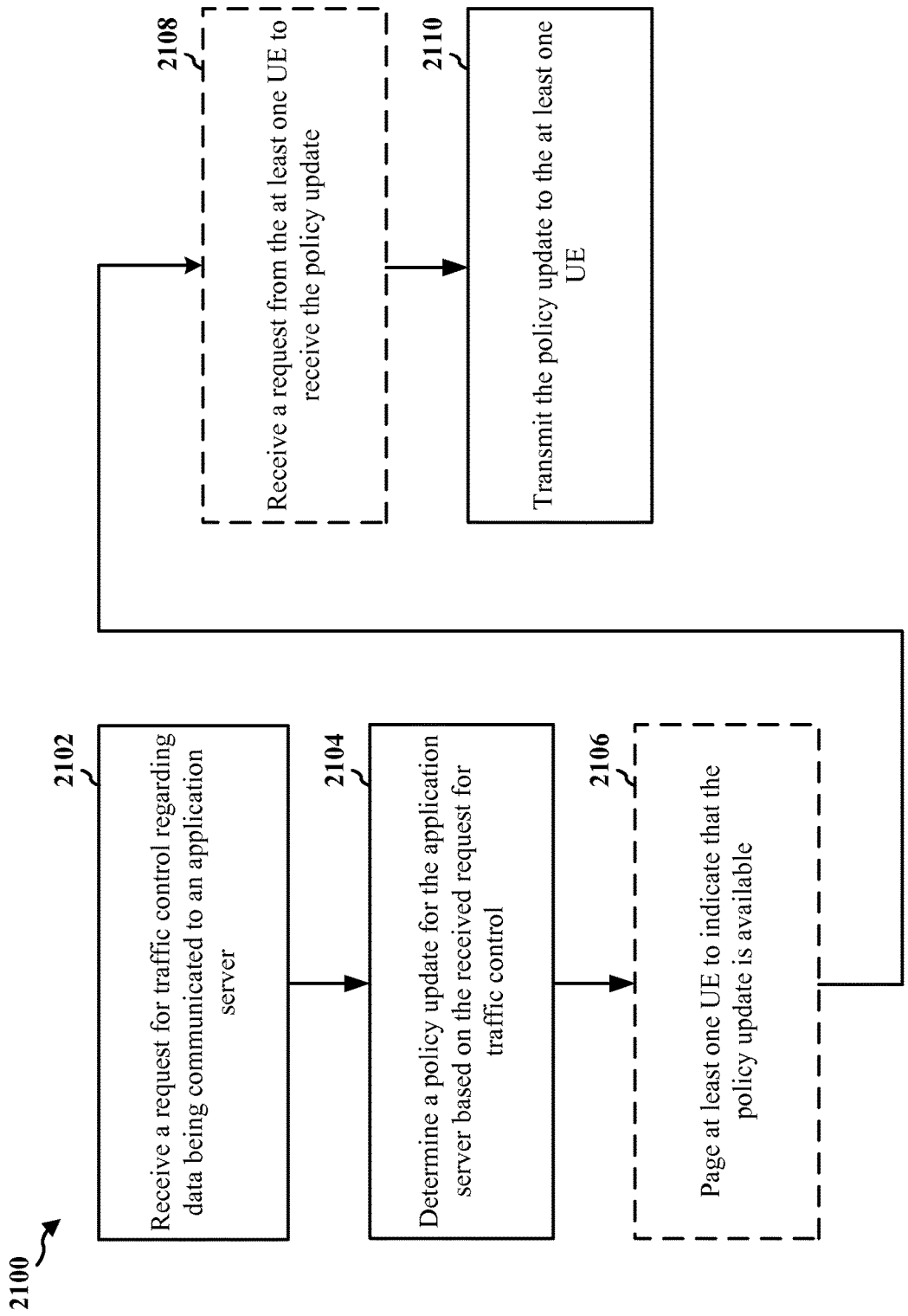
FIG. 21 is a flow chart of an exemplary method of a wireless device centered solution pertaining to a policy server for reducing the impact on application servers encountering problems.

FIG. 21 is a flow chart 2100 of an exemplary method of a wireless device solution pertaining to a policy server for reducing the impact on application servers encountering problems. The method may be performed by a policy server (e.g., the CATS PS 2016, the PCRF 2024, the apparatus 2302/2302'). At step 2102, the policy server may receive a request for traffic control regarding data being communicated to an application server. The request for traffic control may include an identity of the application server, status information for the application server, one or more destination IP addresses associated with the application server, or one or more IP address/port number pairs associated with the application server. The request for traffic control may be received from the application server or from a network gateway. For example, the CATS PS 2016 may receive a request for traffic control 2014, 2018 from the application server 2010 and/or the PDN Gateway 2006, respectively. The request for traffic control 2014 may indicate the name of the application server 2010 (e.g., a navigational application server). The request for traffic control 2014 may indicate that the application server 2010 has limited capacity to handle further UE traffic. The request for traffic control 2014 may include the destination IP addresses for all of the physical servers associated with the application server 2010.

At step 2104, the policy server may determine a policy update for the application server based on the received request for traffic control. In one configuration, the policy update may indicate whether to restrict data from being transmitted from at least one UE to one or more destination IP addresses associated with the application server. In another configuration, the policy update may indicate whether to restrict data from being transmitted from at least one UE to one or more IP address/port number pairs associated with the application server. For example, based on the received request for traffic control 2014, the CATS PS 2016 may determine a policy update for the application server 2010. In this example, the status of the application server 2010 may indicate that the application server 2010 has a long round-trip delay time and thus has limited capacity to handle further UE traffic. As such, the CATS PS 2016 may enact/determine a policy update for the application server 2010 that restricts some data 2004 from being transmitted from the UE 2002 (and other UEs) to one or more destination IP addresses associated with the application server 2010.

In one configuration, the policy update may comprise a probability value related to a probability of restricting data from being transmitted from at least one UE to one or more destination IP addresses associated with the application server or to one or more IP address/port number pairs associated with the application server.

Having determined a policy update, as shown in step 2106, the policy server may page one or more UEs to indicate that the policy update is available. The page may be a trigger for UEs to request the policy update from the policy server.

At step 2108, the policy server may receive a request from one or more UEs requesting to receive the policy update. In one configuration, the request for the policy update may be sent in response to the page. In another configuration, the UE may periodically poll/request the policy server for a policy update. For example, the UE may send a request to the policy server for a policy update every 10 minutes.

At step 2110, the policy server may transmit the policy update to one or more UEs. In one configuration, the policy server may broadcast the policy update to one or more UEs. In one aspect, the policy server may transmit the policy update to one or more UEs in a SIB. In another aspect, the policy server may transmit the policy update to one or more UEs in an MBMS transmission. In another configuration, one or more UEs may set up an HTTP connection or SSE with the policy server. When a policy update becomes available, the UE may asynchronously push the policy update to one or more UEs over the HTTP connection.

Figure 22:
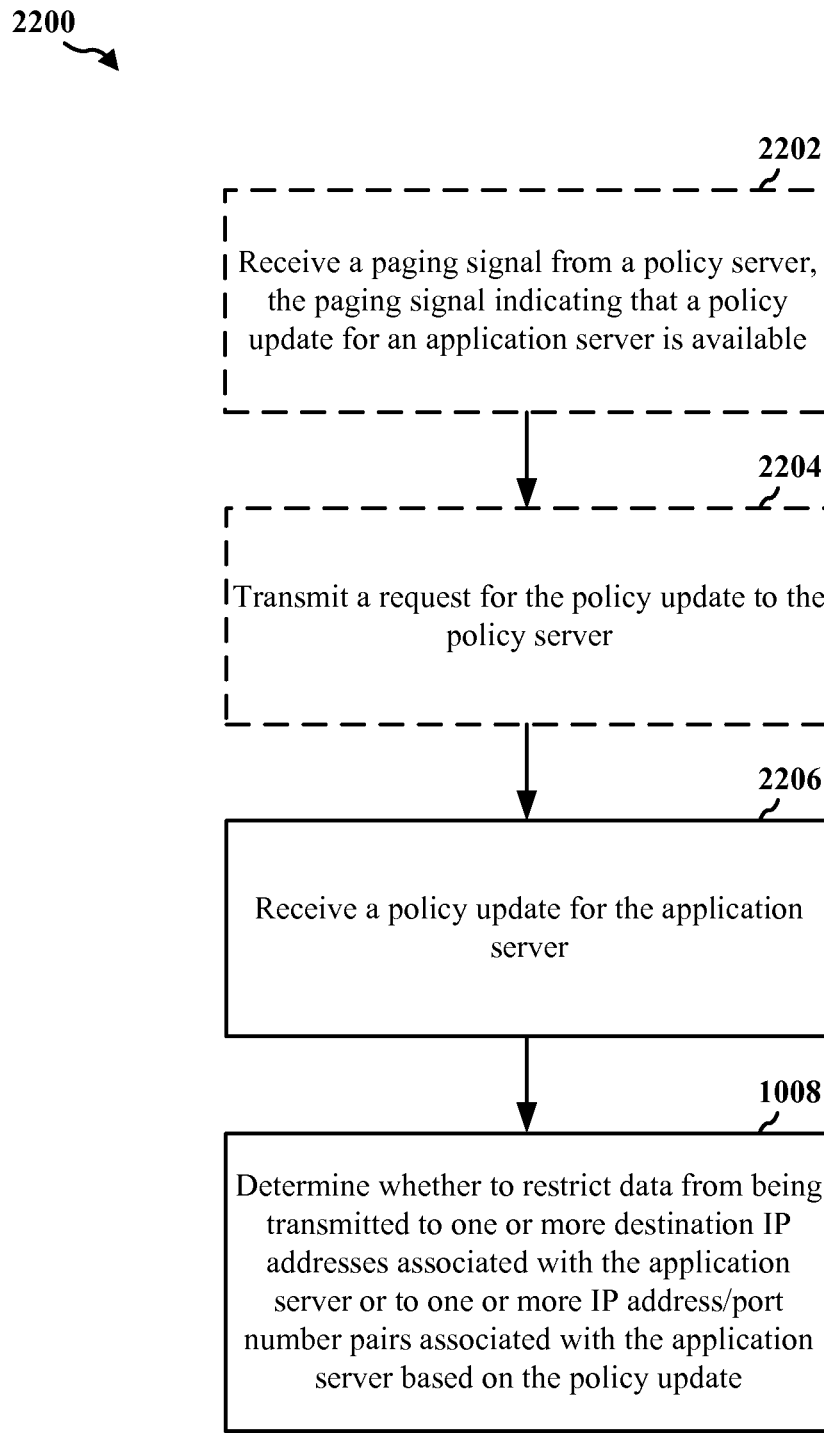
FIG. 22 is a flow chart of an exemplary method of a wireless device centered solution pertaining to a user equipment for reducing the impact on application servers encountering problems.

FIG. 22 is a flow chart 2200 of an exemplary method of a wireless device solution pertaining to a user equipment for reducing the impact on application servers encountering problems. The method may be performed by a UE (e.g., the UE 2002). At step 2202, the UE may receive a paging signal from a policy server in which the paging signal indicates that a policy update for an application is available.

At step 2204, the UE may transmit a request for the policy update to the policy server. In one configuration, the request for the policy update may be transmitted by the UE in response to the paging signal. In another configuration, the UE may periodically poll the policy server for a policy update. For example, the UE may send a request to the policy server for a policy update every 10 minutes.

At step 2206, the UE may receive the policy update for the application server. In one configuration, the policy update is received in response to a request for the policy update from the UE. In another configuration, the policy update may be received in a broadcast. In one aspect, the policy update may be received in a SIB. In another aspect, the policy update may be received in an MBMS transmission. In yet another configuration, the UE may set up an HTTP connection or SSE with the policy server. When a policy update becomes available, the UE may receive the policy update via the HTTP connection or SSE.

At step 2208, the UE may determine whether to restrict data from being transmitted to one or more destination IP addresses associated with the application server or to one or more IP address/port number pairs associated with the application server based on the received policy update. In one configuration, the policy update may indicate whether to restrict data from being transmitted to one or more destination IP addresses associated with the application server or to one or more IP address/port number pairs associated with the application server. For example, the policy update 2020 may indicate that all data transmissions from the UE 2002 to the destination IP address associated with the application server 2010 are to be suppressed. Accordingly, the UE 2002 may restrict transmission of all data 2004 to the application server 2010.

In another configuration, the policy update may include a probability value related to a probability of restricting data from being transmitted to the one or more destination IP addresses associated with the application server or to one or more IP address/port number pairs associated with the application server. The probability value may be between 0 (all data is restricted) and 1 (no restriction). In one aspect, the UE may generate a random number between 0 and 1 and compare the generated random number to the probability value. The UE may determine to suppress transmission of data when the generated random number is greater than the probability value. Alternatively, the UE may determine to suppress transmission of data when the generated random number is less than the probability value. For example, the UE 2002 may receive the policy update 2020 related to the application server 2010, and the policy update 2020 may include a probability value of 0.80. The UE 2002 may have data 2004 to transmit to the application server 2010. Before transmitting the data to the application server 2010, however, the UE 2002 generates a random number of 0.50. If data transmission is to be suppressed when the generated random number is greater than the probability value, then the UE 2002 will not suppress transmission of data 2004 to the application server 2010.

In yet another configuration, the determination of whether to restrict data from being transmitted to the application server is further based on a validity period for the policy update. The validity period may be transmitted with the policy update. For example, if the policy update 2020 indicates that all data 2004 from the UE 2002 is to be suppressed and the validity period for the policy update 2020 is 2 hours, the UE 2002 may restrict all data 2004 from being transmitted to the application server 2010 for 2 hours. Once the validity period of the policy update 2020 expires, the UE 2002 returns to the previous (e.g., unrestricted) regime of operation.

Figure 23:
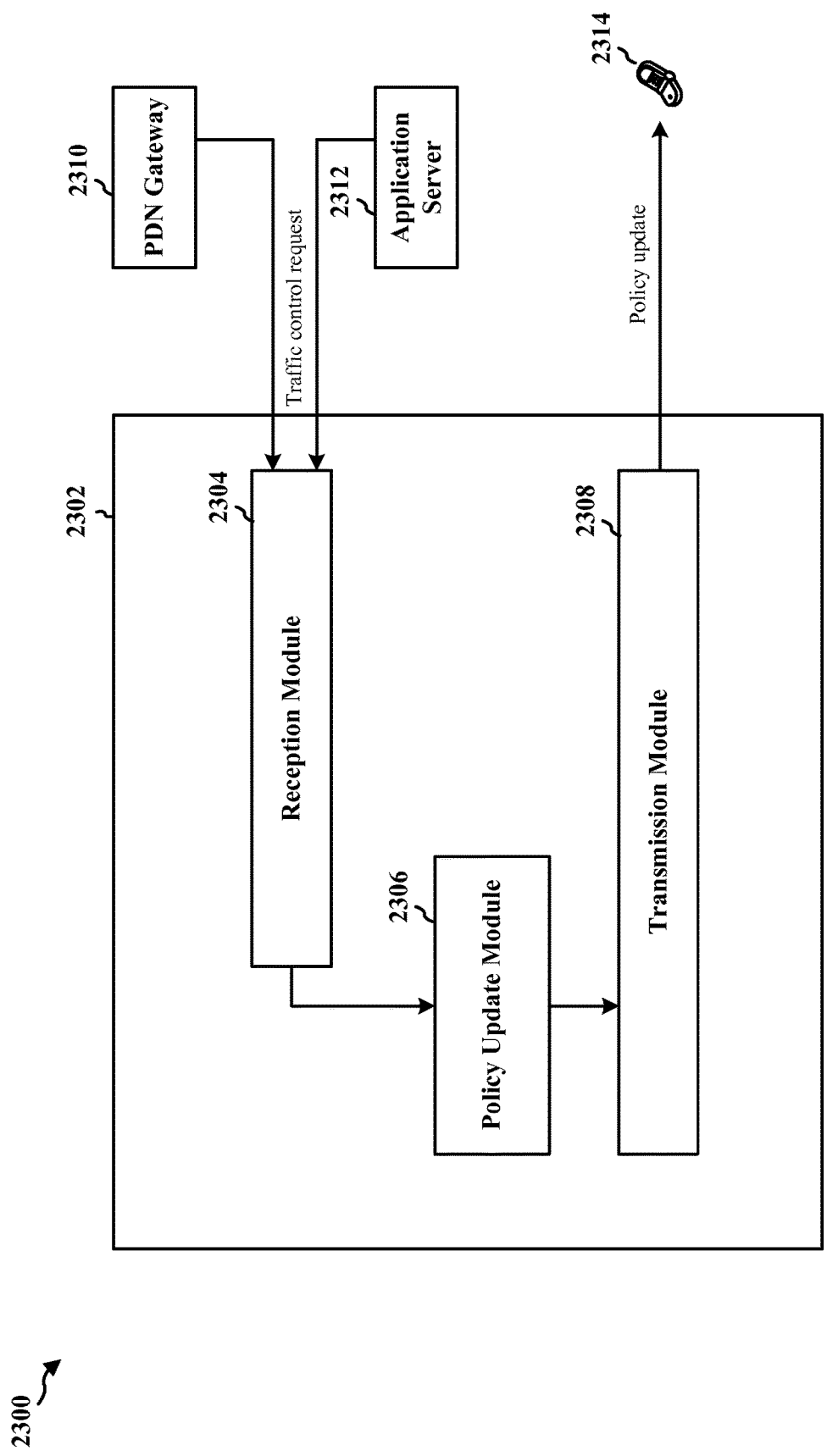
FIG. 23 is a conceptual data flow diagram illustrating the data flow between different modules/means/components in an exemplary apparatus.

FIG. 23 is a conceptual data flow diagram 2300 illustrating the data flow between different modules/means/components in an exemplary apparatus 2302. The apparatus may be a policy server (e.g., the CATS PS 2016, the PCRF 2024). The apparatus includes a reception module 2304, a policy update module 2306, and a transmission module 2308. The reception module 2304 may be configured to receive a request for traffic control regarding data being communicated to an application server 2312. The policy update module 2306 may be configured to determine a policy update for the application server 2312 based on the received request for traffic control. The transmission module 2308 may be configured to transmit the policy update to at least one UE 2314. The request for traffic control may include an identity of the application server 2312, status information for the application server 2312, one or more destination IP addresses associated with the application server 2312, or one or more IP address/port number pairs associated with the application server 2312. The request for traffic control may be received from a network gateway (e.g., the PDN Gateway 2006, the PDN Gateway 2310) or the application server 2312. The policy update may indicate whether to restrict data from being transmitted from at least one UE 2314 to one or more destination IP addresses associated with the application server 2312 or to one or more IP address/port number pairs associated with the application server 2312. The policy update may include a probability value related to a probability of restricting data from being transmitted from at least one UE 2314 to the one or more destination IP addresses associated with the application server 2312 or to one or more IP address/port number pairs associated with the application server 2312. The policy update may be transmitted in a SIB, an MBMS transmission, or an HTTP connection. The reception module 2304 may be configured to receive a request from at least one UE 2314 to receive the policy update. The transmission module 2308 may be configured to page at least one UE 2314 to indicate that the policy update is available.

The apparatus may include additional modules that perform each of the steps of the algorithm in the aforementioned flow chart of FIG. 21. As such, each step in the aforementioned flow chart of FIG. 21 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 24:
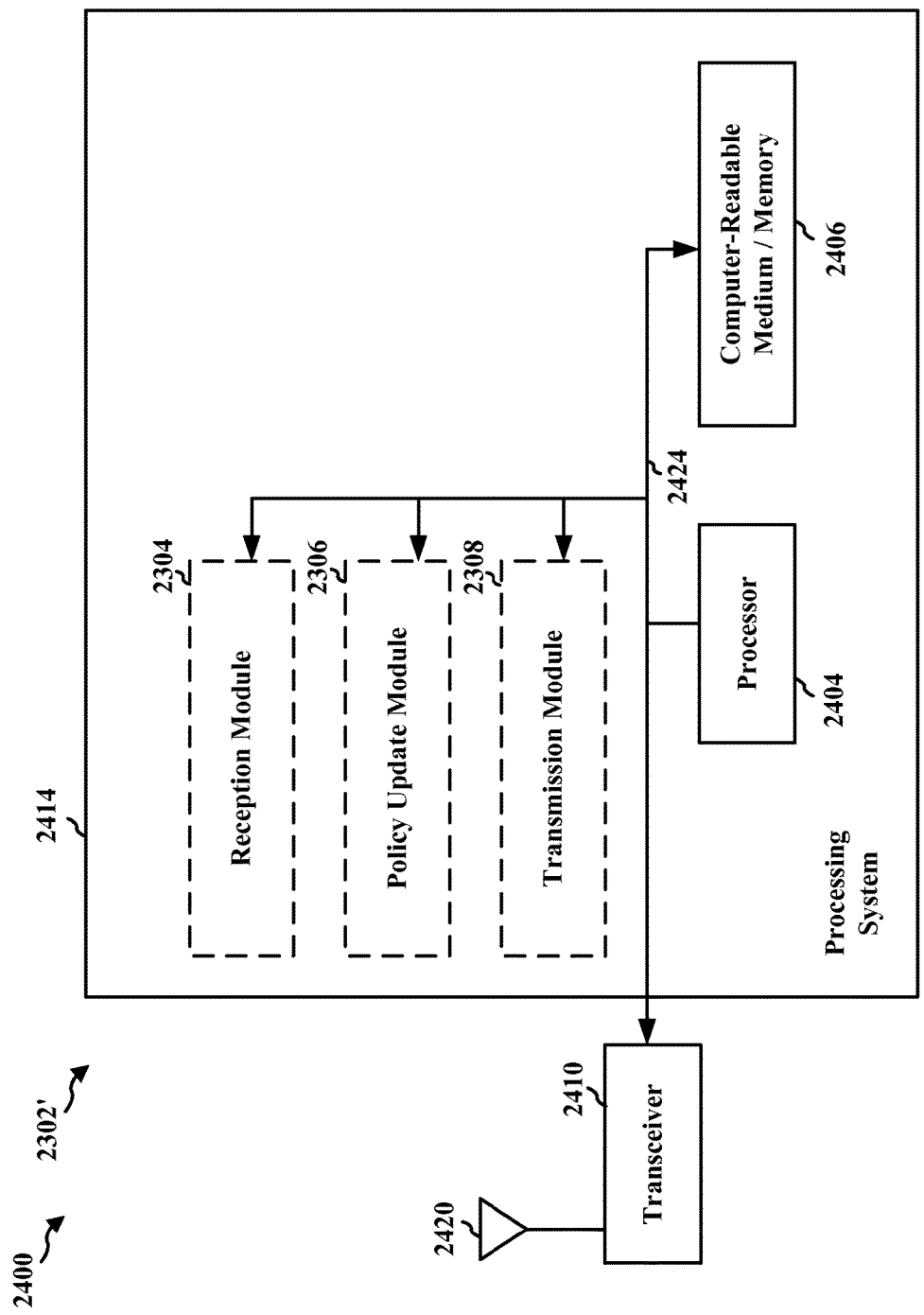
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware modules, represented by the processor 2404, the modules 2304, 2306, 2308, and the computer-readable medium/memory 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the reception module 2304. In addition, the transceiver 2410 receives information from the processing system 2414, specifically the transmission module 2308, and based on the received information, generates a signal to be applied to the one or more antennas 2420. The processing system 2414 includes a processor 2404 coupled to a computer-readable medium/memory 2406. The processor 2404 is responsible for general processing, including the execution of software stored on the computer-readable medium/memory 2406. The software, when executed by the processor 2404, causes the processing system 2414 to perform the various functions described supra for any particular apparatus. The computer-readable medium/memory 2406 may also be used for storing data that is manipulated by the processor 2404 when executing software. The processing system further includes at least one of the modules 2304, 2306, and 2308. The modules may be software modules running in the processor 2404, resident/stored in the computer readable medium/memory 2406, one or more hardware modules coupled to the processor 2404, or some combination thereof. The processing system 2414 may be a component of the network entity 610 and may include the memory 676 and/or at least one of the TX processor 616, the RX processor 670, and the controller/processor 675.

In one configuration, the apparatus 2302/2302' for wireless communication includes means for receiving a request for traffic control regarding data being communicated to an application server. The apparatus may include means for determining a policy update for the application server based on the received request for traffic control. The apparatus may include means for transmitting the policy update to at least one UE. The request for traffic control may include an identity of the application server, status information for the application server, one or more destination IP addresses associated with the application server, or one or more IP address/port number pairs associated with the application server. The request for traffic control may be received from a network gateway or the application server. The policy update may indicate whether to restrict data from being transmitted from at least one UE to one or more destination IP addresses associated with the application server or to one or more IP address/port number pairs associated with the application server. The policy update may include a probability value related to a probability of restricting data from being transmitted from at least one UE to one or more destination IP addresses associated with the application server or to one or more IP address/port number pairs associated with the application server. The policy update may be transmitted in a SIB, an MBMS transmission, or an HTTP connection. The apparatus may include means for receiving a request from the at least one UE to receive the policy update. The apparatus may include means for paging the at least one UE to indicate that the policy update is available. The aforementioned means may be one or more of the aforementioned modules of the apparatus 2302 and/or the processing system 2414 of the apparatus 2302' configured to perform the functions recited by the aforementioned means. As described supra, the processing system 2414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 25:
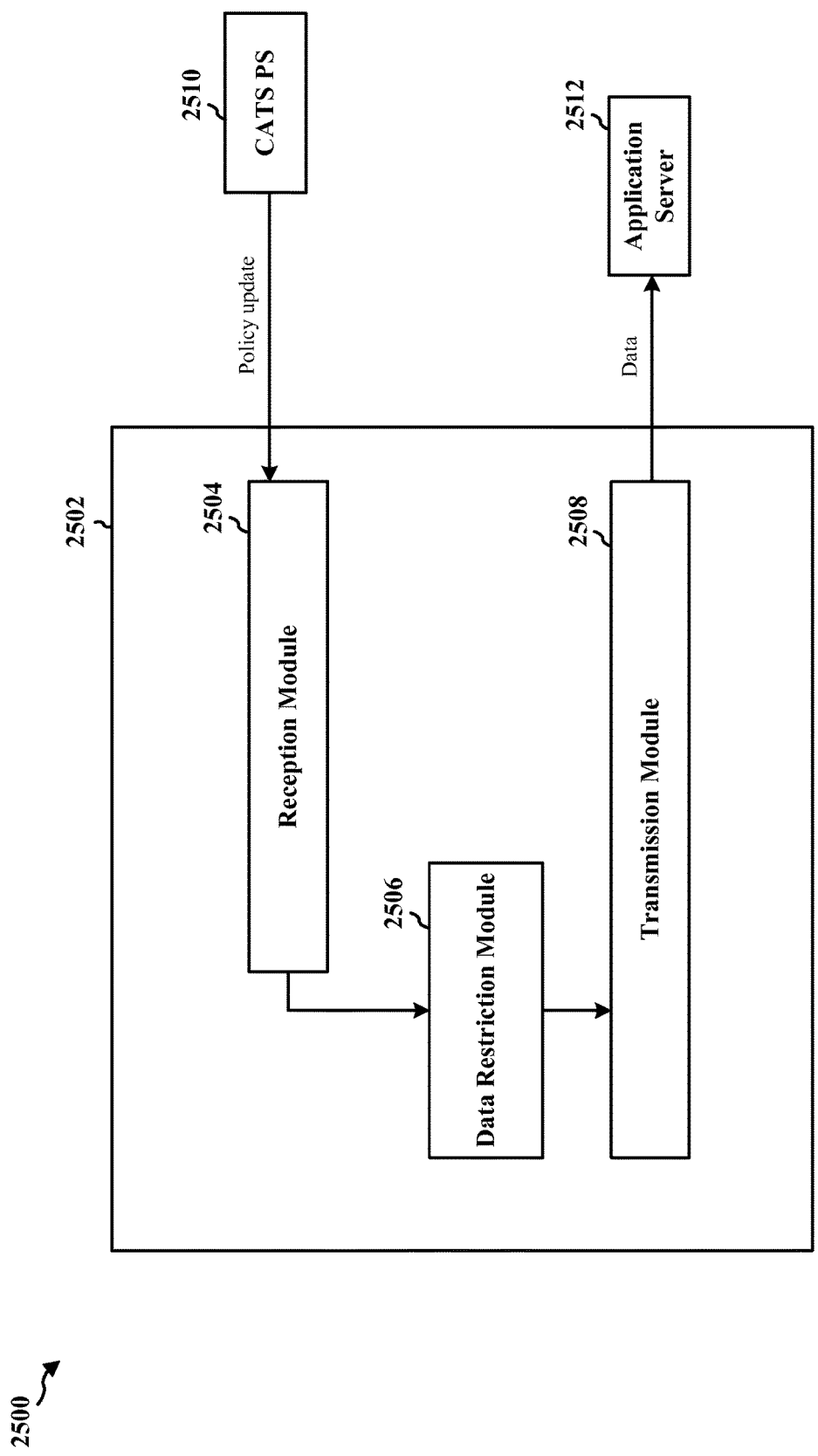
FIG. 25 is a conceptual data flow diagram illustrating the data flow between different modules/means/components in an exemplary apparatus.

FIG. 25 is a conceptual data flow diagram 2500 illustrating the data flow between different modules/means/components in an exemplary apparatus 2502. The apparatus may be a UE (e.g., the UE 2002). The apparatus includes a reception module 2504, a data restriction module 2506, and a transmission module 2508. The reception module 2504 may be configured to receive, from the CATS PS 2510, a policy update for an application server 2512. The data restriction module 2506 may be configured to determine whether to restrict data from being transmitted to one or more destination IP addresses associated with the application server 2512 or to one or more IP address/port number pairs associated with the application server 2512 based on the policy update. The policy update may indicate whether to restrict data from being transmitted to the one or more destination IP addresses associated with the application server 2512 or to one or more IP address/port number pairs associated with the application server 2512. The policy update may include a probability value related to a probability of restricting data from being transmitted to the one or more destination IP addresses associated with the application server 2512 or to one or more IP address/port number pairs associated with the application server 2512. In one configuration, the data restriction module 2506 may be configured to determine whether to restrict data from being transmitted by generating a random number, comparing the generated random number to the probability value, and suppressing transmission of data when the generated random number is greater than the probability value. In another configuration, the data restriction module 2506 may be configured to determine whether to restrict data from being transmitted by generating a random number, comparing the generated random number to the probability value, and suppressing transmission of data when the generated random number is less than the probability value. The transmission module 2508 may be configured to transmit a request for the policy update to the policy server (e.g., the CATS PS 2510). The reception module 2504 may be configured to receive a paging signal from the policy server. The paging signal may indicate that the policy update is available. The policy update may be received in a SIB, an MBMS transmission, or an HTTP connection.

The apparatus may include additional modules that perform each of the steps of the algorithm in the aforementioned flow chart of FIG. 22. As such, each step in the aforementioned flow chart of FIG. 22 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 26:
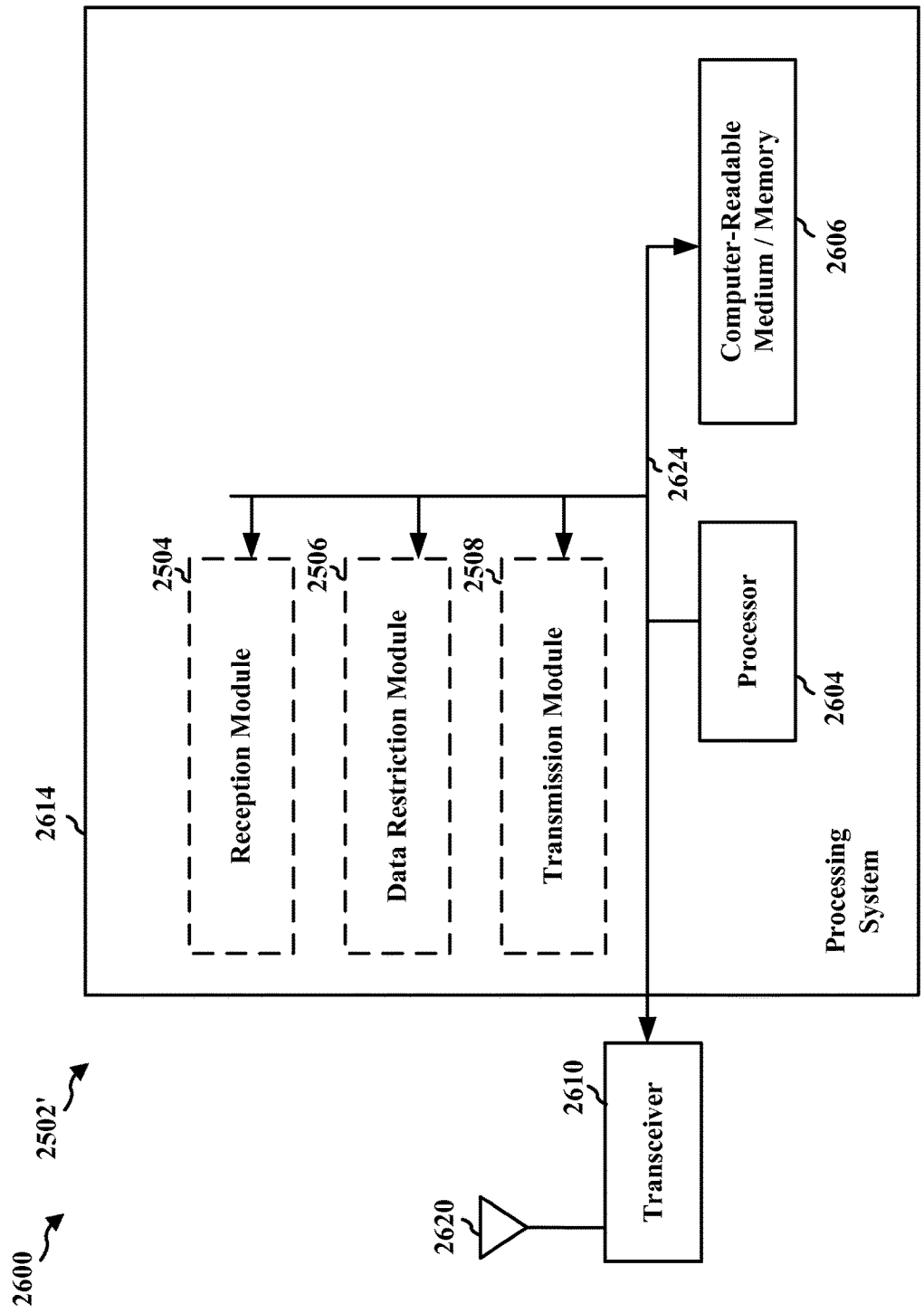
FIG. 26 is a diagram illustrating an example of a hardware implementation for an apparatus employing a processing system.

FIG. 26 is a diagram 2600 illustrating an example of a hardware implementation for an apparatus 2502' employing a processing system 2614. The processing system 2614 may be implemented with a bus architecture, represented generally by the bus 2624. The bus 2624 may include any number of interconnecting buses and bridges depending on the specific application of the processing system 2614 and the overall design constraints. The bus 2624 links together various circuits including one or more processors and/or hardware modules, represented by the processor 2604, the modules 2504, 2506, 2508, and the computer-readable medium/memory 2606. The bus 2624 may also link various other circuits such as timing sources, peripherals, voltage regulators, and power management circuits, which are well known in the art, and therefore, will not be described any further.

The processing system 2614 may be coupled to a transceiver 2610. The transceiver 2610 is coupled to one or more antennas 2620. The transceiver 2610 provides a means for communicating with various other apparatus over a transmission medium. The transceiver 2610 receives a signal from the one or more antennas 2620, extracts information from the received signal, and provides the extracted information to the processing system 2614, specifically the reception module 2504. In addition, the transceiver 2610 receives information from the processing system 2614, specifically the transmission module 2508, and based on the received information, generates a signal to be applied to the one or more antennas 2620. The processing system 2614 includes a processor 2604 coupled to a computer-readable medium/memory 2606. The processor 2604 is responsible for general processing, including the execution of software stored on the computer-readable medium/memory 2606. The software, when executed by the processor 2604, causes the processing system 2614 to perform the various functions described supra for any particular apparatus. The computer-readable medium/memory 2606 may also be used for storing data that is manipulated by the processor 2604 when executing software. The processing system further includes at least one of the modules 2504, 2506, and 2508. The modules may be software modules running in the processor 2604, resident/stored in the computer readable medium/memory 2606, one or more hardware modules coupled to the processor 2604, or some combination thereof. The processing system 2614 may be a component of the UE 650 and may include the memory 660 and/or at least one of the TX processor 668, the RX processor 656, and the controller/processor 659.

In one configuration, the apparatus 2502/2502' for wireless communication includes means for receiving a policy update for an application server. The apparatus may include means for determining whether to restrict data from being transmitted to one or more destination IP addresses associated with the application server or to one or more IP address/port number pairs associated with the application server based on the policy update. The policy update may indicate whether to restrict data from being transmitted to the one or more destination IP addresses associated with the application server or to one or more IP address/port number pairs associated with the application server. The policy update may include a probability value related to a probability of restricting data from being transmitted to the one or more destination IP addresses associated with the application server or to one or more IP address/port number pairs associated with the application server. In one configuration, the means for determining whether to restrict data from being transmitted may be configured to generate a random number, compare the generated random number to the probability value, and suppress transmission of data when the generated random number is greater than the probability value. In another configuration, the means for determining whether to restrict data from being transmitted may be configured to generate a random number, compare the generated random number to the probability value, and suppress transmission of data when the generated random number is less than the probability value. The apparatus may include means for transmitting a request for the policy update to a policy server. The apparatus may include means for receiving a paging signal from the policy server. The paging signal may indicate that the policy update is available. The policy update may be received in a SIB, an MBMS transmission, or an HTTP connection. The means for determining may be configured to determine whether to restrict data from being transmitted based on a validity period for the policy update. The validity period may be included in the policy update.

The aforementioned means may be one or more of the aforementioned modules of the apparatus 2502 and/or the processing system 2614 of the apparatus 2502' configured to perform the functions recited by the aforementioned means. As described supra, the processing system 2614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 27:
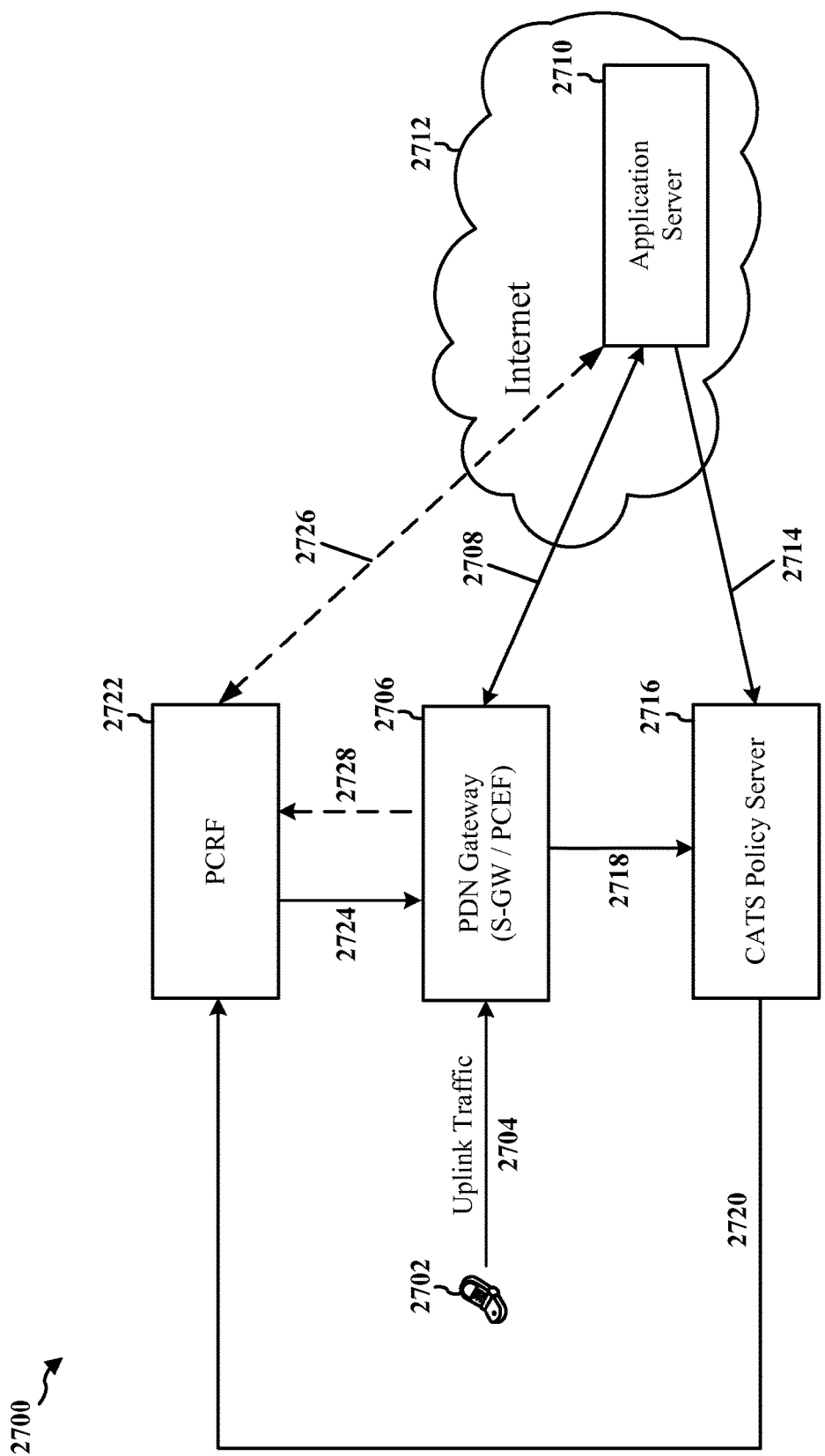
FIG. 27 is a diagram of a wireless network centered solution for reducing the impact on application servers encountering problems.

FIG. 27 is a diagram 2700 of a wireless network centered solution for reducing the impact on application servers encountering problems. As shown in FIG. 27, a UE 2702 may be running an application (e.g., a navigational application). The application may be required to initiate communication with an application server 2710 through the Internet 2712. For example, the navigational application may submit a route request to the application server 2710. To communicate with the application server 2710, the application may instruct the UE 2702 to transmit data 2704 to the application server 2710 through a network entity such as a PDN Gateway 2706 (e.g., the PDN Gateway 118). In some instances, the PDN Gateway 2706 may also include a Serving Gateway (e.g., the Serving Gateway 116) and/or a PCEF. The PCEF is a network/functional entity that performs policy enforcement along with charging functionalities. The PCEF controls traffic handling and QoS at a gateway (e.g., PDN Gateway 2706) over the user plane. An integral role of the PCEF is to perform service data flow detection. The PCEF may select an appropriate PCC rule used for evaluating received data against the service data flow filters of the PCC rule. As such, the PCEF may filter data by not transmitting the data to a destination (e.g., the application server 2710).

Continuing with the above example, when the data 2704 transmitted by the UE 2702 arrives at the PDN Gateway 2706, the PDN Gateway 2706 may forward the data 2708 to the application server 2710. However, if many UEs are transmitting to the application server 2710 at the same time, the application server 2710 may become overwhelmed. For example, if many users attempt to access the navigational application, the navigational application server may become overwhelmed and unable to respond to all the routing requests.

In one configuration, the application server 2710 may request assistance in managing the traffic flow from UEs. The application server 2710 may transmit a request for traffic control 2714 to a control of application third-party server (CATS) policy server (PS) (CATS PS) 2716. The request for traffic control 2714 may include the identity of the application server 2710, status information related to the application server 2710, one or more destination IP addresses associated with the application server 2710, or one or more IP address/port number pairs associated with the application server 2710. The identity of the application server 2710 may include information such as the application name, the application category, and/or the geographic location of the application server 2710. The status of the application server 2710 may include information related to the ability of the application server 2710 to respond to current and/or additional UE traffic. The one or more destination IP addresses associated with the application server 2710 may include any IP addresses related to the application server 2710 (e.g., an IP address for a physical server on which the application server 2710 is located). The one or more IP address/port number pairs may include an IP address associated with the application server 2710 and a port number associated with the overloaded application and the application server 2710. For example, if the navigational application server becomes overwhelmed, the navigational application server may transmit a request for traffic control to the CATS PS 2716. The request for traffic control may include information indicating the name of the navigational application, information indicating that the navigational application server has only ninety percent capacity remaining for handling application data traffic, and information indicating the IP addresses of the application server encountering problems. In another example, if an application server hosts multiple applications and only the hosted navigational application is overwhelmed (e.g., exceeded traffic quota), the request for traffic control may include information indicating the name of the navigational application, information indicating that the application server needs assistance handling the navigational application data traffic, and information indicating the IP address of the application server and the port number(s) associated with the navigational application.

In another configuration, instead of the application server 2710 transmitting the request for traffic control 2714, the PDN Gateway 2706 may transmit a request for traffic control 2718 to the CATS PS 2716 upon determining a status of the application server 2710. In one aspect, the PDN Gateway may determine the status of the application server 2710 by monitoring transmission control protocol TCP traffic from the application server 2710, monitoring a round-trip delay time from the application server 2710, monitoring a type of error/status code received from the application server 2710 (e.g., limited capacity, over capacity, scheduled to be offline, etc.), and/or monitoring a volume of error/status codes received from the application server 2710. Based on such monitoring, the PDN Gateway 2706 may determine that the application server 2710 is offline and/or needs assistance in handling traffic. The PDN Gateway 2706 may transmit the request for traffic control 2718 to the CATS PS 2716 on behalf of the application server 2710 based on the determined status of the application server 2710. The request for traffic control 2718 may include the identity of the application server 2710, status information related to the application server 2710, one or more destination IP addresses associated with the application server 2710, and/or one or more IP address/port number pairs associated with the application server 2710. The identity of the application server 2710 may include information such as the application name, the application category, and/or the geographic location of the application server 2710. The status of the application server 2710 may include information related to the ability of the application server 2710 to respond to current and/or additional UE traffic. The one or more destination IP addresses associated with the application server 2710 may include any IP addresses related to the application server 2710 (e.g., an IP address for a physical server on which the application server 2710 is located). The one or more IP address/port number pairs may include an IP address associated with the application server 2710 and a port number associated with the overloaded application and the application server 2710. For example, the PDN Gateway 2706 may determine that a navigational application server has received a large amount of TCP traffic and that the round trip delay time has increased beyond a threshold (e.g., 5 seconds). Based on the determined status of the navigational application server, the PDN Gateway 2706 transmits a request for traffic control to the CATS PS 2716. The request for traffic control may include the name of the navigational application, the amount of TCP traffic received and the average round trip delay time, and the destination IP addresses of the application server encountering problems. Although the aforementioned configuration has been discussed with respect to a PDN Gateway, a Serving Gateway and PCEF entity may also be used.

Once the CATS PS 2716 receives at least one of the requests for traffic control 2714, 2718 from either the application server 2710 or the PDN Gateway 2706 (or both), the CATS PS 2716 may determine a policy update for the application server 2710 based on the received request for traffic control 2714, 2718. In one aspect, based on the request for traffic control 2714, if the CATS PS 2716 determines that the application server 2710 can handle all the UE traffic, the CATS PS 2716 may determine to update the policy for the application server 2710 such that that no restriction or suppression of data 2708 is required for the application server 2710. In another aspect, based on the request for traffic control 2714, if the CATS PS 2716 determines that the application server 2710 is offline or can no longer respond to requests from any UE (e.g., the UE 2702), the CATS PS 2716 may determine to update the policy for the application server 2710 such that all data received at the PDN Gateway 2706 from the UE 2702 is to be restricted from being transmitted to the application server 2710. In another aspect, based on the request for traffic control 2714, if the CATS PS 2716 determines that the application server 2710 is still online but can only handle a limited amount of UE traffic, the CATS PS 2716 may determine an amount of UE communications to which the application server 2710 may respond. Having determined the amount of traffic to control/restrict, the CATS PS 2716 may enact a policy to restrict/throttle the amount of data forwarded to the application server 2710 from the PDN Gateway 2706. For example, the CATS PS 2716 may determine that only 3 out of 5 packets received at the PDN Gateway 2706 and intended for the application server 2710 will be transmitted by the PDN Gateway 2706 to the application server 2710. In one configuration, the CATS PS 2716 may cache the destination IP addresses of application servers frequently known to encounter problems.

In one configuration, having determined a policy update, the CATS PS 2716 may transmit a policy update 2720 to a PCRF 2722. The PCRF 2722 is a policy functional entity that aggregates information inside a network and makes policy decisions for each subscriber. The PCRF 2722 is the entity that applies PCC rules to the PCEF using a gateway interface between the PCEF (which may be within the PDN Gateway 2706) and the PCRF 2722. In this configuration, the PCRF 2722 may receive the policy update 2720. The policy update 2720 may include information related to an amount of uplink data to restrict from transmission from the PDN Gateway 2706 to one or more destination IP addresses associated with the application server 2710 or to one or more IP address/port number pairs associated with the application server 2710. In turn, the PCRF 2722 may transmit the policy update 2724 to the PCEF, whose function of implementing the policy update 2724 may be performed within the PDN Gateway 2706. The policy update 2720 transmitted by the CATS PS 2716 and the policy update 2724 transmitted by the PCRF 2722 may be the same policy update. In another aspect, however, the PCRF 2722 may modify the received policy update 2720 before transmitting the policy update 2724 to the PDN Gateway 2706.

In another configuration, the functionality of the CATS PS 2716 may be performed by the PCRF 2722, and therefore, only the PCRF 2722 entity is present. In this configuration, the PCRF 2722 may receive a request for traffic control 2726, 2728 from either the application server 2710 or the PDN Gateway 2706, respectively, or both. The PCRF 2722 may determine a policy update for the application server 2710 based on the received request for traffic control 2726, 2728. In one aspect, if the application server 2710 is offline or can no longer respond to requests from any UE (e.g., the UE 2702), the PCRF 2722 may determine to update the policy for the application server 2710 to restrict all data received at the PDN Gateway 2706 from the UE 2702 from being forwarded to the application server 2710. In another aspect, if the application server 2710 is still online but can only respond to a limited number of UE requests, the PCRF 2722 may determine a threshold of data to which the application server 2710 may respond. Based on that determination, the PCRF 2722 may enact a policy to restrict/throttle an amount of data forwarded to the application server 2710 from the PDN Gateway 2706. For example, the PCRF 2722 may determine that only 3 out of 5 packets received at the PDN Gateway 2706 and intended for the application server 2710 are to be transmitted from the PDN Gateway 2706 to the application server 2710. The PCRF 2722 may transmit the policy update 2724 to the PCEF, whose function of implementing the policy update 2724 may be performed within the PDN Gateway 2706.

Upon receiving the policy update 2724, the PDN Gateway 2706, which may perform the functions of the PCEF, may determine an amount of received data 2704 to restrict from transmission to the application server 2710. The policy update 2724 may indicate an amount of data 2704 to be restricted from transmission to one or more destination IP addresses associated with the application server 2710 or to one or more IP address/port number pairs associated with the application server 2710. In one configuration, the PDN Gateway 2706 may allow all data 2704 to be transmitted to the application server 2710 without any restrictions based on the received policy update 2724. In another configuration, the PDN Gateway 2706 may restrict transmission of a subset (or an amount) of data 2704 received from the UE 2702 to be transmitted to the application server 2710. In another aspect, the PDN Gateway 2706 may restrict transmission of all data 2704 received from the UE 2702 to be transmitted to one or more destination IP addresses associated with the application server 2710 or to one or more IP address/port number pairs associated with the application server 2710. For example, all data from the UE 2702 and other UEs may be restricted from being transmitted to the application server 2710. In this example, the TCP "collapses" for each IP flow between any UE and the application server 2710. In another aspect, the PDN Gateway 2706 may restrict data from some, but not all, UEs transmitting data to the PDN Gateway 2706 to be routed to the application server 2710. In this aspect, the PDN Gateway 2706 may randomly stop the initiation of new IP flows from UEs (e.g., the UE 2702) toward the application server 2710 at a desired rate (e.g., stopping 4 out of 5 flow initiations), while proceeding to handle the remaining data flow initiations, as well as existing already established data flows. As a result, the UE resident application ceases to operate as intended, and is terminated by the client, thereby sparing the application server 2710 from excessive load. In another example, the PDN Gateway 2706 may restrict data 2704 received from the UE 2702, but not data received from other UEs. In another aspect, the PDN Gateway may restrict transmission of a certain type of data (e.g., low priority) and allow only other types of data (e.g., high priority).

By throttling some or all of the data packets from the UE 2702 (and other UEs not displayed in FIG. 27), the PDN Gateway 2706 can help manage the flow of traffic by reducing the number of data packets transmitted to the application server 2710 when the application server 2710 is overwhelmed or offline. This traffic assistance from the wireless network reduces unproductive user plane traffic, which may aid in tempering the effects of congestion, when downed or underperforming application server incidents occur during heavy traffic load. This solution is simple to implement and does not require any changes at the UE such as provision or other potentially complex operations.

Figure 28:
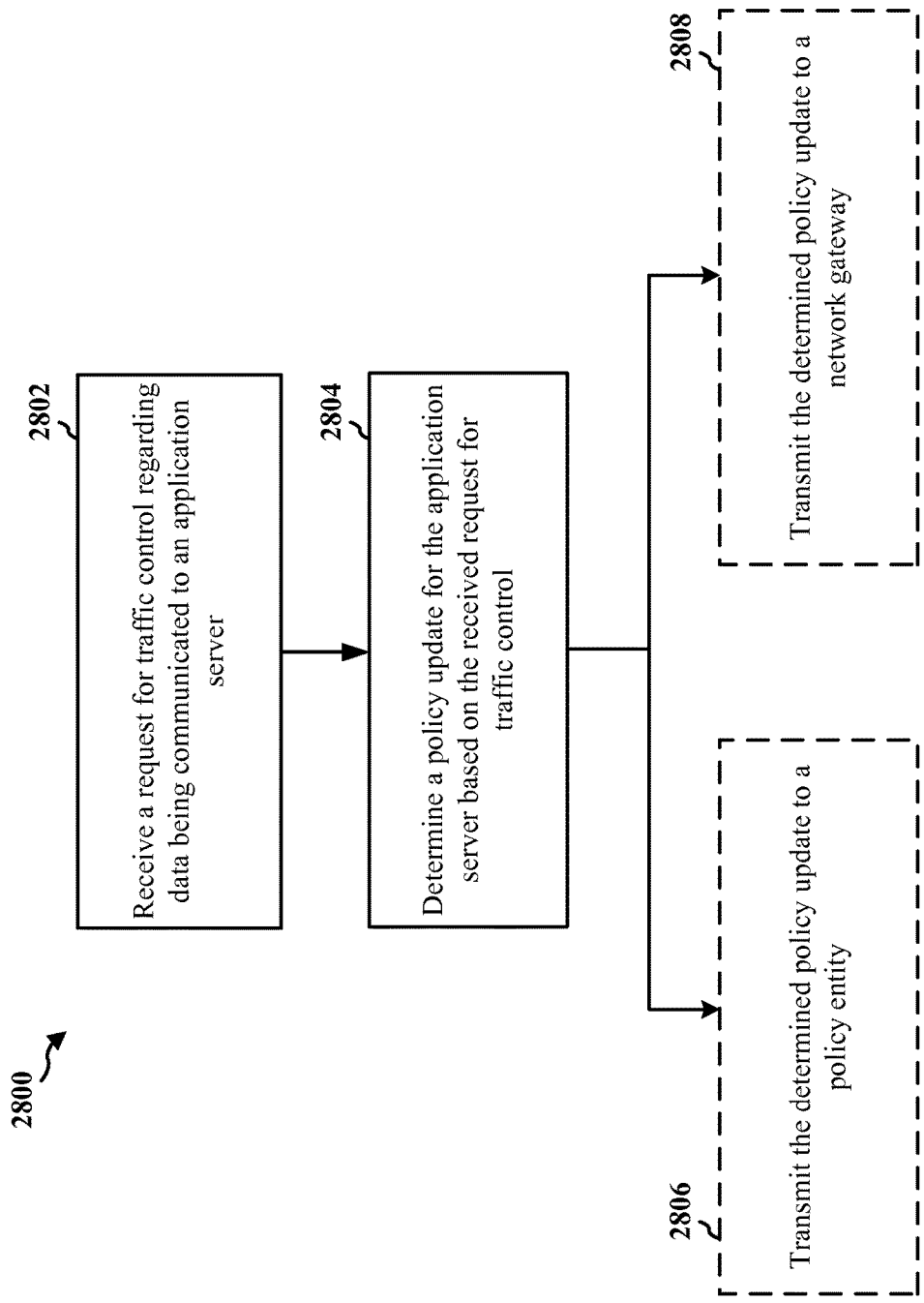
FIG. 28 is a flow chart of an exemplary method of a wireless network centered solution pertaining to a policy server for reducing the impact on application servers encountering problems.

FIG. 28 is a flow chart 2800 of an exemplary method of a wireless network centered solution pertaining to a policy server for reducing the impact on application servers encountering problems. The method may be performed by a policy server (e.g., the CATS PS 2716, the PCRF 2722, the apparatus 3002/3002'). At step 2802, the policy server may receive a request for traffic control (e.g., the request for traffic controls 2714, 2718) regarding data being communicated to an application server (e.g., the application server 2710). In one configuration, the request for traffic control may include an identity of the application server, status information for the application server, one or more destination IP addresses associated with the application server, or one or more IP address/port number pairs associated with the application server. In one configuration, the request for traffic control may be received from a network gateway or from the application server.

At step 2804, the policy server may determine a policy update for the application server based on the received request for traffic control. In one configuration, to determine the policy update, the policy server may evaluate a threshold of data that the application server can process given the status information provided in the request for traffic control. The policy server may then determine an amount of data to restrict from being transmitted from a network gateway to the application server. For example, a UE running a navigational application may attempt to communicate with the application server 2710. Being overwhelmed, the application server 2710 may transmit a request for traffic control 2714 to the CATS PS 2716. The CATS PS 2716 may receive the request for traffic control 2714 from the application server 2710 and determine a policy update for the application server 2710. In this example, the request for traffic control 2714 may include the name of the application server 2710, information indicating that the application server 2710 cannot handle more data requests, and the destination IP addresses for the application server 2710. Based on the information included in the request for traffic control 2714, the CATS PS 2716 may determine a policy update in which all data received from the UE 2702 directed to the destination IP addresses associated with the application server 2710 is to be restricted from being transmitted to the application server 2710 at the destination IP addresses.

At step 2806, the policy server may transmit the determined policy update to a policy entity (e.g., the PCRF 2722).

In one configuration, the determined policy update may indicate an amount of data to restrict from transmission from a network gateway (e.g., the PDN Gateway 2706) to one or more destination IP addresses associated with the application server or to one or more IP address/port number pairs associated with the application server. The policy update may indicate that no data is to be restricted. For example, the CATS PS 2716 may transmit the policy update 2720 to the PDN Gateway 2706, and the policy update 2720 may indicate that 2 out of 5 data packets received from the UE 2702 are to be restricted from being transmitted from the PDN Gateway 2706 to one or more IP addresses associated with the application server 2710.

Alternatively, at step 2808, if the functionality of the policy server is subsumed within a PCRF, then the aforementioned steps 2802 and 2804 may be performed by the PCRF, and the PCRF may transmit the determined policy update to a network gateway (e.g., the PDN Gateway 2706). In one configuration, the determined policy update may indicate an amount of data to restrict from transmission from a network gateway (e.g., the PDN Gateway 2706) to one or more destination IP addresses associated with the application server or to one or more IP address/port number pairs associated with the application server.

Figure 29:
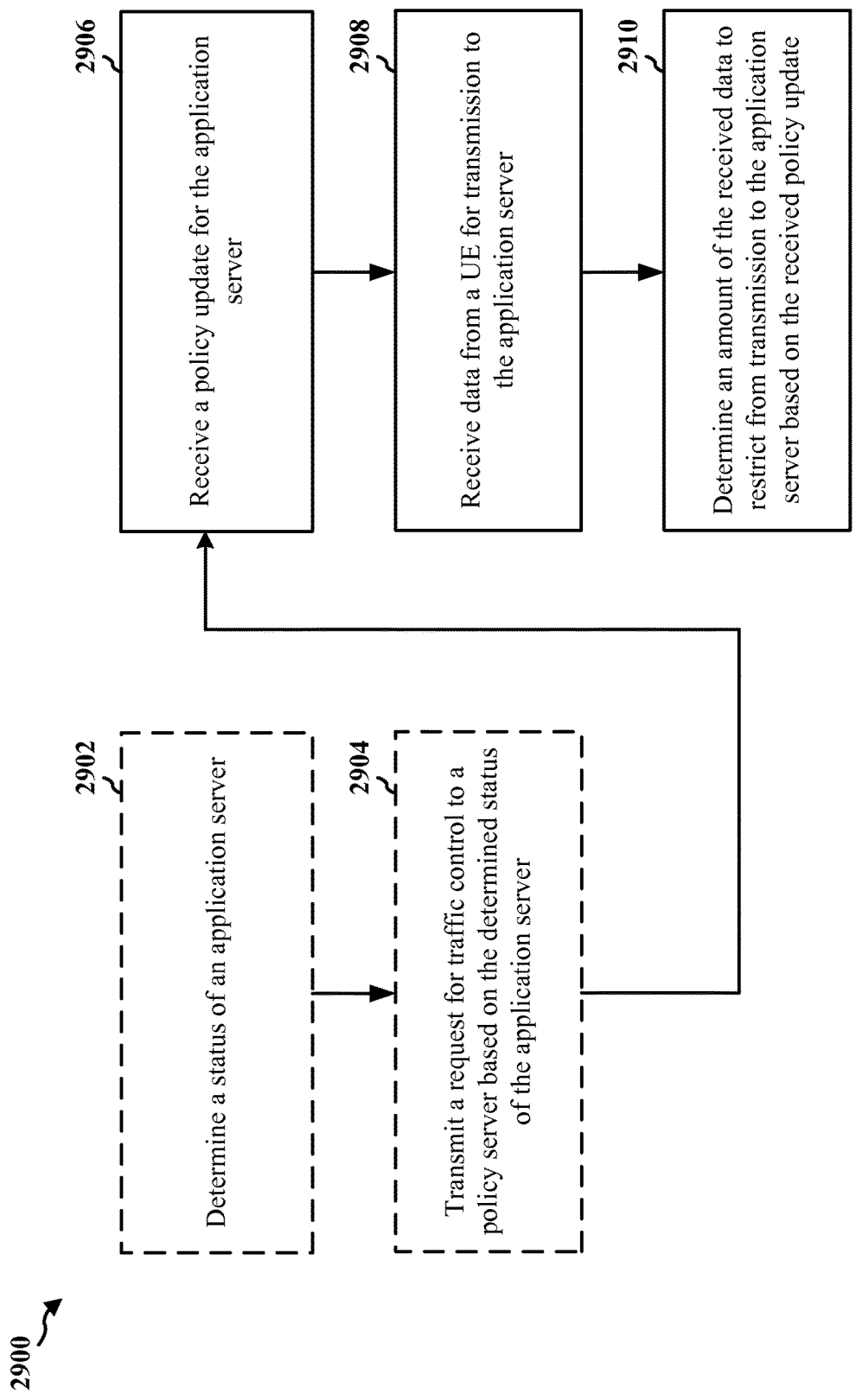
FIG. 29 is a flow chart of an exemplary method of a wireless network centered solution pertaining to a network gateway for reducing the impact on application servers encountering problems

FIG. 29 is a flow chart 2900 of an exemplary method of a wireless network centered solution pertaining to a network gateway for reducing the impact on application servers encountering problems. The method may be performed by a network gateway (e.g., the PDN Gateway 2706, the apparatus 3202/3202'). At step 2902, the network gateway may determine a status of an application server. In one configuration, the network gateway may determine the status of the application server based on a TCP traffic from the application server, a round-trip delay time from the application server, a type of error/status code transmitted from the application server, a volume of error/status codes transmitted from the application server. For example, the application server 2710 may transmit a status code indicating that the application server 2710 will be offline for the next 2 hours.

At step 2904, the network gateway may transmit a request for traffic control to a policy server based, at least in part, on the status of the application server. In one configuration, the request for traffic control may include an identity of the application server, status information for the application server, one or more destination IP addresses associated with the application server, or one or more IP address/port number pairs associated with the application server. For example, the PDN Gateway 2706 may transmit a request for traffic control 2718 to the CATS PS 2716. The request for traffic control 2718 may include an identity of the application server 2710 (e.g., navigation application server), information indicating that the application server 2710 will be offline for the next 2 hours, and one or more destination IP addresses associated with the application server 2710.

At step 2906, the network gateway may receive a policy update for the application server. In one configuration, the policy update may indicate the amount of received data to restrict from transmission to one or more destination IP addresses associated with the application server or to one or more IP address/port number pairs associated with the application server. In another configuration, the policy update may indicate that none of the received data is to be restricted from being transmitted to one or more destination IP addresses associated with the application server or to one or more IP address/port number pairs associated with the application server. For example, the PDN Gateway 2706 may receive a policy update 2724 from the PCRF 2722. The policy update 2724 may indicate that all data received from the UE 2702 is to be restricted from being transmitted to one or more destination IP addresses associated with the application server 2710. In an aspect, the policy update 2724 may indicate that the policy is to remain in effect for 2 hours. As such, the PDN Gateway 2706 may implement the policy update 2724 for only two hours. Afterwards, data 2704 received from the UE 2702 may be transmitted to the application server 2710 without restriction. As such, a policy update may include a validity period.

At step 2908, the network gateway may receive data from a UE for transmission to the application server. For example, the PDN Gateway 2706 may receive data 2704 from the UE 2702 for transmission to the application server 2710.

At step 2910, the network gateway may determine an amount of the received data to restrict from transmission to the application server based on the received policy update. For example, the PDN Gateway 2706 may determine, based on the received policy update 2724, that 2 out of 5 data flow initiations from UEs (e.g., the UE 2702) may be restricted, while proceeding to handle the remaining flow initiations as well as existing already established data flows.

Figure 30:
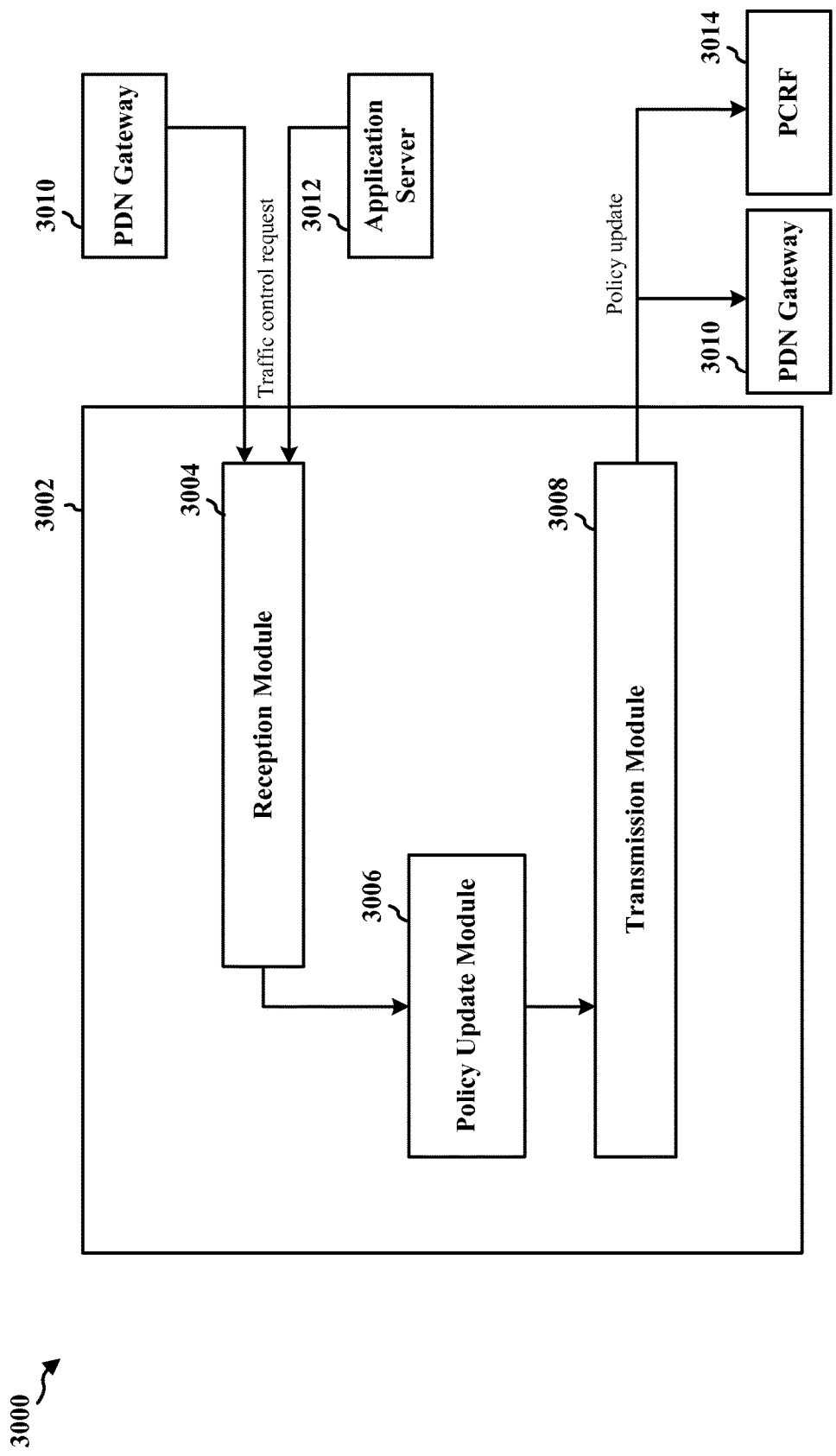
FIG. 30 is a conceptual data flow diagram illustrating the data flow between different modules/means/components in an exemplary apparatus.

FIG. 30 is a conceptual data flow diagram 3000 illustrating the data flow between different modules/means/components in an exemplary apparatus 3002. The apparatus may be a policy server (e.g., the CATS PS 2716, the PCRF 2722). The apparatus includes a reception module 3004, a policy update module 3006, and a transmission module 3008. The reception module 3004 may be configured to receive a request for traffic control regarding data being communicated to the application server 3012. The request for traffic control may include an identity of the application server 3012, status information for the application server 3012, one or more destination IP addresses associated with the application server 3012, or one or more IP address/port number pairs associated with the application server 3012. The request for traffic control may be received from a PDN Gateway 3010 or the application server 3012. The policy update module 3006 may be configured to determine a policy update for the application server 3012 based on the received request for traffic control. In one configuration, the transmission module 3008 may be configured to transmit the determined policy update to a policy entity (e.g., the PCRF 3014), in which the policy update indicates an amount of data to restrict from transmission from a network gateway (e.g., the PDN Gateway 3010) to one or more destination IP addresses associated with the application server 3012 or to one or more IP address/port number pairs associated with the application server 3012. In another configuration, the transmission module 3008 may be configured to transmit the determined policy update to a network gateway (e.g., the PDN Gateway 3010), in which the policy update indicates an amount of data to restrict from transmission from the network gateway to one or more destination IP addresses associated with the application server 3012 or to one or more IP address/port number pairs associated with the application server 3012.

The apparatus may include additional modules that perform each of the steps of the algorithm in the aforementioned flow chart of FIG. 28. As such, each step in the aforementioned flow chart of FIG. 28 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 31:
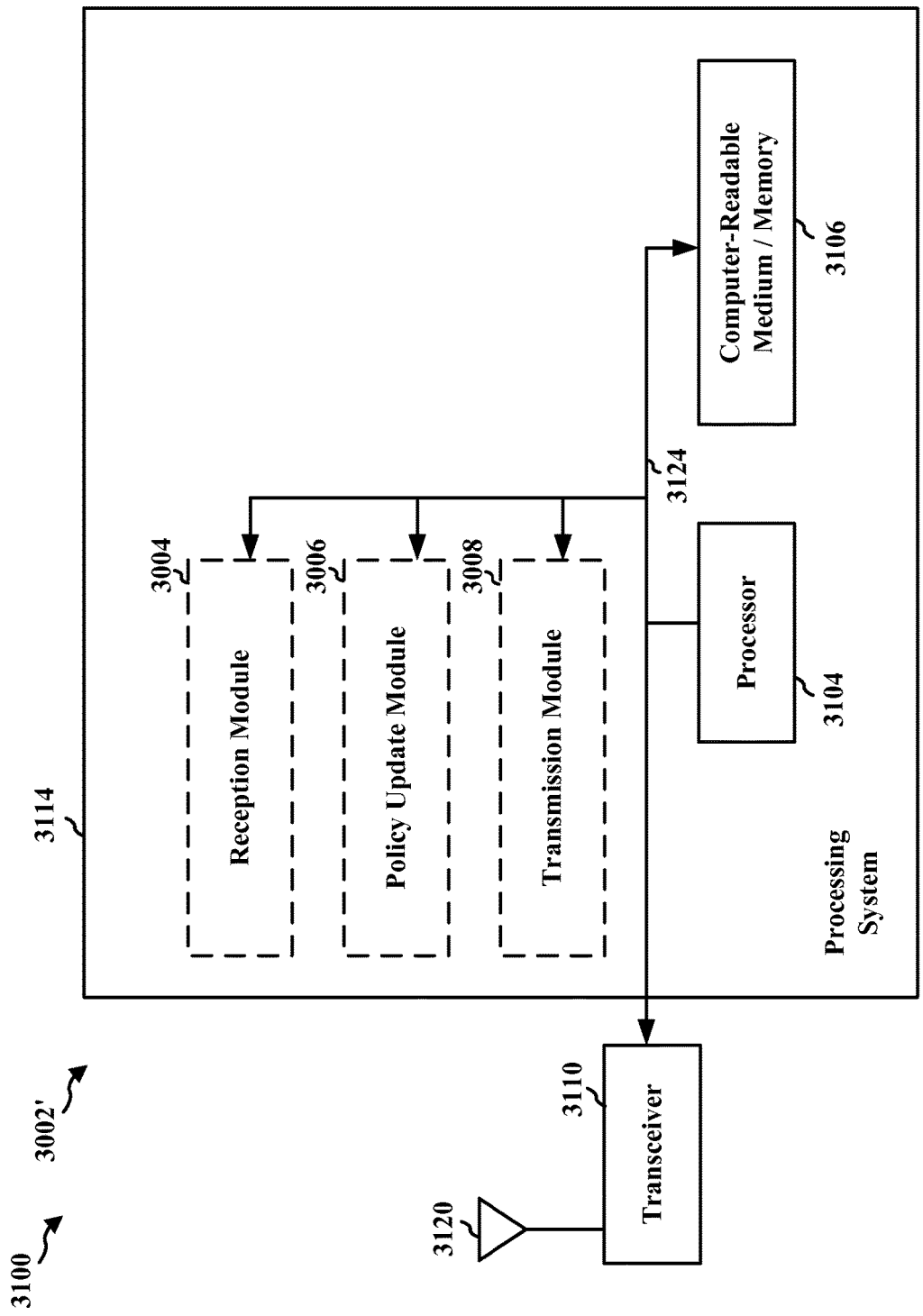
FIG. 31 is a diagram illustrating an example of a hardware implementation for an apparatus employing a processing system.

FIG. 31 is a diagram 3100 illustrating an example of a hardware implementation for an apparatus 3002' employing a processing system 3114. The processing system 3114 may be implemented with a bus architecture, represented generally by the bus 3124. The bus 3124 may include any number of interconnecting buses and bridges depending on the specific application of the processing system 3114 and the overall design constraints. The bus 3124 links together various circuits including one or more processors and/or hardware modules, represented by the processor 3104, the modules 3004, 3006, and 3008, and the computer-readable medium/memory 3106. The bus 3124 may also link various other circuits such as timing sources, peripherals, voltage regulators, and power management circuits, which are well known in the art, and therefore, will not be described any further.

The processing system 3114 may be coupled to a transceiver 3110. The transceiver 3110 is coupled to one or more antennas 3120. The transceiver 3110 provides a means for communicating with various other apparatus over a transmission medium. The transceiver 3110 receives a signal from the one or more antennas 3120, extracts information from the received signal, and provides the extracted information to the processing system 3114, specifically the reception module 3004. In addition, the transceiver 3110 receives information from the processing system 3114, specifically the transmission module 3008, and based on the received information, generates a signal to be applied to the one or more antennas 3120. The processing system 3114 includes a processor 3104 coupled to a computer-readable medium/memory 3106. The processor 3104 is responsible for general processing, including the execution of software stored on the computer-readable medium/memory 3106. The software, when executed by the processor 3104, causes the processing system 3114 to perform the various functions described supra for any particular apparatus. The computer-readable medium/memory 3106 may also be used for storing data that is manipulated by the processor 3104 when executing software. The processing system further includes at least one of the modules 3004, 3006, and 3008. The modules may be software modules running in the processor 3104, resident/stored in the computer readable medium/memory 3106, one or more hardware modules coupled to the processor 3104, or some combination thereof. The processing system 3114 may be a component of the network entity 610 and may include the memory 676 and/or at least one of the TX processor 616, the RX processor 670, and the controller/processor 675.

In one configuration, the apparatus 3002/3002' for wireless communication includes means for receiving a request for traffic control regarding data being communicated to an application server. The apparatus includes means for determining a policy update for the application server based on the received request for traffic control. The request for traffic control may include an identity of the application server, status information for the application server, one or more destination IP addresses associated with the application server, or one or more IP address/port number pairs associated with the application server. The request for traffic control may be received from a network gateway or the application server. The apparatus may include means for transmitting the determined policy update to a policy entity, in which the policy update indicates an amount of data to restrict from transmission from a network gateway to one or more destination IP addresses associated with the application server or to one or more IP address/port number pairs associated with the application server. The apparatus may include means for transmitting the determined policy update to a network gateway, in which the policy update indicates an amount of data to restrict from transmission from the network gateway to one or more destination IP addresses associated with the application server or to one or more IP address/port number pairs associated with the application server. The aforementioned means may be one or more of the aforementioned modules of the apparatus 3002 and/or the processing system 3114 of the apparatus 3002' configured to perform the functions recited by the aforementioned means. As described supra, the processing system 3114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 32:
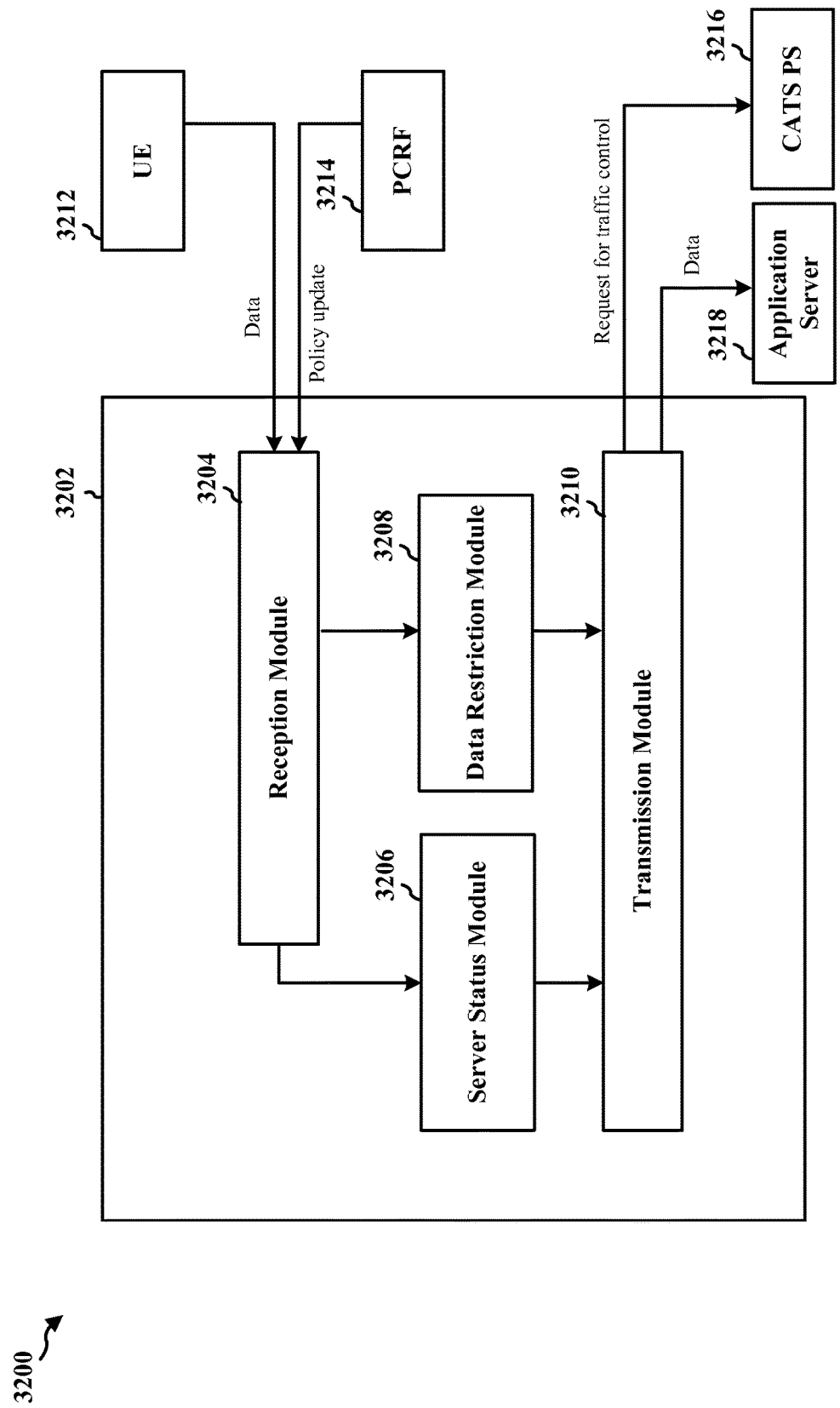
FIG. 32 is a conceptual data flow diagram illustrating the data flow between different modules/means/components in an exemplary apparatus.

FIG. 32 is a conceptual data flow diagram 3200 illustrating the data flow between different modules/means/components in an exemplary apparatus 3202. The apparatus may be a network gateway (e.g., the PDN Gateway 2706). The apparatus includes a reception module 3204, a server status module 3206, a data restriction module 3208, and a transmission module 3210. The server status module 3206 may be configured to determine a status of an application server 3218. The server status module 3206 may be configured to determine the status of the application server 3218 based on a TCP traffic from the application server 3218, a round-trip delay time from the application server 3218, a type of error code transmitted from the application server 3218, or a volume of error codes transmitted from the application server 3218. The transmission module 3210 may be configured to transmit a request for traffic control to a policy server 3216 based on the determined status of the application server 3218. The request for traffic control may include an identity of the application server 3218, status information for the application server 3218, one or more destination IP addresses associated with the application server 3218, or one or more IP address/port number pairs associated with the application server 3218. The reception module 3204 may be configured to receive a policy update for an application server 3218. The reception module 3204 may be configured to receive data from a UE 3212 for transmission to the application server 3218. The data restriction module 3208 may be configured to determine an amount of the received data to restrict from transmission to the application server 3218 based on the received policy update. The policy update may indicate the amount of the received data to restrict from transmission to one or more destination IP addresses associated with the application server 3218 or to one or more IP address/port number pairs associated with the application server 3218. The policy update may indicate that none of the received data is to be restricted from being transmitted to one or more destination IP addresses associated with the application server 3218 or to one or more IP address/port number pairs associated with the application server 3218.

The apparatus may include additional modules that perform each of the steps of the algorithm in the aforementioned flow chart of FIG. 29. As such, each step in the aforementioned flow chart of FIG. 29 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 33:
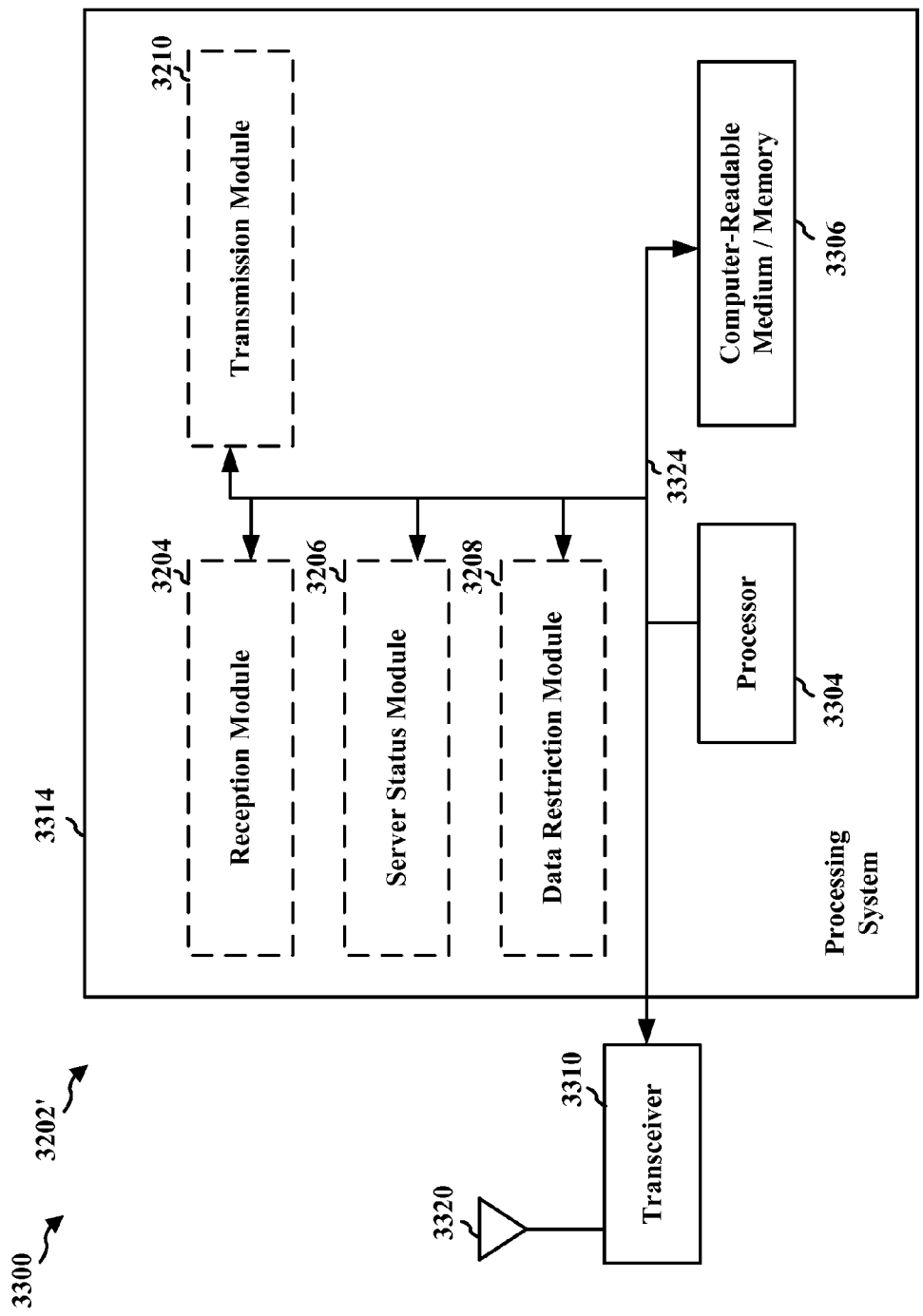
FIG. 33 is a diagram illustrating an example of a hardware implementation for an apparatus employing a processing system.

FIG. 33 is a diagram 3300 illustrating an example of a hardware implementation for an apparatus 3202' employing a processing system 3314. The processing system 3314 may be implemented with a bus architecture, represented generally by the bus 3324. The bus 3324 may include any number of interconnecting buses and bridges depending on the specific application of the processing system 3314 and the overall design constraints. The bus 3324 links together various circuits including one or more processors and/or hardware modules, represented by the processor 3304, the modules 3204, 3206, 3208, 3210, and the computer-readable medium/memory 3306. The bus 3324 may also link various other circuits such as timing sources, peripherals, voltage regulators, and power management circuits, which are well known in the art, and therefore, will not be described any further.

The processing system 3314 may be coupled to a transceiver 3310. The transceiver 3310 is coupled to one or more antennas 3320. The transceiver 3310 provides a means for communicating with various other apparatus over a transmission medium. The transceiver 3310 receives a signal from the one or more antennas 3320, extracts information from the received signal, and provides the extracted information to the processing system 3314, specifically the reception module 3204. In addition, the transceiver 3310 receives information from the processing system 3314, specifically the transmission module 3210, and based on the received information, generates a signal to be applied to the one or more antennas 3320. The processing system 3314 includes a processor 3304 coupled to a computer-readable medium/memory 3306. The processor 3304 is responsible for general processing, including the execution of software stored on the computer-readable medium/memory 3306. The software, when executed by the processor 3304, causes the processing system 3314 to perform the various functions described supra for any particular apparatus. The computer-readable medium/memory 3306 may also be used for storing data that is manipulated by the processor 3304 when executing software. The processing system further includes at least one of the modules 3204, 3206, 3208, or 3210. The modules may be software modules running in the processor 3304, resident/stored in the computer readable medium/memory 3306, one or more hardware modules coupled to the processor 3304, or some combination thereof. The processing system 3314 may be a component of the network entity 610 and may include the memory 676 and/or at least one of the TX processor 616, the RX processor 670, and the controller/processor 675.

In one configuration, the apparatus 3202/3202' for wireless communication includes means for receiving a policy update for an application server. The apparatus may include means for receiving data from a UE for transmission to the application server. The apparatus may include means for determining an amount of the received data to restrict from transmission to the application server based on the received policy update. The apparatus may include means for determining a status of the application server. The apparatus may include means for transmitting a request for traffic control to a policy server based on the determined status of the application server. The means for determining the status of the application server may be configured to determine the status based on at least one of a transmission control protocol traffic from the application server, a round-trip delay time from the application server, a type of error code transmitted from the application server, or a volume of error codes transmitted from the application server. The request for traffic control may include an identity of the application server, status information for the application server, one or more destination IP addresses associated with the application server, or one or more IP address/port number pairs associated with the application server. The policy update may indicate the amount of the received data to restrict from transmission to one or more destination IP addresses associated with the application server or to one or more IP address/port number pairs associated with the application server. The policy update may indicate that none of the received data is to be restricted from being transmitted to one or more destination IP addresses associated with the application server or to one or more IP address/port number pairs associated with the application server. The aforementioned means may be one or more of the aforementioned modules of the apparatus 3202 and/or the processing system 3314 of the apparatus 3202' configured to perform the functions recited by the aforementioned means. As described supra, the processing system 3314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication performed by a user equipment (UE), comprising:
    receiving from a base station a plurality of access parameters corresponding to respective types of access controls for different types of data services;
    receiving a traffic flow template (TFT) established at a core network based on mapping a packet filter to access control information for each of the respective types of access controls;
    receiving a data packet from an application;
    matching the data packet to the packet filter of the TFT to determine access control information corresponding to the data packet; and
    establishing a wireless communication for the data packet based on access parameters for the determined type of access control, wherein the UE receives the data packet after establishing a session and after receiving the TFT based on the access control information and wherein the TFT includes a flow identifier, the packet filter, quality of service (QoS) information, and the access control information, wherein the quality of service (QoS) information includes a plurality of QoS class identifiers or a plurality of QoS profile identifiers.

2. The method of claim 1, wherein the establishing the session comprises at least one of establishing an air interface session, establishing a point-to-point (PPP) session, or establishing a packet data network (PDN) context.

3. The method of claim 1, wherein the packet filter is associated with at least one of an emergency data service or a non-emergency data service.

4. The method of claim 1, wherein the data services include a voice over Internet protocol (VoIP) service, a short message service (SMS) over Internet protocol (IP), and a chat service over IP.

5. The method of claim 1, wherein the access control information comprises a plurality of access control classes respectively corresponding to the plurality of types of access controls.

6. The method of claim 1, wherein the access control information is included in quality of service (QoS) information.

7. The method of claim 1, wherein the access control information is based on at least one packet data network (PDN) identifier.

8. The method of claim 1, wherein the access control information is based on at least one Access Point Name (APN).

9. A method for wireless communication performed by a base station, comprising:
    obtaining access control information for each of a plurality of types of access controls for different types of data services;
    deriving at least one access parameter for each type of access control based on the access control information obtained for a respective type of access control;
    sending the at least one access parameter derived for each type of access control to a user equipment (UE); and
    providing to the UE a traffic flow template (TFT) established at a core network based on the access control information, wherein the TFT is used to provide a packet filter associated with the access control information to the UE, wherein the TFT includes a flow identifier, the packet filter, quality of service (QoS) information, and the access control information, wherein the quality of service (QoS) information includes a plurality of QoS class identifiers or a plurality of QoS profile identifiers.

10. The method of claim 9, wherein:
    the access control information is obtained from the core network; or
    the access control information is preconfigured at the base station.

11. The method of claim 9, further comprising:
    receiving a setup signaling from the UE to establish a session; and
    establishing the session in response to the setup signaling.

12. The method of claim 11, wherein the setup signaling is associated with a session establishment including access control with high priority.

13. The method of claim 11, wherein the establishing the session comprises at least one of establishing an air interface session, establishing a point-to-point (PPP) session, or establishing a packet data network (PDN) context.

14. The method of claim 9, wherein the packet filter is associated with at least one of an emergency data service or a non-emergency data service.

15. The method of claim 9, wherein the data services include a voice over Internet protocol (VoIP) service, a short message service (SMS) over Internet protocol (IP), and a chat service over IP.

16. The method of claim 9, wherein the access control information comprises a plurality of access control classes respectively corresponding to the plurality of types of access controls.

17. The method of claim 9, wherein the base station obtains quality of service (QoS) information to obtain the access control information that is included in the QoS information, and derives the at least one access parameter for each type of access control based on the access control information included in the QoS information.

18. The method of claim 9, wherein the access control information is based on at least one packet data network (PDN) identifier.

19. The method of claim 9, wherein the access control information is based on at least one Access Point Name (APN).

20. A user equipment (UE) for wireless communication, comprising:
    means for receiving from a base station a plurality of access parameters corresponding to respective types of access controls for different types of data services;
    means for receiving a traffic flow template (TFT) established at a core network based on mapping a packet filter to access control information for each of the respective types of access controls;
    means for receiving a data packet from an application;
    means for matching the data packet to the packet filter of the TFT to determine access control information corresponding to the data packet; and
    means for establishing a wireless communication for the data packet based on access parameters for the determined type of access control, wherein the means for receiving the data packet is configured to receive after establishing a session and after receiving the TFT based on the access control information and wherein the TFT includes a flow identifier, the packet filter, quality of service (QoS) information, and the access control information, wherein the quality of service (QoS) information includes a plurality of QoS class identifiers or a plurality of QoS profile identifiers.

21. The UE of claim 20, wherein the means for establishing the session is configured to at least one of establish an air interface session, establish a point-to-point (PPP) session, or establish a packet data network (PDN) context.

22. The UE of claim 20, wherein the packet filter is associated with at least one of an emergency data service or a non-emergency data service.

23. The UE of claim 20, wherein the data services include at least one of a voice over Internet protocol (VoIP) service, a short message service (SMS) over Internet protocol (IP), or a chat service over IP.

24. The UE of claim 20, wherein the access control information comprises a plurality of access control classes respectively corresponding to the plurality of types of access controls.

25. The UE of claim 20, wherein the access control information is included in quality of service (QoS) information.

26. The UE of claim 20, wherein the access control information is based on at least one packet data network (PDN) identifier.

27. The UE of claim 20, wherein the access control information is based on at least one Access Point Name (APN).

28. A base station for wireless communication, comprising:
means for obtaining access control information for each of a plurality of types of access controls for different types of data services;
means for deriving at least one access parameter for each type of access control based on the access control information obtained for a respective type of access control;
means for sending the at least one access parameter derived for each type of access control to a user equipment (UE); and
means for providing to the UE a traffic flow template (TFT) established at a core network based on the access control information, wherein the TFT includes a flow identifier, a packet filter, quality of service (QoS) information, and the access control information, wherein the quality of service (QoS) information includes a plurality of QoS class identifiers or a plurality of QoS profile identifiers.

29. The base station of claim 28, wherein:
the access control information is obtained from the core network; or
the access control information is preconfigured at the base station.

30. The base station of claim 28, further comprising:
means for receiving setup signaling from the UE to establish a session; and
means for establishing the session in response to the setup signaling.

31. The base station of claim 30, wherein the setup signaling is associated with a session establishment including access control with high priority.

32. The base station of claim 30, wherein the means for establishing the session is configured to perform at least one of establishing an air interface session, establishing a point-to-point (PPP) session, or establishing a packet data network (PDN) context.

33. The base station of claim 28, wherein the packet filter is associated with at least one of an emergency data service or a non-emergency data service.

34. The base station of claim 28, wherein the data services include at least one of a voice over Internet protocol (VoIP) service, a short message service (SMS) over Internet protocol (IP), or a chat service over IP.

35. The base station of claim 28, wherein the access control information comprises a plurality of access control classes respectively corresponding to the plurality of types of access controls.

36. The base station of claim 28, wherein the means for obtaining is configured to obtain quality of service (QoS) information to obtain the access control information that is included in the QoS information, and the means for deriving is configured to derive the at least one access parameter for each type of access control based on the access control information included in the QoS information.

37. The base station of claim 28, wherein the access control information is based on at least one packet data network (PDN) identifier.

38. The base station of claim 28, wherein the access control information is based on at least one Access Point Name (APN).

39. A user equipment (UE) for wireless communication, comprising:
a memory; and
at least one processor coupled to the memory and configured to:
receive from a base station a plurality of access parameters corresponding to respective types of access controls for different types of data services;
receive a traffic flow template (TFT) established at a core network based on mapping a packet filter to access control information for each of the respective types of access controls;
receive a data packet from an application;
match the data packet to the packet filter of the TFT to determine access control information corresponding to the data packet; and
establish a wireless communication for the data packet based on access parameters for the determined type of access control, wherein the UE receives the data packet after establishing a session and after receiving the TFT based on the access control information and wherein the TFT includes a flow identifier, the packet filter, quality of service (QoS) information, and the access control information, wherein the quality of service (QoS) information includes a plurality of QoS class identifiers or a plurality of QoS profile identifiers.

40. A base station for wireless communication, comprising:
a memory; and
at least one processor coupled to the memory and configured to:
obtain access control information for each of a plurality of types of access controls for different types of data services;
derive at least one access parameter for each type of access control based on the access control information obtained for a respective type of access control;
send the at least one access parameter derived for each type of access control to a user equipment (UE); and
provide to the UE a traffic flow template (TFT) established at a core network based on the access control information, wherein the TFT includes a flow identifier, a packet filter, quality of service (QoS) information, and the access control information, wherein the quality of service (QoS) information includes a plurality of QoS class identifiers or a plurality of QoS profile identifiers.

41. A non-transitory computer-readable medium storing computer executable code, comprising code to:
- receive from a base station a plurality of access parameters corresponding to respective types of access controls for different types of data services;
- receive a traffic flow template (TFT) established at a core network based on mapping a packet filter to access control information for each of the respective types of access controls;
- receive a data packet from an application;
- match the data packet to the packet filter of the TFT to determine access control information corresponding to the data packet; and
- establish a wireless communication for the data packet based on access parameters for the determined type of access control, wherein the UE receives the data packet after establishing a session and after receiving the TFT based on the access control information and wherein the TFT includes a flow identifier, the packet filter, quality of service (QoS) information, and the access control information, wherein the quality of service (QoS) information includes a plurality of QoS class identifiers or a plurality of QoS profile identifiers.

42. A non-transitory computer-readable medium storing computer executable code, comprising code to:
- obtain access control information for each of a plurality of types of access controls for different types of data services;
- derive at least one access parameter for each type of access control based on the access control information obtained for a respective type of access control;
- send the at least one access parameter derived for each type of access control to a user equipment (UE); and
- provide to the UE a traffic flow template (TFT) established at a core network based on the access control information, wherein the TFT is used to provide a packet filter associated with the access control information to the UE, wherein the TFT includes a flow identifier, the packet filter, quality of service (QoS) information, and the access control information, wherein the quality of service (QoS) information includes a plurality of QoS class identifiers or a plurality of QoS profile identifiers.

* * * * *